(12) United States Patent
Macaluso

(10) Patent No.: US 12,495,284 B2
(45) Date of Patent: Dec. 9, 2025

(54) MANAGING VEHICLES OVER A WIRELESS NETWORK

(71) Applicant: Anthony Macaluso, San Diego, CA (US)

(72) Inventor: Anthony Macaluso, San Diego, CA (US)

( * ) Notice: Subject to any disclaimer, the term of this patent is extended or adjusted under 35 U.S.C. 154(b) by 0 days.

(21) Appl. No.: 18/806,398

(22) Filed: Aug. 15, 2024

(65) Prior Publication Data

US 2024/0406695 A1     Dec. 5, 2024

Related U.S. Application Data

(60) Continuation of application No. 18/630,569, filed on Apr. 9, 2024, now Pat. No. 12,096,324, which is a continuation of application No. 18/150,522, filed on Jan. 5, 2023, now Pat. No. 11,985,579, which is a division of application No. 17/950,712, filed on Sep. 22, 2022, now Pat. No. 11,641,572, which is a continuation-in-part of application No. 17/872,887, filed on Jul. 25, 2022, now Pat. No. 11,627,449, and a continuation-in-part of application No. 17/870,667,
(Continued)

(51) Int. Cl.
| | |
|---|---|
| *H04W 4/50* | (2018.01) |
| *F03G 7/08* | (2006.01) |
| *G06F 8/65* | (2018.01) |
| *G06F 9/445* | (2018.01) |
| *H02J 7/14* | (2006.01) |
| *H04W 4/40* | (2018.01) |

(52) U.S. Cl.
CPC ............... *H04W 4/50* (2018.02); *F03G 7/08* (2013.01); *G06F 8/65* (2013.01); *G06F 9/44505* (2013.01); *H02J 7/14* (2013.01); *H02J 7/1446* (2013.01); *H02J 7/1476* (2013.01); *H04W 4/40* (2018.02)

(58) Field of Classification Search
CPC . H04W 4/50; H04W 4/40; G03G 7/08; G06F 8/65; G06F 9/44505; H02J 7/14; H02J 7/1446; H02J 7/1476
See application file for complete search history.

(56) References Cited

U.S. PATENT DOCUMENTS

| | | |
|---|---|---|
| 1,751,577 A | 3/1930 | Cole |
| 2,451,965 A | 10/1948 | Longenecker |

(Continued)

FOREIGN PATENT DOCUMENTS

| | | |
|---|---|---|
| CA | 2019025 | 12/1990 |
| CH | 202100372 | 4/2022 |

(Continued)

*Primary Examiner* — Shean Tokuta
(74) *Attorney, Agent, or Firm* — Knobbe, Martens, Olson & Bear, LLP

(57) ABSTRACT

A computer system can remotely manage a vehicle's operational settings. The computer system can cause operational settings data to be downloaded to a vehicle to control one or more operations of the vehicle. The computer system can generate download event information indicating the operational settings data downloaded to the vehicle and a user associated with the vehicle. The computer system can access a pricing structure associated with operational settings. The computer system can charge the user based on the pricing structure and the download event information.

24 Claims, 23 Drawing Sheets

Related U.S. Application Data filed on Jul. 21, 2022, now Pat. No. 11,837,411, which is a continuation of application No. 17/666,266, filed on Feb. 7, 2022, now Pat. No. 11,432,123, which is a continuation-in-part of application No. 17/541,159, filed on Dec. 2, 2021, now Pat. No. 12,463,448, which is a continuation-in-part of application No. 17/410,272, filed on Aug. 24, 2021, now Pat. No. 11,289,974, which is a continuation of application No. 17/332,088, filed on May 27, 2021, now Pat. No. 11,222,750, which is a continuation-in-part of application No. 17/332,824, filed on May 27, 2021, now Pat. No. 11,615,923, which is a continuation-in-part of application No. 17/141,518, filed on Jan. 5, 2021, now Pat. No. 11,133,729, which is a continuation-in-part of application No. 16/847,538, filed on Apr. 13, 2020, now Pat. No. 11,685,276.

(60) Provisional application No. 63/164,474, filed on Mar. 22, 2021, provisional application No. 63/140,805, filed on Jan. 23, 2021, provisional application No. 62/967,406, filed on Jan. 29, 2020, provisional application No. 62/883,523, filed on Aug. 6, 2019, provisional application No. 62/858,902, filed on Jun. 7, 2019.

(56) References Cited

U.S. PATENT DOCUMENTS

| | | |
|---|---|---|
| 2,660,443 A | 11/1953 | Miller |
| 3,859,589 A | 1/1975 | Rush |
| 3,891,044 A | 6/1975 | Tiede |
| 3,943,370 A | 3/1976 | Watanabe |
| 3,961,678 A | 6/1976 | Hirano et al. |
| 3,978,936 A | 9/1976 | Schwartz |
| 3,990,098 A | 11/1976 | Mastrangelo |
| 4,214,160 A | 7/1980 | Fies et al. |
| 4,314,160 A | 2/1982 | Boodman et al. |
| 4,351,405 A | 9/1982 | Fields |
| 4,364,448 A | 12/1982 | Ikuma |
| 4,404,513 A | 9/1983 | Campen |
| 4,476,947 A | 10/1984 | Rynbrandt |
| 4,539,496 A | 9/1985 | Thomas et al. |
| 4,579,188 A | 4/1986 | Facer |
| 4,602,694 A | 7/1986 | Weldin |
| 5,045,646 A | 9/1991 | Musachio |
| 5,078,227 A | 1/1992 | Becker |
| 5,086,857 A | 2/1992 | Dale |
| 5,105,776 A | 4/1992 | Tsuchiya |
| 5,316,101 A | 5/1994 | Gannon |
| 5,412,293 A | 5/1995 | Minezawa et al. |
| 5,491,390 A | 2/1996 | McGreen |
| 5,671,821 A | 9/1997 | McGreen |
| 5,680,907 A | 10/1997 | Weihe |
| 5,710,504 A | 1/1998 | Pascual et al. |
| 5,735,363 A | 4/1998 | Horovitz et al. |
| 5,767,663 A | 6/1998 | Lu |
| 5,921,334 A | 7/1999 | Al-Dokhi |
| 5,982,152 A | 11/1999 | Watanabe |
| 5,992,553 A | 11/1999 | Morrison |
| 6,008,626 A | 12/1999 | Sato |
| 6,064,178 A | 5/2000 | Miller |
| 6,065,557 A | 5/2000 | von Keyserling |
| 6,220,381 B1 | 4/2001 | Damron et al. |
| 6,390,215 B1 | 5/2002 | Kodama |
| 6,502,842 B2 | 1/2003 | Ko |
| 6,531,838 B2 | 3/2003 | Parks |
| 6,703,716 B2 | 3/2004 | Chiu |
| 6,717,280 B1 | 4/2004 | Bienville |
| 6,987,327 B1 | 1/2006 | Lucatero |
| 7,145,256 B2 | 12/2006 | Koharcheck |
| 7,183,746 B1 | 2/2007 | Carter |
| 7,279,799 B1 | 10/2007 | McCauley |
| 7,514,803 B2 | 4/2009 | Wilks |
| 7,547,980 B2 | 6/2009 | Harrison |
| 7,560,904 B2 | 7/2009 | Alvarez-Troncoso |
| 7,628,236 B1 | 12/2009 | Brown |
| 7,667,438 B2 | 2/2010 | Ashtiani |
| 7,753,010 B2 | 7/2010 | Rutledge |
| 7,913,783 B2 | 3/2011 | Elmaleh |
| 8,063,609 B2 | 11/2011 | Salasoo et al. |
| 8,089,168 B2 | 1/2012 | Chevrette |
| 8,206,263 B2 | 6/2012 | Tsuchikawa |
| 8,253,359 B2 | 8/2012 | Tanaka |
| 8,347,999 B2 | 1/2013 | Koelsch et al. |
| 8,573,346 B2 | 11/2013 | Duignan |
| 8,643,201 B2 | 2/2014 | Scott |
| 8,651,209 B2 | 2/2014 | Hartjen, III |
| 8,712,620 B2 | 4/2014 | Jackson |
| 8,723,344 B1 | 5/2014 | Dierickx |
| 8,796,987 B2 | 8/2014 | Scheucher |
| 8,872,368 B1 | 10/2014 | Kim et al. |
| 8,907,631 B1 | 12/2014 | Gurries |
| 8,928,281 B2 | 1/2015 | Murase et al. |
| 9,048,513 B2 | 6/2015 | Butzmann |
| 9,136,729 B2 | 9/2015 | Ashinghurst |
| 9,236,761 B2 | 1/2016 | Strothmann |
| 9,242,698 B2 | 1/2016 | Frieden |
| 9,321,357 B2 | 4/2016 | Caldeira et al. |
| 9,376,971 B2 | 6/2016 | Luther et al. |
| 9,415,660 B2 | 8/2016 | Koelsch |
| 9,457,666 B2 | 10/2016 | Caldeira et al. |
| 9,575,743 B1 | 2/2017 | Chun |
| 9,656,660 B2 | 5/2017 | Baliff |
| 9,726,240 B2 | 8/2017 | David et al. |
| 9,793,833 B1 | 10/2017 | Johnson |
| 9,816,475 B1 | 11/2017 | Buchanan et al. |
| 9,904,948 B2* | 2/2018 | Taira ................. G06Q 30/0605 |
| 9,981,553 B2 | 5/2018 | Schafer et al. |
| 10,077,056 B1 | 9/2018 | Fields et al. |
| 10,077,752 B1 | 9/2018 | Lee et al. |
| 10,157,050 B2 | 12/2018 | Kotani et al. |
| 10,252,727 B1* | 4/2019 | Braun ................... G06Q 40/08 |
| 10,293,702 B2 | 5/2019 | Tu et al. |
| 10,436,167 B1 | 10/2019 | Namuduri |
| 10,513,180 B2 | 12/2019 | Quill |
| 10,586,024 B1 | 3/2020 | Patton |
| 10,664,917 B1 | 5/2020 | Wasserman |
| 10,666,077 B1 | 5/2020 | Dharia |
| 10,787,089 B1 | 9/2020 | Macaluso |
| 10,795,380 B1 | 10/2020 | Patton |
| 10,797,564 B1 | 10/2020 | Griggs |
| 10,850,713 B2 | 12/2020 | O'Hara |
| 10,889,186 B2 | 1/2021 | Schutt |
| 10,903,679 B2 | 1/2021 | Schmalzrieth et al. |
| 11,007,878 B2 | 5/2021 | Kamino et al. |
| 11,072,254 B1 | 7/2021 | Macaluso |
| 11,117,481 B2 | 9/2021 | Macaluso |
| 11,130,415 B2 | 9/2021 | Macaluso |
| 11,133,729 B2 | 9/2021 | Macaluso |
| 11,159,042 B2 | 10/2021 | Familiant et al. |
| 11,222,750 B1 | 1/2022 | Macaluso |
| 11,289,974 B2 | 3/2022 | Macaluso |
| 11,299,054 B2 | 4/2022 | Macaluso |
| 11,318,856 B2 | 5/2022 | Macaluso |
| 11,322,311 B2 | 5/2022 | Macaluso |
| 11,362,525 B2 | 6/2022 | Feng |
| 11,368,031 B2 | 6/2022 | Griffiths et al. |
| 11,431,225 B2 | 8/2022 | Macaluso |
| 11,432,123 B2 | 8/2022 | Macaluso |
| 11,458,853 B2 | 10/2022 | Macaluso |
| 11,472,306 B1* | 10/2022 | Macaluso ................ B60L 53/24 |
| 11,548,399 B1 | 1/2023 | Macaluso |
| 11,551,486 B1 | 1/2023 | Everett et al. |
| 11,577,606 B1 | 2/2023 | Macaluso |
| 11,587,740 B2 | 2/2023 | Macaluso |
| 11,615,923 B2 | 3/2023 | Macaluso |
| 11,618,332 B1* | 4/2023 | Macaluso ............. H02J 7/0049 320/109 |
| 11,626,775 B2 | 4/2023 | Macaluso |
| 11,627,449 B2 | 4/2023 | Macaluso |

(56) References Cited

U.S. PATENT DOCUMENTS

| | | |
|---|---|---|
| 11,628,724 B1 | 4/2023 | Macaluso |
| 11,641,572 B2 | 5/2023 | Macaluso |
| 11,685,276 B2 | 6/2023 | Macaluso |
| 11,722,869 B2 | 8/2023 | Macaluso |
| 11,738,641 B1 | 8/2023 | Macaluso |
| 11,757,332 B2 | 9/2023 | Macaluso |
| 11,780,466 B1 * | 10/2023 | Shah ............ B60W 60/00276 701/23 |
| 11,785,433 B2 | 10/2023 | Macaluso |
| 11,837,411 B2 | 12/2023 | Macaluso |
| 11,850,963 B2 * | 12/2023 | Macaluso .............. B60L 53/24 |
| 11,897,355 B2 * | 2/2024 | Macaluso ............. H02J 7/1415 |
| 11,897,506 B1 * | 2/2024 | Shah ................... B60W 50/14 |
| 11,904,708 B2 | 2/2024 | Macaluso |
| 11,916,466 B2 | 2/2024 | Macaluso |
| 11,919,387 B1 | 3/2024 | Macaluso |
| 11,919,412 B2 | 3/2024 | Macaluso |
| 11,919,413 B2 | 3/2024 | Macaluso |
| 11,938,825 B2 | 3/2024 | Sukhatankar et al. |
| 11,955,875 B1 | 4/2024 | Macaluso |
| 11,970,073 B2 | 4/2024 | Macaluso |
| 11,985,579 B2 | 5/2024 | Macaluso |
| 11,999,250 B2 | 6/2024 | Macaluso |
| 12,003,167 B1 | 6/2024 | Macaluso |
| 12,090,844 B2 | 9/2024 | Macaluso |
| 12,096,324 B2 | 9/2024 | Macaluso |
| 12,103,416 B2 | 10/2024 | Macaluso |
| 12,107,455 B2 | 10/2024 | Macaluso |
| 12,157,366 B2 | 12/2024 | Macaluso |
| 12,412,430 B2 | 9/2025 | Macaluso |
| 2003/0071464 A1 | 4/2003 | Chiu |
| 2003/0139859 A1 | 7/2003 | Hanada |
| 2003/0184258 A1 | 10/2003 | VonderHaar |
| 2003/0222502 A1 | 12/2003 | Takahashi |
| 2004/0012205 A1 | 1/2004 | Sua-An |
| 2004/0245783 A1 | 12/2004 | Gilbreth |
| 2004/0257043 A1 | 12/2004 | Takaoka |
| 2004/0262062 A1 | 12/2004 | Berbari et al. |
| 2005/0093370 A1 | 5/2005 | Amano et al. |
| 2005/0224263 A1 | 10/2005 | Vasilantone |
| 2005/0284676 A1 | 12/2005 | King |
| 2006/0091857 A1 | 5/2006 | Nakanishi |
| 2006/0238258 A1 | 10/2006 | D'Amore |
| 2006/0250902 A1 | 11/2006 | Bender |
| 2007/0013244 A1 | 1/2007 | Kinkaid |
| 2007/0024266 A1 | 2/2007 | Yurgil |
| 2007/0075677 A1 | 4/2007 | Alvarez-Troncoso |
| 2007/0090702 A1 | 4/2007 | Schiller |
| 2007/0164693 A1 | 7/2007 | King |
| 2007/0182158 A1 | 8/2007 | Cerney |
| 2007/0187957 A1 | 8/2007 | Harrison |
| 2007/0208468 A1 | 9/2007 | Sankaran et al. |
| 2008/0053716 A1 | 3/2008 | Scheucher |
| 2008/0066979 A1 | 3/2008 | Carter |
| 2008/0215700 A1 | 9/2008 | Pillar et al. |
| 2008/0223637 A1 | 9/2008 | Bartilson |
| 2008/0281663 A1 | 11/2008 | Hakim |
| 2008/0289890 A1 | 11/2008 | Stoltzfus |
| 2008/0297109 A1 | 12/2008 | Sandberg et al. |
| 2009/0033254 A1 | 2/2009 | Nagashima et al. |
| 2009/0079417 A1 | 3/2009 | Mort et al. |
| 2009/0145674 A1 | 6/2009 | Lee |
| 2009/0168305 A1 | 7/2009 | Fleig et al. |
| 2009/0194998 A1 | 8/2009 | Lin |
| 2009/0206779 A1 | 8/2009 | Wobben |
| 2009/0230766 A1 | 9/2009 | Miyama |
| 2009/0250276 A1 | 10/2009 | Goodwin et al. |
| 2009/0256450 A1 | 10/2009 | Chevrette |
| 2009/0261787 A1 | 10/2009 | Cegnar |
| 2009/0295224 A1 | 12/2009 | Kobayashi |
| 2010/0001866 A1 | 1/2010 | Ichikawa |
| 2010/0019718 A1 | 1/2010 | Salasoo et al. |
| 2010/0076825 A1 | 3/2010 | Sato |
| 2010/0116574 A1 | 5/2010 | Gilmore |
| 2010/0117600 A1 | 5/2010 | Fazakas |
| 2010/0164334 A1 | 7/2010 | Schiller |
| 2010/0168945 A1 | 7/2010 | Ohno |
| 2010/0222952 A1 | 9/2010 | Yamaguchi |
| 2010/0270810 A1 | 10/2010 | Liebermann et al. |
| 2010/0327600 A1 | 12/2010 | Koelsch |
| 2011/0012560 A1 | 1/2011 | Sakakibara et al. |
| 2011/0014501 A1 | 1/2011 | Scheucher |
| 2011/0025068 A1 | 2/2011 | Campbell |
| 2011/0083918 A1 | 4/2011 | Kshatriya |
| 2011/0089760 A1 | 4/2011 | Castelaz et al. |
| 2011/0100735 A1 | 5/2011 | Flett |
| 2011/0106329 A1 | 5/2011 | Donnelly et al. |
| 2011/0140518 A1 | 6/2011 | Hattori |
| 2011/0163717 A1 | 7/2011 | Gale |
| 2011/0167455 A1 | 7/2011 | Gao |
| 2011/0189507 A1 | 8/2011 | Reis |
| 2011/0200193 A1 | 8/2011 | Blitz et al. |
| 2011/0231044 A1 | 9/2011 | Fassnacht |
| 2011/0302078 A1 | 12/2011 | Failing |
| 2011/0320074 A1 | 12/2011 | Eriston et al. |
| 2012/0012406 A1 | 1/2012 | Stoicoviciu |
| 2012/0037438 A1 | 2/2012 | Schultz |
| 2012/0054095 A1 | 3/2012 | Lesandro et al. |
| 2012/0068537 A1 | 3/2012 | Hintz et al. |
| 2012/0129577 A1 | 5/2012 | Vaknin |
| 2012/0139487 A1 | 6/2012 | Kim |
| 2012/0237799 A1 | 9/2012 | Jiang |
| 2012/0309455 A1 | 12/2012 | Klose et al. |
| 2012/0330486 A1 | 12/2012 | Jingu |
| 2013/0015668 A1 | 1/2013 | Chang et al. |
| 2013/0049459 A1 | 2/2013 | Hatanaka |
| 2013/0067253 A1 | 3/2013 | Tsuda |
| 2013/0081886 A1 | 4/2013 | Jaberian |
| 2013/0091033 A1 * | 4/2013 | Goodman .......... G06Q 30/0621 705/26.5 |
| 2013/0096759 A1 | 4/2013 | Breton et al. |
| 2013/0119665 A1 | 5/2013 | Berbari |
| 2013/0257144 A1 | 10/2013 | Caldeira et al. |
| 2013/0257145 A1 | 10/2013 | Caldeira et al. |
| 2013/0261907 A1 | 10/2013 | McQuade |
| 2013/0266826 A1 | 10/2013 | Cowperthwaite |
| 2013/0307479 A1 | 11/2013 | Kim |
| 2013/0332014 A1 | 12/2013 | Jackson |
| 2014/0001905 A1 | 1/2014 | Schawitsch |
| 2014/0091573 A1 | 4/2014 | Berbari |
| 2014/0132063 A1 | 5/2014 | Kakiuchi |
| 2014/0132155 A1 | 5/2014 | Strothmann |
| 2014/0197780 A1 | 7/2014 | Imamura |
| 2014/0210398 A1 | 7/2014 | Powell |
| 2014/0244082 A1 | 8/2014 | Caron |
| 2014/0266004 A1 | 9/2014 | Andrews, Jr. |
| 2014/0266070 A1 | 9/2014 | Kurtzman |
| 2014/0283092 A1 | 9/2014 | Mowatt et al. |
| 2014/0285209 A1 | 9/2014 | Stichowski et al. |
| 2014/0350764 A1 | 11/2014 | Arai et al. |
| 2014/0368041 A1 | 12/2014 | Tu et al. |
| 2015/0008867 A1 | 1/2015 | Smychkovich |
| 2015/0014991 A1 | 1/2015 | Al Jaeedi et al. |
| 2015/0054428 A1 | 2/2015 | Osborne |
| 2015/0089981 A1 | 4/2015 | Renfro |
| 2015/0210287 A1 | 7/2015 | Penilla et al. |
| 2015/0222553 A1 | 8/2015 | Macdonald et al. |
| 2015/0249362 A1 | 9/2015 | Bridgelall et al. |
| 2015/0260835 A1 | 9/2015 | Widmer et al. |
| 2015/0262154 A1 | 9/2015 | Wolfson |
| 2015/0343909 A1 | 12/2015 | Hikiri |
| 2015/0346233 A1 * | 12/2015 | Slepov .................. G01P 1/026 324/166 |
| 2015/0347121 A1 | 12/2015 | Harumoto |
| 2015/0363855 A1 | 12/2015 | Wu et al. |
| 2016/0034952 A1 | 2/2016 | Parkin et al. |
| 2016/0071338 A1 | 3/2016 | McQuade et al. |
| 2016/0089981 A1 | 3/2016 | Kodawara |
| 2016/0105020 A1 | 4/2016 | Guo |
| 2016/0111907 A1 | 4/2016 | Lynds |
| 2016/0144720 A1 | 5/2016 | Nakabayashi |
| 2016/0164373 A1 | 6/2016 | Liao et al. |
| 2016/0185243 A1 | 6/2016 | Zhou |
| 2016/0189311 A1 | 6/2016 | Erickson et al. |

(56) References Cited

U.S. PATENT DOCUMENTS

| | | |
|---|---|---|
| 2016/0207418 A1 | 7/2016 | Bergstrom |
| 2016/0236578 A1 | 8/2016 | Liao |
| 2016/0243960 A1 | 8/2016 | Wood |
| 2016/0297317 A1 | 10/2016 | Huang et al. |
| 2016/0298589 A1 | 10/2016 | Setterberg |
| 2016/0348788 A1 | 12/2016 | Lemmers |
| 2017/0036551 A1 | 2/2017 | Wu |
| 2017/0063124 A1 | 3/2017 | Yu et al. |
| 2017/0077534 A1 | 3/2017 | Guidry et al. |
| 2017/0086084 A1 | 3/2017 | Jarvis |
| 2017/0117720 A1 | 4/2017 | Yung |
| 2017/0131999 A1 | 5/2017 | Dolby et al. |
| 2017/0142766 A1 | 5/2017 | Kim |
| 2017/0176540 A1 | 6/2017 | Omi |
| 2017/0190261 A1 | 7/2017 | Cheng |
| 2017/0191459 A1 | 7/2017 | Zhang |
| 2017/0217442 A1 | 8/2017 | Rios, III |
| 2017/0259764 A1 | 9/2017 | Da Silva Carvalho |
| 2017/0302094 A1 | 10/2017 | Lynds |
| 2017/0305424 A1* | 10/2017 | Augst .................. F02D 41/1406 |
| 2017/0363433 A1 | 12/2017 | Tennent et al. |
| 2017/0366017 A1 | 12/2017 | Clay et al. |
| 2017/0366112 A1 | 12/2017 | Zhou |
| 2018/0009329 A1 | 1/2018 | Tellez |
| 2018/0012196 A1* | 1/2018 | Ricci .................... G06Q 20/308 |
| 2018/0062555 A1 | 3/2018 | Sagawa |
| 2018/0083469 A1 | 3/2018 | Bauer et al. |
| 2018/0126866 A1 | 5/2018 | Nozawa |
| 2018/0154779 A1 | 6/2018 | Chol |
| 2018/0156144 A1 | 6/2018 | Inoue |
| 2018/0166750 A1 | 6/2018 | Chang |
| 2018/0189049 A1 | 7/2018 | Madrid |
| 2018/0198846 A1 | 7/2018 | Srinivasan |
| 2018/0204173 A1 | 7/2018 | Painter et al. |
| 2018/0204253 A1 | 7/2018 | Painter et al. |
| 2018/0204281 A1 | 7/2018 | Painter et al. |
| 2018/0205242 A1 | 7/2018 | Kelly-Morgan et al. |
| 2018/0215272 A1 | 8/2018 | Vitullo et al. |
| 2018/0254732 A1 | 9/2018 | Smolenaers |
| 2018/0312159 A1 | 11/2018 | Jent, II |
| 2018/0328745 A1 | 11/2018 | Nagy et al. |
| 2018/0351397 A1 | 12/2018 | Aharoni |
| 2018/0370537 A1 | 12/2018 | Wu |
| 2019/0001804 A1 | 1/2019 | Wilhide |
| 2019/0004580 A1 | 1/2019 | Wilhide |
| 2019/0044359 A1 | 2/2019 | Gordon et al. |
| 2019/0077254 A1 | 3/2019 | Stanley |
| 2019/0081502 A1 | 3/2019 | Botts |
| 2019/0103639 A1 | 4/2019 | Guglielmo et al. |
| 2019/0138952 A1* | 5/2019 | Han ........................ G06Q 10/02 |
| 2019/0140245 A1 | 5/2019 | Mensch |
| 2019/0176802 A1 | 6/2019 | Kim |
| 2019/0184843 A1 | 6/2019 | Jung et al. |
| 2019/0199104 A1 | 6/2019 | Shim |
| 2019/0202429 A1 | 7/2019 | Richter |
| 2019/0212997 A1 | 7/2019 | Sangameswaran et al. |
| 2019/0215376 A1 | 7/2019 | Kang |
| 2019/0217720 A1 | 7/2019 | Treharne et al. |
| 2019/0245375 A1 | 8/2019 | Schmalzrieth et al. |
| 2019/0263385 A1 | 8/2019 | Zhou |
| 2019/0292973 A1 | 9/2019 | Jiang et al. |
| 2019/0296541 A1 | 9/2019 | Mensch |
| 2019/0308510 A1 | 10/2019 | Beaurepaire |
| 2019/0329650 A1 | 10/2019 | Quill |
| 2019/0351895 A1 | 11/2019 | Ben-Ari |
| 2019/0351899 A1 | 11/2019 | Adam |
| 2019/0351948 A1 | 11/2019 | Derissaint |
| 2019/0353710 A1 | 11/2019 | Rocci |
| 2019/0359080 A1 | 11/2019 | Hellgren |
| 2019/0362922 A1 | 11/2019 | Bae et al. |
| 2019/0383627 A1 | 12/2019 | Nangeroni et al. |
| 2020/0006716 A1 | 1/2020 | Wagoner |
| 2020/0039379 A1 | 2/2020 | Schlosser |
| 2020/0062138 A1 | 2/2020 | Smolenaers |
| 2020/0063640 A1 | 2/2020 | Lee |
| 2020/0094695 A1 | 3/2020 | Bowman |
| 2020/0101858 A1 | 4/2020 | Kuroda |
| 2020/0136414 A1 | 4/2020 | Patsos |
| 2020/0153351 A1 | 5/2020 | Jiao |
| 2020/0174780 A1 | 6/2020 | Gintz |
| 2020/0184591 A1 | 6/2020 | Balu et al. |
| 2020/0186620 A1 | 6/2020 | Golgiri et al. |
| 2020/0202645 A1 | 6/2020 | Gintz |
| 2020/0203986 A1 | 6/2020 | Barreau |
| 2020/0204702 A1* | 6/2020 | Park ................. G06K 19/06037 |
| 2020/0207209 A1 | 7/2020 | Engel |
| 2020/0226850 A1 | 7/2020 | Bower |
| 2020/0238929 A1 | 7/2020 | Wippler |
| 2020/0241555 A1 | 7/2020 | Dogishi |
| 2020/0244088 A1 | 7/2020 | Will et al. |
| 2020/0249822 A1 | 8/2020 | Penilla |
| 2020/0258325 A1 | 8/2020 | Maria |
| 2020/0265480 A1* | 8/2020 | Swinson ............ G06Q 30/0278 |
| 2020/0276904 A1 | 9/2020 | Deaton |
| 2020/0277021 A1 | 9/2020 | Biderman |
| 2020/0294401 A1 | 9/2020 | Kerecsen |
| 2020/0295412 A1 | 9/2020 | Chen |
| 2020/0324763 A1 | 10/2020 | Switkes et al. |
| 2020/0353839 A1 | 11/2020 | Tarchinski et al. |
| 2020/0353882 A1 | 11/2020 | Beiser |
| 2020/0376967 A1 | 12/2020 | Furukawa |
| 2020/0381784 A1 | 12/2020 | Yamamoto |
| 2020/0384879 A1 | 12/2020 | Ebisu et al. |
| 2021/0001737 A1 | 1/2021 | Hoess et al. |
| 2021/0065073 A1 | 3/2021 | Maeda et al. |
| 2021/0080943 A1 | 3/2021 | Iwamoto et al. |
| 2021/0094433 A1* | 4/2021 | Badger .................... B60L 53/64 |
| 2021/0110323 A1 | 4/2021 | Munoz et al. |
| 2021/0157571 A1* | 5/2021 | Ogawa .................... B60R 16/03 |
| 2021/0167988 A1 | 6/2021 | Harata et al. |
| 2021/0173411 A1 | 6/2021 | Rao et al. |
| 2021/0173635 A1 | 6/2021 | Shin |
| 2021/0183175 A1 | 6/2021 | Dunger |
| 2021/0188101 A1 | 6/2021 | Abu Qahouq et al. |
| 2021/0188115 A1 | 6/2021 | Kazuno |
| 2021/0197687 A1 | 7/2021 | Searcy |
| 2021/0201599 A1* | 7/2021 | Shionoya ............. G07C 5/0841 |
| 2021/0213952 A1* | 7/2021 | Willison ............. B60W 50/087 |
| 2021/0229687 A1 | 7/2021 | Hashimoto et al. |
| 2021/0284043 A1 | 9/2021 | Wang et al. |
| 2021/0288506 A1 | 9/2021 | Tanaka |
| 2021/0312544 A1 | 10/2021 | Inoue et al. |
| 2021/0334913 A1 | 10/2021 | Klein |
| 2021/0342896 A1* | 11/2021 | Swinson ............ G06Q 30/0278 |
| 2021/0347225 A1 | 11/2021 | Johnson et al. |
| 2021/0405996 A1 | 12/2021 | Takatsuna et al. |
| 2022/0016941 A1 | 1/2022 | Sams |
| 2022/0028627 A1 | 1/2022 | Macaluso |
| 2022/0050143 A1 | 2/2022 | Maeda et al. |
| 2022/0052582 A1 | 2/2022 | Giannotta |
| 2022/0105793 A1 | 4/2022 | Sukhatankar |
| 2022/0109314 A1 | 4/2022 | Pena |
| 2022/0111758 A1 | 4/2022 | Ijaz et al. |
| 2022/0144258 A1 | 5/2022 | Lind |
| 2022/0167134 A1* | 5/2022 | Macaluso ................. B60K 1/00 |
| 2022/0179641 A1 | 6/2022 | Harata et al. |
| 2022/0179644 A1 | 6/2022 | Harata et al. |
| 2022/0204012 A1 | 6/2022 | Ko |
| 2022/0212638 A1 | 7/2022 | Georgeson |
| 2022/0229446 A1 | 7/2022 | Switkes |
| 2022/0247201 A1 | 8/2022 | Chen |
| 2022/0253301 A1 | 8/2022 | Harata et al. |
| 2022/0261836 A1 | 8/2022 | Kimomura et al. |
| 2022/0270177 A1 | 8/2022 | Chintakindi |
| 2022/0301775 A1 | 9/2022 | Macaluso |
| 2022/0314837 A1 | 10/2022 | Gupta |
| 2022/0328271 A1 | 10/2022 | Patwardhan et al. |
| 2022/0329019 A1 | 10/2022 | Lanjekar et al. |
| 2022/0334818 A1 | 10/2022 | McFarland |
| 2022/0334822 A1 | 10/2022 | Sakakibara et al. |
| 2022/0340035 A1 | 10/2022 | Kim et al. |
| 2022/0360959 A1* | 11/2022 | Macaluso ............... H04W 4/50 |
| 2022/0374027 A1 | 11/2022 | Watts et al. |
| 2022/0399581 A1 | 12/2022 | Wood |

(56) References Cited

U.S. PATENT DOCUMENTS

| | | | |
|---|---|---|---|
| 2022/0402390 A1 | 12/2022 | Smolenaers | |
| 2022/0402399 A1* | 12/2022 | Staats | B60L 53/32 |
| 2023/0005305 A1 | 1/2023 | Sakurai et al. | |
| 2023/0026897 A1* | 1/2023 | Macaluso | B60L 8/003 |
| 2023/0038222 A1 | 2/2023 | Howell | |
| 2023/0068432 A1 | 3/2023 | Upadhyay et al. | |
| 2023/0100927 A1* | 3/2023 | Macaluso | H02J 7/1476 |
| | | | 370/254 |
| 2023/0104789 A1 | 4/2023 | Inui | |
| 2023/0109674 A1* | 4/2023 | Macaluso | B60L 8/003 |
| | | | 370/254 |
| 2023/0123166 A1 | 4/2023 | Deighton | |
| 2023/0130832 A1 | 4/2023 | Dunn | |
| 2023/0142500 A1 | 5/2023 | Marzoughi et al. | |
| 2023/0143096 A1* | 5/2023 | Macaluso | H02J 7/345 |
| | | | 370/254 |
| 2023/0154692 A1 | 5/2023 | Macaluso | |
| 2023/0155401 A1 | 5/2023 | Kuranuki et al. | |
| 2023/0171574 A1* | 6/2023 | Macaluso | H02J 7/1446 |
| | | | 370/254 |
| 2023/0187145 A1 | 6/2023 | Macaluso | |
| 2023/0187757 A1 | 6/2023 | Pouyadou | |
| 2023/0261509 A1 | 8/2023 | Dalal et al. | |
| 2023/0286400 A1* | 9/2023 | Macaluso | B60L 7/10 |
| 2023/0302962 A1 | 9/2023 | Couture et al. | |
| 2024/0001792 A1* | 1/2024 | Macaluso | B60L 7/10 |
| 2024/0087810 A1 | 3/2024 | Macaluso | |
| 2024/0109442 A1 | 4/2024 | Macaluso | |
| 2024/0174107 A1* | 5/2024 | Macaluso | B60L 53/65 |
| 2024/0178722 A1 | 5/2024 | Macaluso | |
| 2024/0208326 A1 | 6/2024 | Macaluso | |
| 2024/0258823 A1 | 8/2024 | Macaluso | |
| 2024/0258824 A1 | 8/2024 | Macaluso | |
| 2024/0259773 A1* | 8/2024 | Macaluso | F03G 7/08 |
| 2024/0322647 A1 | 9/2024 | Macaluso | |
| 2024/0406695 A1* | 12/2024 | Macaluso | H04W 4/40 |
| 2025/0010741 A1 | 1/2025 | Macaluso | |
| 2025/0196632 A1 | 6/2025 | Macaluso | |
| 2025/0201950 A1 | 6/2025 | Macaluso | |
| 2025/0303900 A1 | 10/2025 | Macaluso | |

FOREIGN PATENT DOCUMENTS

| | | | | |
|---|---|---|---|---|
| CN | 202294336 U | 7/2012 | | |
| CN | 102963263 | 3/2013 | | |
| CN | 108473063 | 8/2013 | | |
| CN | 104732790 A * | 6/2015 | | G01C 21/32 |
| CN | 106846153 | 6/2017 | | |
| CN | 107117038 | 9/2017 | | |
| CN | 108539841 | 9/2018 | | |
| CN | 108599384 A | 9/2018 | | H02J 15/00 |
| CN | 109976778 A * | 7/2019 | | G06F 8/65 |
| CN | 110549902 | 12/2019 | | |
| CN | 110633815 | 12/2019 | | |
| CN | 107804326 | 1/2020 | | |
| CN | 110795138 A * | 2/2020 | | G06F 11/327 |
| CN | 110889601 | 3/2020 | | |
| CN | 111932337 A * | 11/2020 | | |
| CN | 111954615 | 11/2020 | | |
| CN | 112977043 | 6/2021 | | |
| CN | 113479111 | 10/2021 | | |
| CN | 215398141 | 1/2022 | | |
| DE | 102017008723 | 5/2018 | | |
| DE | 102019220366 | 6/2021 | | |
| DE | 102011018457 | 1/2022 | | |
| EP | 1 253 698 | 10/2002 | | |
| EP | 3 246 776 B1 | 11/2020 | | |
| EP | 2 681 512 | 1/2021 | | |
| ES | 2880816 T3 | 11/2021 | | |
| GB | 2325201 | 11/1998 | | |
| GB | 2511831 | 9/2014 | | |
| GB | 2585496 A * | 1/2021 | | G06Q 20/102 |
| JP | 2002-257026 | 9/2002 | | |
| JP | 2003-278633 | 10/2003 | | |
| JP | 2011-132873 | 7/2011 | | |
| JP | 2015-027164 | 2/2015 | | |
| JP | 2016-170600 | 9/2016 | | |
| JP | 6687274 | 4/2020 | | |
| JP | 6898339 B2 * | 7/2021 | | G06Q 20/18 |
| KR | 2020-0020016 | 2/2020 | | |
| KR | 102266609 | 6/2021 | | |
| WO | WO 09/149769 | 12/2009 | | |
| WO | WO 10/133863 | 11/2010 | | |
| WO | WO 11/078748 | 6/2011 | | |
| WO | WO 11/148531 | 12/2011 | | |
| WO | WO 17/030354 | 2/2017 | | |
| WO | WO 17/057528 | 4/2017 | | |
| WO | WO-2017143079 A1 * | 8/2017 | | G06Q 20/18 |
| WO | WO 17/213079 | 12/2017 | | |
| WO | WO 18/046979 | 3/2018 | | |
| WO | WO 18/083279 | 5/2018 | | |
| WO | WO-2019034169 A1 * | 2/2019 | | G06Q 30/0621 |
| WO | WO 19/117894 | 6/2019 | | |
| WO | WO 19/145777 | 8/2019 | | |
| WO | WO 19/219997 | 11/2019 | | |
| WO | WO 19/240783 | 12/2019 | | |
| WO | WO-2020170233 A1 * | 8/2020 | | G06F 11/0757 |
| WO | WO 20/191367 | 9/2020 | | |
| WO | WO 21/187071 | 9/2021 | | |
| WO | WO 22/015017 | 1/2022 | | |
| WO | WO 22/132807 | 6/2022 | | |
| WO | WO 22/219510 | 10/2022 | | |
| WO | WO 23/160878 | 8/2023 | | |
| WO | WO-2023172429 A1 * | 9/2023 | | B60L 53/24 |
| WO | WO 24/002525 | 1/2024 | | |
| WO | WO-2024064093 A1 * | 3/2024 | | F03G 7/08 |

* cited by examiner

MANAGING VEHICLES OVER A WIRELESS NETWORK

CROSS REFERENCE TO RELATED APPLICATIONS

Any and all applications for which a foreign or domestic priority claim is identified in the Application Data Sheet as filed with the present application are hereby incorporated by reference under 37 CFR 1.57.

FIELD OF THE DISCLOSURE

The present disclosure relates to over-the-air provisioning of electric vehicle operational settings.

BACKGROUND

Electric vehicles often include devices and components necessary or desirable for operation such as for the generation, management, storage and consumption of energy. Electric vehicle components and devices can include batteries and battery management systems. The devices and components of electric vehicles may operate in a variety of manners, according to a variety of settings, for example manufacturing settings. The operational settings of various electric vehicle devices and components are often static. Thus, changing, updating or altering an electric vehicle's operational settings can be challenging if not impossible, for example, requiring the purchase and installation of new, replacement and/or additional components in order to effectuate different operational settings. Furthermore, the operational settings of a vehicle's components may not allow the components to function with other components having different operational settings. This may limit the options of available components that may be used in a vehicle, for example making it difficult or impossible to replace an original vehicle battery with a battery from a different manufacturer. As such, systems and methods to allow for the simple, efficient and quick updating and/or altering of electric vehicle operational settings are desirable.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

The present disclosure provides a system for over-the-air provisioning of a vehicle's operational settings. The system may include, for example, a server, remote to the vehicle, and including operational settings data. The server may be configured to: receive a request for operational settings data; and in response to receiving said request, transmit operational settings data to the vehicle; and one or more components of the vehicle configured to operate according to one or more operational settings. The one or more components may include a transceiver configured to communicate wirelessly with the server to send requests to the server and to receive operational settings data from the server; a memory including executable software instructions, the memory configured to update the instructions in response to receiving operational settings data from the server; and a processor configured to execute the software instructions to cause the component to function according to the one or more operational settings corresponding to the operational settings data received from the server.

In some embodiments, the server may be configured to receive the request for operational settings data from a user or from the vehicle.

In some embodiments, the server is further configured to: receive a request from a user for operational settings options; and in response to receiving said request, transmit operational settings options to the user.

In some embodiments, the one or more components of the vehicle include one or more of an energy storage device, an energy generation system, a vehicle management system, a motor or a component interface device.

In some embodiments, the server is configured to, in response to receiving, at the server, the request for operational settings data, determine whether operational settings data are available.

In some embodiments, the server is configured to, in response to receiving, at the server, the request for operational settings data, determine a status of current operational settings data of the vehicle.

In some embodiments, the system may further include a third-party server remote to the vehicle and remote to the server. The third-party server may include operational settings data and the server configured to communicate wirelessly with the third-party server to send and receive data.

In some embodiments, the server is configured to record download event information to a history log.

The present disclosure provides a method for over-the-air provisioning of a vehicle's operational settings. The method may include, for example, receiving, at a server remote to the vehicle, a request for operational settings data; in response to receiving said request, transmitting operational settings data from the server to the vehicle; receiving, at a component of the vehicle, the operational settings data; storing, in a memory of the component, the operational settings data, the operational settings data including executable software instructions; and executing, at a processor of the component, the executable software instructions of the operational settings data to cause the component to operate according to an operational setting corresponding to the operational settings data.

In some implementations, receiving the request for operational settings data at the server includes receiving the request from the vehicle or a user.

In some implementations, the method can further include receiving, at the server, a first request from a user for operational settings options; and in response to receiving said first request, transmitting to the user, operational settings options from the server to the user.

In some implementations, the method can further include in response to receiving, at the server, the request for operational settings data, determining whether operational settings data are available.

In some implementations, the method can further include in response to receiving, at the server, the request for operational settings data, determining a status of current operational settings data of the vehicle.

In some implementations, determining the status of the operational settings data of the vehicle includes querying the vehicle for data relating to its current operational settings data; determining operational settings data that are accessible to the server and available for the vehicle; and comparing the operational settings data accessible to the server with the current operational settings data of the vehicle.

In some implementations, determining the status of the operational settings data of the vehicle includes accessing a history log of download event information to determine the current operational settings data of the vehicle; determining operational settings data that are accessible to the server and available for the vehicle; and comparing the operational settings data accessible to the server with the current operational settings data of the vehicle.

The present disclosure provides a method for over-the-air provisioning of a vehicle's operational settings. The method can include, for example, detecting, by a first component of the vehicle, a second component of the vehicle; determining, by the first component, an operational incompatibility between the first and second components; transmitting, by the first component, a request for operational settings data to a server remote to the vehicle; receiving, from the server, operational settings data at the first component; updating executable software instructions of the first component according to the operational settings data; and executing the updated executable software instructions to cause the first component to operate according to an operational setting corresponding to the operational settings data to render the first component compatible with the second component.

In some implementations, the first component of the vehicle includes one or more of an energy storage device, an energy generation system, a vehicle management system, a motor or a component interface device.

In some implementations, the method can further include in response to receiving, at the server, the request for operational settings data, determining, by the server, whether operational settings data are available.

In some implementations, the method can further include in response to receiving, at the server, the request for operational settings data, determining, by the server, a status of current operational settings data of the vehicle.

In some implementations, determining the status of the operational settings data of the vehicle includes querying the vehicle for data relating to its current operational settings data; determining operational settings data that are accessible to the server and available for the vehicle; and comparing the operational settings data accessible to the server with the current operational settings data of the vehicle.

The present disclosure provides a system for over-the-air provisioning of a vehicle's operational settings. The system can include, for example, a roller configured to contact a wheel of the vehicle, the roller configured to rotate in response to a rotation of the wheel when the roller is in contact with the wheel; an actuator configured to apply a first force to the roller to cause the roller to contact the wheel of the vehicle with a second force; a generator rotatably coupled with the roller and configured to generate an electrical output in response to a rotation of the roller; and an interface device in communication with the actuator. The interface device may include a transceiver configured to communicate wirelessly with a remote server to receive operational settings data from the server; a memory including executable software instructions and configured to update the software instructions in response to receiving operational settings data from the server; and a processor configured to execute the software instructions to cause the actuator to operate according to the operational settings data received from the server.

In some embodiments, the operational settings data includes operational settings for adjusting the first force, and the actuator can be configured to adjust the first force applied to the roller according to the operational settings data.

In some embodiments, the operational settings include conditions for adjusting the first force, and the conditions can include an air pressure of the wheel, a vertical motion of the wheel, a velocity of the vehicle, a rotational velocity of the wheel, an acceleration of the vehicle, or an amount of electrical output generated at the generator.

In some embodiments, the actuator is configured to increase, according to the operational settings data, the first force applied to the roller in response to a vertical motion of the wheel exceeding a threshold.

In some embodiments, the actuator is configured to increase, according to the operational settings data, the first force applied to the roller in response to an air pressure of the wheel falling below a threshold.

In some embodiments, the actuator is configured to increase, according to the operational settings data, the first force applied to the roller in response to an electrical output of the generator falling below a threshold.

In some embodiments, the operational settings data includes operational settings for changing a position of the roller, and the actuator can be configured to change the position of the roller according to the operational settings data.

In some embodiments, the operational settings include conditions for adjusting the position of the roller, and the conditions can include an air pressure of the wheel, a vertical motion of the wheel, a velocity of the vehicle, a rotational velocity of the wheel, an acceleration of the vehicle, or an amount of electrical output generated at the generator.

In some embodiments, the roller positions include an extended position in which the roller is in contact with the wheel, and a retracted position in which the roller is a distance from the wheel.

In some embodiments, the actuator is configured to transition the roller, according to the operational settings data, to a retracted position in response to a vertical motion of the wheel exceeding a threshold.

In some embodiments, the actuator is configured to transition the roller, according to the operational settings data, to a retraced position in response to an air pressure of the wheel falling below a threshold.

In some embodiments, the actuator is configured to transition the roller, according to the operational settings data, to a retraced position in response to an electrical output of the generator falling below a threshold.

In some embodiments, the actuator applies the first force to the roller via one or more of a flexible arm, a mechanical spring, a gas spring, a piston, a suspension system, a shaft, a strut, hydraulics, pneumatics, a lever, a gear, or a pulley.

The present disclosure provides a method for over-the-air provisioning of a vehicle's operational settings. The method can include, for example, rotating a roller in response to a rotation of a wheel of the vehicle when the roller is in contact with the wheel; applying, via an actuator, a first force to the roller to cause the roller to contact the wheel of the vehicle with a second force; generating, via a generator rotatably coupled with the roller, an electrical output in response to a rotation of the roller; receiving, at an interface device of the vehicle, operational settings data from a remote server; storing, in a memory of the interface device, the operational settings data, the operational settings data including executable software instructions; and executing, at a processor of the interface device, the executable software instructions of the operational settings data to cause the actuator to operate according to the operational settings data received from the server.

In some implementations, the operational settings data includes operational settings for adjusting the first force, and the method can further include adjusting, via the actuator, the first force applied to the roller according to the operational settings data.

In some implementations, the operational settings include conditions for adjusting the first force, and the conditions can include an air pressure of the wheel, a vertical motion of the wheel, a velocity of the vehicle, a rotational velocity of the wheel, an acceleration of the vehicle, or an amount of electrical output generated at the generator.

In some implementations, the operational settings data includes operational settings for changing a position of the roller, the method can further include changing, via the actuator, the position of the roller according to the operational settings data.

In some implementations, the operational settings include conditions for adjusting the position of the roller, and the conditions can include an air pressure of the wheel, a vertical motion of the wheel, a velocity of the vehicle, a rotational velocity of the wheel, an acceleration of the vehicle, or an amount of electrical output generated at the generator.

In some implementations, the roller positions include an extended position in which the roller is in contact with the wheel, and a retracted position in which the roller is a distance from the wheel.

The present disclosure provides a device for over-the-air provisioning of a vehicle's operational settings. The device can include, for example, a transceiver configured to communicate wirelessly with a remote server to receive operational settings data from the server; a memory including executable software instructions and configured to update the software instructions in response to receiving operational settings data from the server; and a processor configured to execute the software instructions to cause an actuator to operate according to the operational settings data received from the server. The actuator can be configured to apply a first force, according to the operational settings data, to a roller to cause the roller to contact a wheel of the vehicle with a second force. The roller can be configured to rotate in response to a rotation of the wheel when the roller is in contact with the wheel. The actuator can be configured to transition the roller, according to the operational settings data, from a first position to a second position.

In some implementations, the operational settings data includes one or more conditions for adjusting the first force, and the processor can be further configured to execute the updated software instructions to cause the actuator to adjust the first force applied to the roller according to the one or more conditions of the operational settings data.

In some implementations, the one or more conditions include an air pressure of the wheel, a vertical motion of the wheel, a velocity of the vehicle, a rotational velocity of the wheel, an acceleration of the vehicle, or an amount of electrical output generated by a generator in response to a rotation of the roller.

In some implementations, the processor is further configured to execute the updated software instructions to cause the actuator to increase, according to the operational settings data, the first force applied to the roller in response to a vertical motion of the wheel exceeding a threshold.

In some implementations, the processor is further configured to execute the updated software instructions to cause the actuator to increase, according to the operational settings data, the first force applied to the roller in response to an air pressure of the wheel falling below a threshold.

In some implementations, the processor is further configured to execute the updated software instructions to cause the actuator to increase, according to the operational settings data, the first force applied to the roller in response to an electrical output generated by a generator falling below a threshold.

In some implementations, the operational settings data includes one or more conditions for changing a position of the roller, wherein the processor is further configured to execute the updated software instructions to cause the actuator to change the position of the roller according to the one or more conditions of the operational settings data.

In some implementations, the operational settings include conditions for adjusting the position of the roller, wherein the one or more conditions include an air pressure of the wheel, a vertical motion of the wheel, a velocity of the vehicle, a rotational velocity of the wheel, an acceleration of the vehicle, or an amount of electrical output generated by a generator in response to a rotation of the roller.

In some implementations, the roller positions include an extended position in which the roller is in contact with the wheel, and a retracted position in which the roller is a distance from the wheel.

In some implementations, the processor is further configured to execute the updated software instructions to cause the actuator to transition the roller, according to the operational settings data, to a retracted position in response to a vertical motion of the wheel exceeding a threshold.

In some implementations, the processor is further configured to execute the updated software instructions to cause the actuator to transition the roller, according to the operational settings data, to a retraced position in response to an air pressure of the wheel falling below a threshold.

In some implementations, the processor is further configured to execute the updated software instructions to cause the actuator to transition the roller, according to the operational settings data, to a retraced position in response to an electrical output generated by a generator falling below a threshold.

In some implementations, the actuator is configured to apply the first force to the roller via one or more of a flexible arm, a mechanical spring, a gas spring, a piston, a suspension system, a shaft, a strut, hydraulics, pneumatics, a lever, a gear, or a pulley.

Disclosed herein is a vehicle management system for over-the-air provisioning of a vehicle's operational settings. The vehicle management system may comprise: a transceiver, a computer readable storage medium having program instructions embodied therewith, and a processor. The transceiver can be configured to communicate wirelessly with a remote server to receive operational settings data from the server. The computer readable storage medium can be configured to update the program instructions according to operational settings data received from the server. The processor can be configured to execute the updated program instructions to cause the vehicle management system to operate according to an operational setting corresponding to the operational settings data received from the server. In some implementations, when operating according to the operational setting, the vehicle management system is configured to: communicate a signal to a switch to cause the switch to transition between an open state and a closed state to control an energy flow between a first energy storage device and a second energy storage device. In some implementations, in the closed state the switch is configured to electrically couple the first energy storage device to the second energy storage device to allow an energy to transfer from the first energy storage device to the second energy storage device.

In some implementations, the first energy storage device includes a capacitor.

In some implementations, the second energy storage device includes a battery.

In some implementations, when operating according to the operational setting, the vehicle management system is further configured to: communicate the signal to the switch to cause the switch to transition between the open state and the closed state once in substantially real time as the operational settings data are received from the server.

In some implementations, when operating according to the operational setting, the vehicle management system is further configured to: communicate the signal to the switch to cause the switch to transition between the open state and the closed state every time one or more conditions occurs.

In some implementations, when operating according to the operational setting, the vehicle management system is further configured to: communicate the signal to the switch to cause the switch to transition between the open state and the closed state based at least in part on one or more of a geographic location of the vehicle, a distance travelled by the vehicle, or a distance between the vehicle and a desired destination.

In some implementations, the system may further comprise a voltage sensor in electrical communication with the first or second energy storage device. The voltage sensor can be configured to detect a voltage level of the first or second energy storage device.

In some implementations, when operating according to the operational setting, the vehicle management system is further configured to: communicate the signal to the switch to cause the switch to transition to the closed state, in response to determining that the voltage level in the second energy storage device is below a low threshold level; and cause the switch to transition to the open state, in response to determining that the voltage level in the second energy storage device is above a high threshold level.

In some implementations, when operating according to the operational setting, the vehicle management system is further configured to: communicate the signal to the switch to cause the switch to transition to the closed state, in response to determining that the voltage level in the first energy storage device is above a high threshold level, and cause the switch to transition to the open state, in response to determining that the voltage level in the first energy storage device is below a low threshold level.

In some implementations, when operating according to the operational setting, the vehicle management system is further configured to communicate the signal to the switch to cause the switch to transition to the closed state, in response to determining that a voltage differential between the first and second energy storage device is above a threshold level.

In some implementations, the system can further comprise a current sensor in electrical communication with the second energy storage device and configured to detect a current or amperage conducted from the second energy storage device to a load.

In some implementations, when operating according to the operational setting, the vehicle management system is further configured to communicate the signal to the switch to cause the switch to transition to the closed state when a current or amperage conducted from the battery to the load exceeds a threshold level.

Disclosed herein is a computing system for over-the-air provisioning of a vehicle's operational settings. The computing system can comprise: a computer readable storage medium having program instructions embodied therewith; and one or more processors configured to execute the program instructions. The one or more processors can be configured to execute the program instructions to cause the computing system to receive information relating to an operation or status of the vehicle and in response to receiving said information, wirelessly transmit operational settings options to a user. The one or more processors can be configured to execute the program instructions to cause the computing system to receive, from the user, a selection of one or more of the operational settings options. The one or more processors can be configured to execute the program instructions to cause the computing system to in response to receiving a user selection, wirelessly transmit, to the vehicle, operational settings data corresponding to the one or more operational settings selected by the user, wherein the operational settings data are configured, when executed, to cause the vehicle to operate according to the one or more operational settings selected by the user.

In some implementations, the one or more processors are further configured to execute the program instructions to cause the computing system to maintain a history log including information relating to transmitting the operational settings data to the vehicle.

In some implementations, the one or more processors are further configured to execute the program instructions to cause the computing system to update generate a charge to the user in response to transmitting the operational settings data to the vehicle.

In some implementations, wirelessly transmitting operational settings options to the user includes transmitting the operational settings options to a mobile device via a text message.

In some implementations, wirelessly transmitting operational settings options to the user includes transmitting the operational settings options to a control dashboard of the vehicle.

In some implementations, receiving the selection of one or more of the operational settings options from the user includes receiving a text message from a mobile device.

In some implementations, the information relating to the operation or status of the vehicle includes one or more of a charge level of a battery of the vehicle, an estimated remaining operating time of the vehicle, an estimated remaining operating distance of the vehicle, a distance travelled by the vehicle, a distance between the vehicle and a desired destination, a geographic location of the vehicle, or a geographic location of a desired destination.

In some implementations, the operational settings data are configured, when executed, to cause an energy generation system of the vehicle to operate according to the one or more operational settings selected by the user.

In some implementations, the operational settings data are configured, when executed, to cause an energy management system of the vehicle to operate according to the one or more operational settings selected by the user.

Disclosed herein is an energy system for storing and providing energy to a vehicle. The energy system may comprise: a capacitor storage device, and an energy storage device. The capacitor storage device can be configured to receive a first portion of energy from an energy source. The capacitor storage device can be configured to store the first portion energy as an electric field of the capacitor storage device. The capacitor storage device can be configured to convey the first portion energy to a battery storage device or to an electrical load of the vehicle. The energy storage device can be configured to receive a second portion of energy from an energy source. The energy storage device can be configured to store the second portion of energy. The energy storage device can be configured to convey the second portion energy to the battery storage device or to the electrical load of the vehicle. The energy storage device can have a higher amp-hour rating than the capacitor storage device. The energy storage device can have a lower voltage rating than the capacitor storage device.

In some implementations, the energy storage device includes one or more cells electrically connected in parallel.

In some implementations, the capacitor storage device includes one or more cells electrically connected in series.

In some implementations, the energy storage device has a higher C rating than the capacitor storage device.

In some implementations, the energy storage device is configured to discharge a greater continuous current or burst current than the capacitor storage device.

In some implementations, the energy storage device includes one or more capacitors.

In some implementations, the energy storage device includes one or more batteries.

In some implementations, the energy storage device is removably electrically coupled with the battery via a mechanical connection.

In some implementations, the energy storage device is coupled with the battery via a friction fit.

Disclosed herein is a system for managing energy storage. The system can comprise a capacitor storage device, a battery, a switch, and a controller. The capacitor storage device can be configured to receive a first portion of energy from an energy source. The capacitor storage device can be configured to store the first portion energy as an electric field of the capacitor storage device. The battery can be configured to electrically couple to the capacitor storage device. The battery can be configured to receive energy from the capacitor storage device via one or more diodes biased toward the battery. The switch can be configured to transition between an open state and a closed state. The switch can be configured to electrically couple the battery to the ultracapacitor when in the closed state to conduct an energy between the ultracapacitor and the battery. The switch can be configured to electrically disconnect the battery from the ultracapacitor when in the open state to prevent conducting an energy between the ultracapacitor and the battery. The controller may be in electrical communication with the switch and may be configured to cause the switch to transition between the open state and the closed state.

In some implementations, the energy source includes is one or more solar panels or solar cells.

In some implementations, the energy source includes a turbine.

In some implementations, the energy source includes is a generator.

In some implementations, the energy source includes is a charging station.

In some implementations, the energy source is disposed on a housing of a vehicle.

DETAILED DESCRIPTION

Overview

Figure 1A:
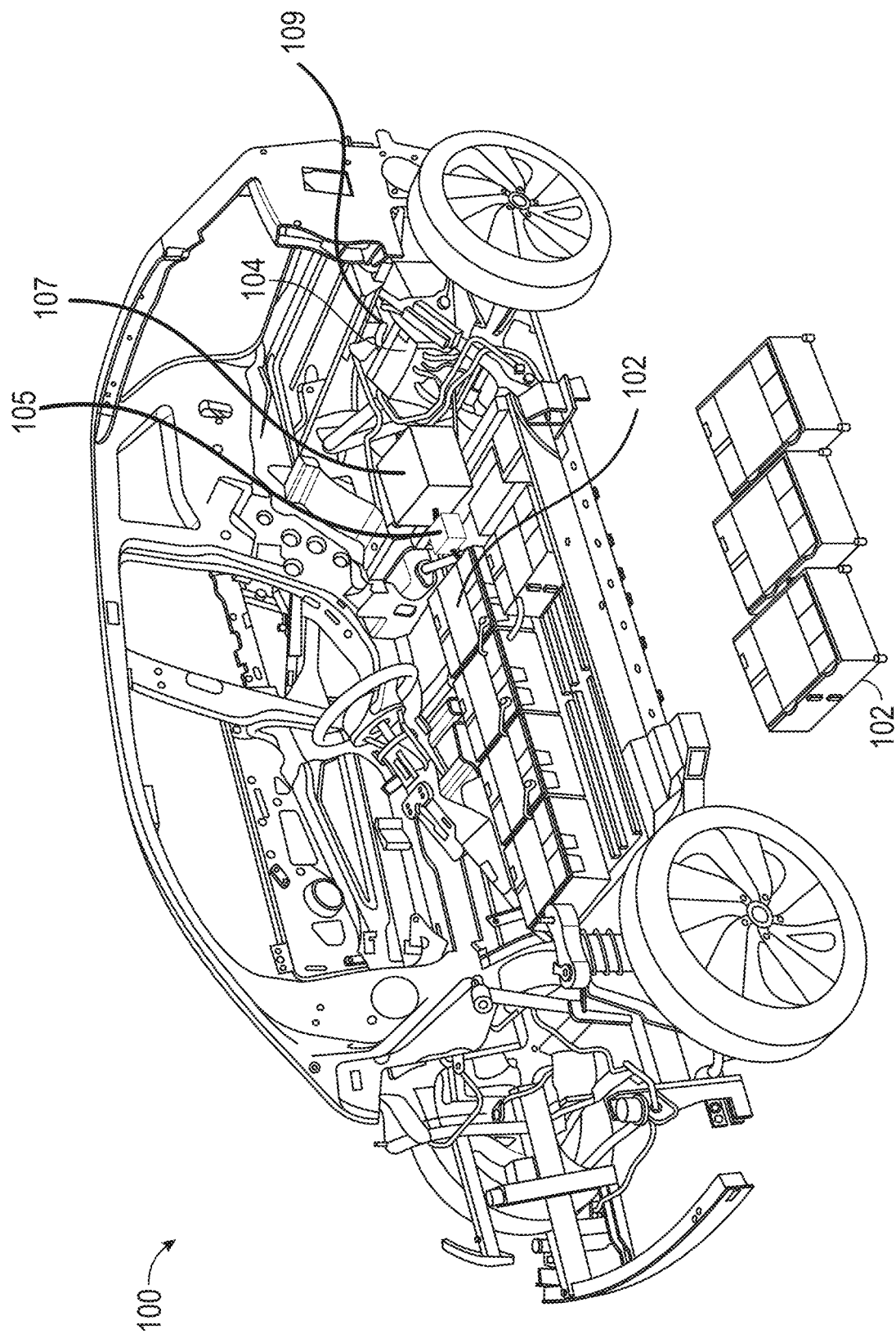
FIG. 1A illustrates an example vehicle such as an electric vehicle that may be provisioned according to over-the-air systems and methods described herein.

Example systems and methods for over-the-air provisioning of a vehicle's operational settings are described herein. A system for over-the-air provisioning of a vehicle's operational settings can include a server remote to the vehicle which can include or have access to operational settings data. The server can transmit (e.g., wirelessly) the operational settings data to the vehicle. Operational settings data can affect how a vehicle or its components function.

Various methods exist for transmitting operational settings data to a vehicle (e.g., from a remote server). Operational settings data can be transmitted to the vehicle in response to a request (e.g., from the vehicle or its components, or from a user), automatically such as on a periodic basis, anytime operational settings data (updated or new) are available for the vehicle or anytime updated or new operational settings data are required or desired for improving performance of a vehicle or its components.

Various example systems and methods for over-the-air provisioning of an electric vehicle's operational settings are described herein, for example, with reference to the figures. The various systems, methods and their implementations are given as examples and are not meant to be limiting of the present disclosure.

In some implementations, Vehicle Components may refer to any of the components of a vehicle such as an energy storage device (e.g., battery, capacitor), an energy generation system (e.g., a generator), a motor, a vehicle management system, a component interface device, driven masses, rollers, flexible arms, suspension systems (e.g., of driven masses and/or rollers), etc. The vehicle components may operate according to operational settings and may be provisioned over-the-air.

In some implementations, Operational Settings may refer to any of the various settings according to which a vehicle or its components may operate.

In some implementations, (Operational) Settings Data may refer to data for provisioning the operational functionality of a vehicle or its components. Settings data may include executable software instructions or files including the same. In some embodiments, operational settings data can include program instructions that when executed cause a vehicle component to perform one or more operations one time (e.g., a one-time operation). In some embodiments, operational settings data can include program instructions that when executed cause a vehicle component to perform one or more operations a multiple times, repeatedly, indefinitely, every time one or more conditions occurs, or the like. In some embodiments, operational settings data may include program instructions that when executed cause a vehicle component to perform one or more operations immediately (e.g., in substantially real-time as when the settings data are received at the component). In some embodiments, operational settings data may include program instructions that when executed cause a vehicle component to perform one or more operations at a future time (e.g., at a time after the settings data are received at the component).

In some implementations, Operational Settings Options may refer to any of the various operational settings that may be available to a vehicle for download and which a user may review and select.

In some implementations, Operational Settings Server (OSS) may refer to a server, remote to a vehicle, that may communicate with the vehicle. The OSS may be configured to store various operational setting data that can be downloaded to a vehicle.

In some implementations, User may refer to a person or entity that may be associated with a vehicle and may communicate with the OSS for requesting operational settings data to be downloaded to the vehicle.

In some implementations, Vehicle Management System may refer to a system or device for controlling or managing the operational functionality of a vehicle or its components. The vehicle management system may communicate with the OSS and may manage the provisioning of the vehicle such as requesting, downloading, storing operational settings data. The vehicle management system may comprise and/or may be referred to herein as a battery management system. The vehicle management system may include a processor or other similar computing device.

In some implementations, Component Interface Device may refer to a device or system electrically coupled to two or more components of a vehicle that may act as an interface between the components to allow the components to operate with each other in the vehicle. In some embodiments, the component interface device may be provisioned (e.g., over-the-air) with operational settings data.

Example Systems for Over-the-Air Provisioning

FIG. 1A illustrates an example vehicle 100 such as an electric vehicle that may be provisioned according to over-the-air systems and methods described herein. As shown, the vehicle 100 can include various components such as a motor 104, a generation system 109 (e.g., a generator), a vehicle management system 107 (such as a battery management system), a component interface device 105, one or more energy storage devices 102 (e.g., batteries, deep-cycle batteries, battery fields, capacitors, ultracapacitors, hypercapacitors) and the like. As shown, the energy storage devices 102 may be added to, or removed from, the vehicle, for example in a modular fashion. In some embodiments, energy storage devices 102 may be replaced with energy storage devices of a different type of device (such as switching a battery to a capacitor) or to energy storage devices of the same type but of a different make or model (such as switching a battery from one manufacturer to a battery of a different manufacturer). In some embodiments, energy storage devices 102 used in a vehicle at one time may include devices of different types or makes or models. Some or all of the various components may be provisioned (e.g., over-the-air) as described herein. FIG. 1A is provided as an example and is not intended to be limiting. In some embodiments, the components may be arranged in a different manner (e.g., different locations in the vehicle) than what is shown in FIG. 1A. In some embodiments, the vehicle may include more or less components or different types of components than what is shown in FIG. 1A.

In some embodiments, the one or more energy storage devices 102 may include one or more capacitor modules in combination with one or more batteries. For example, the one or more energy storage devices 102 may include one or more capacitor modules installed alongside one or more batteries may be connected in series or in parallel. For example, a capacitor module may be connected in series or parallel with a battery when supplementing the voltage in the battery or when charging the battery. Therefore, the battery and the capacitor modules may provide voltage support to each other. As such, the capacitor modules may provide supplemental energy when the battery are discharged or be used in place of the battery altogether.

In some embodiments, the capacitor modules provide a burst of energy on demand to the battery and/or to the motor. For example, the capacitor modules are coupled to the vehicle (or another) controller that monitors a charge level of the battery and/or an energy demand of the motors. The controller may control coupling of the capacitor modules to the battery to charge the battery with the burst of energy from the capacitor modules when the charge level of the battery falls below a threshold value or may couple the capacitor modules to the battery to supplement an output energy of the battery.

Figure 1B:
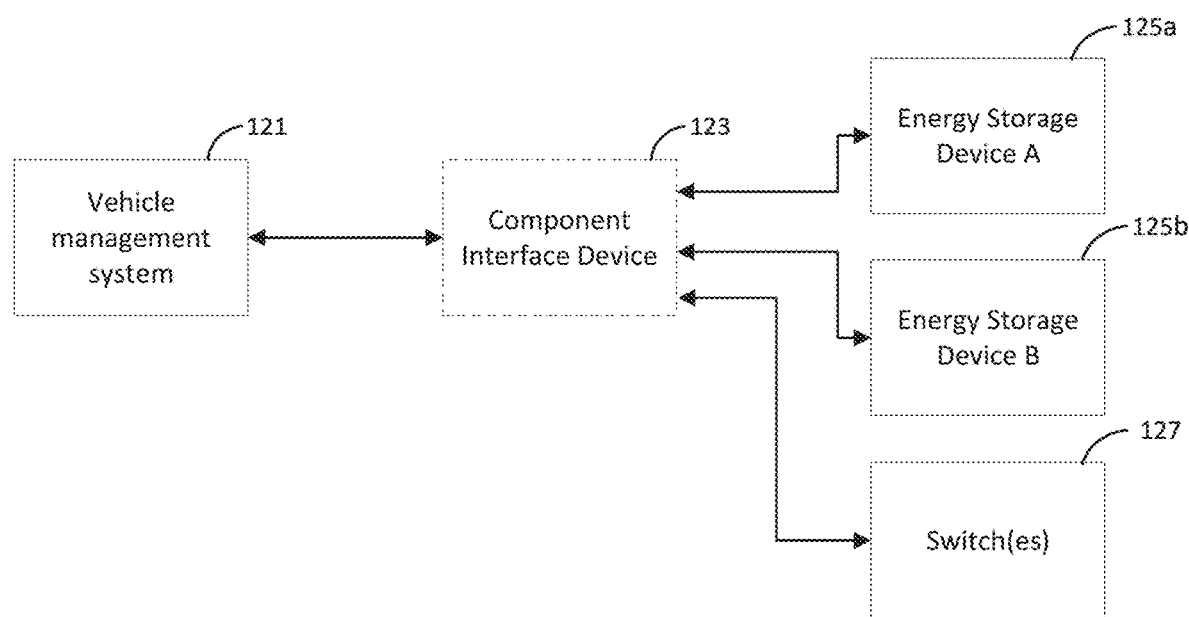
FIGS. 1B-1C are block diagrams illustrating example embodiments of a component interface device.

FIG. 1B is a block diagram illustrating an example embodiment of various components of a vehicle including a vehicle management system 121, optionally a component interface device 123 in some embodiments, one or more energy storage devices 125*a*, 125*b*, and one or more switch(es) 127.

The energy storage devices 125*a*, 125*b* can include capacitors, batteries, or the like. The switch(es) 127 can electrically couple the energy storage devices 125 to each other. The switch(es) 127 can electrically couple the energy storage devices 125 to a load. The switch(es) 127 may be configured to transition between states to allow or prevent a flow of energy therethrough.

The vehicle management system 121 may be electrically coupled to the component interface device 123 which in turn may be electrically coupled to one or more energy storage devices 125a, 125b and/or switches 127. In some implementations, vehicle management system 121 may be directly electrically coupled to one or more energy storage devices 125a, 125b and/or switches 127. The electrical coupling between the components, as described, may facilitate the communication of data between the components which may affect how the components function and function together. In some embodiments, the components may be electrically coupled via wires. In some embodiments, the components may be electrically coupled wirelessly.

The vehicle management system 121 may control operation of the one or more energy storage devices 125a, 125b. For example, the vehicle managements system 121 may determine and/or control the conditions under which the energy storage device 125 is charged, discharged, the rate of charging or discharging, the maximum or minimum charge held by the energy storage device, and may coordinate charging and discharging between multiple energy storage devices 125. The vehicle management system 121 may control operation of the energy storage devices 125 according to operational settings, such as according to operational settings data provisioned to the vehicle management system 121 over-the-air.

The vehicle management system 121 may control operation of the switch(es) 127. The vehicle management system 121 may control operation of the switch(es) 127 according to operational settings, such as according to operational settings data provisioned to the switch(es) 127 over-the-air. For example, the vehicle management system 121 may control when the switch(es) 127 transition between states to control whether the switch(es) 127 allow energy to pass through or prevent energy from passing therethrough. Accordingly, the vehicle management system 121 may control or adjust an electrically coupling between components by controlling the switch(es) 127. For example, the vehicle management system 121 may control whether the energy storage devices 125 are electrically coupled to each other by controlling transitioning of the switch(es) 127 between operative states. As another example, the vehicle management system 121 may control whether the energy storage devices 125 are electrically coupled to a load by controlling transitioning of the switch(es) 127 between operative states.

Advantageously, operational settings data used to control the energy storage devices 125 and/or switch(es) 127 may be provisioned (e.g., over-the-air to the vehicle management system 131 and/or component interface device 133). Provisioning the operational settings data may allow the operational settings to be updated such as periodically, automatically, in response to a request, and/or on demand. Updating the operational settings (e.g., via over-the-air provisioning) of the various components can improve operational efficiency and/or performance of the system by dynamically adjusting operational settings according to real-time needs and conditions. For example, operational settings data can be provisioned over-the-air to update operational settings to improve performance based on changes in energy levels of the energy storage devices 125, energy requirements of a load, operating conditions, such as temperature, geographic location, geographic destination, estimated time and/or distance to destination, or the like.

The vehicle management system 121, the energy storage devices 125a, 125b, and switch(es) 127 may each include parameters, for example, operational settings data included on the component that may be executed by a computing device to control operation of the respective components. The operational settings included on each respective component (vehicle management system 121, energy storage device 125) may have been encoded during manufacturing (e.g., manufacturer's settings) or may have been configured during an initial configuration of the component. In some embodiments, the operational settings of the vehicle management system 121, energy storage device 125, and/or and switch(es) 127 may be static and it may be impossible or difficult to change the operational settings of said components. In some embodiments, the operational settings of the components such as the vehicle management system 121, energy storage device 125, or and switch(es) 127 may be quickly updated, for example via over-the-air provisioning as described herein. In some embodiments, the components such as the vehicle management system 121, energy storage device 125, or and switch(es) 127 may only operate with certain other components (e.g., types, makes, models) based on the configuration of the operational settings. For example, the operational settings of a component may be required to be compatible with operational settings of other components for the components to function together.

A component interface device 123 may facilitate the interaction between a vehicle management system 121 and other components such as an energy storage device 125 and/or switch 127, for example in embodiments where the operational settings of the vehicle management system 121, energy storage device 125, and/or switch 127 are static and/or are not initially configured for compatible functionality with one another.

The component interface device 123 may include parameters, for example, operational settings data included on the component interface device 123 that may be executed by a computing device to control operation of the component interface device 123.

The component interface device 123 may be configured to detect an energy storage device 125 as well as a type, make or model of the energy storage device 125. For example, the component interface device 123 may be configured to determine whether the energy storage device is a battery or a capacitor as well as other characteristics of the energy storage device (e.g., make or model). The component interface device 123 may be configured to detect and determine characteristics of the vehicle management system 121. The component interface device 123 may be configured to detect and determine characteristics of the switch(es) 127.

The component interface device 123 may be configured to determine (e.g., type or characteristics of) the operational settings data included on the energy storage device 125, the vehicle management system 121, and/or the switch(es) 127, for example by parsing the operational settings data of the other components or detecting an identifier of the operational settings data such as an operational settings data tag or header included in the operational settings data and containing information relating to the characteristics of the operational settings data. The component interface device 123 may be configured to facilitate an operational compatibility between the vehicle management system 121, energy storage device 125, and/or switch(es) 127 for example in embodiments where the operational settings data of the vehicle management system 121, energy storage device 125, and/or switch(es) 127 would not otherwise be compatible.

As an example of facilitating an operational compatibility, the component interface device 123 may receive an electrical communication (e.g., via wires or wirelessly) from the vehicle management system 121, for example, including data relating to instructions to control an operation of the energy storage device 125. The component interface device 123 may determine (or may have previously determined) the operational settings data of the energy storage device 125. If the operational settings data of the energy storage device 125 is not compatible with the operational settings data of the vehicle management system 121 (e.g., such that the energy storage device 125 would not "understand" the instructions and/or data communicated from the vehicle management system 121), the component interface device 123 may "translate" the data communicated from the vehicle management system 121 to a form that is compatible with the operational settings data of the energy storage device 125, for example, by generating new data and/or altering the data received from the vehicle management system 121. The component interface device 123 may be configured to perform similar operations of translating data communicated from the energy storage device 125 to the vehicle management system 121.

The component interface device 123 may control the interacting between two components based on operational settings data of the component interface device 123. For example, the component interface device 123 may interface a vehicle management system 121 with a certain energy storage device 125a according a first operational settings data of the component interface device 123. A second energy storage device 125b may be added to the vehicle which may replace or supplement energy storage device 125b. The component interface device 123 may not be configured according to the first operational settings data to facilitate operational compatibility between the vehicle management system 121 and the energy storage device 125b. However, the component interface device 123 may be provisioned (e.g., over-the-air as described herein) with second operational settings data which may configure the component interface device 123 to facilitate operational compatibility between the vehicle management system 121 and the energy storage device 125b.

FIG. 1B is provided as an example and is not intended to be limiting. In some embodiments, the component interface device 123 may be configured, e.g., according to one or more sets of operational settings data, to facilitate operational compatibility between the vehicle management system 121 and any number of energy storage devices 125, such as one energy storage device 125 or more than two energy storage devices 125. In some embodiments, the component interface device 123 may be configured, e.g., according to one or more sets of operational settings data, to facilitate operational compatibility between the vehicle management system 121 and a variety of different types, makes and/or models of energy storage devices 125 such as capacitors, batteries, and/or other energy storage devices described herein.

The example components discussed above with reference to FIG. 1B are not intended to be limiting. In some embodiments, the component interface device 123 may facilitate an operational compatibility between any two components such as, for example, between any combination of the following components: energy storage devices, switches, energy generation systems, motors, vehicle management systems, other component interface devices, and the like.

Figure 1C:
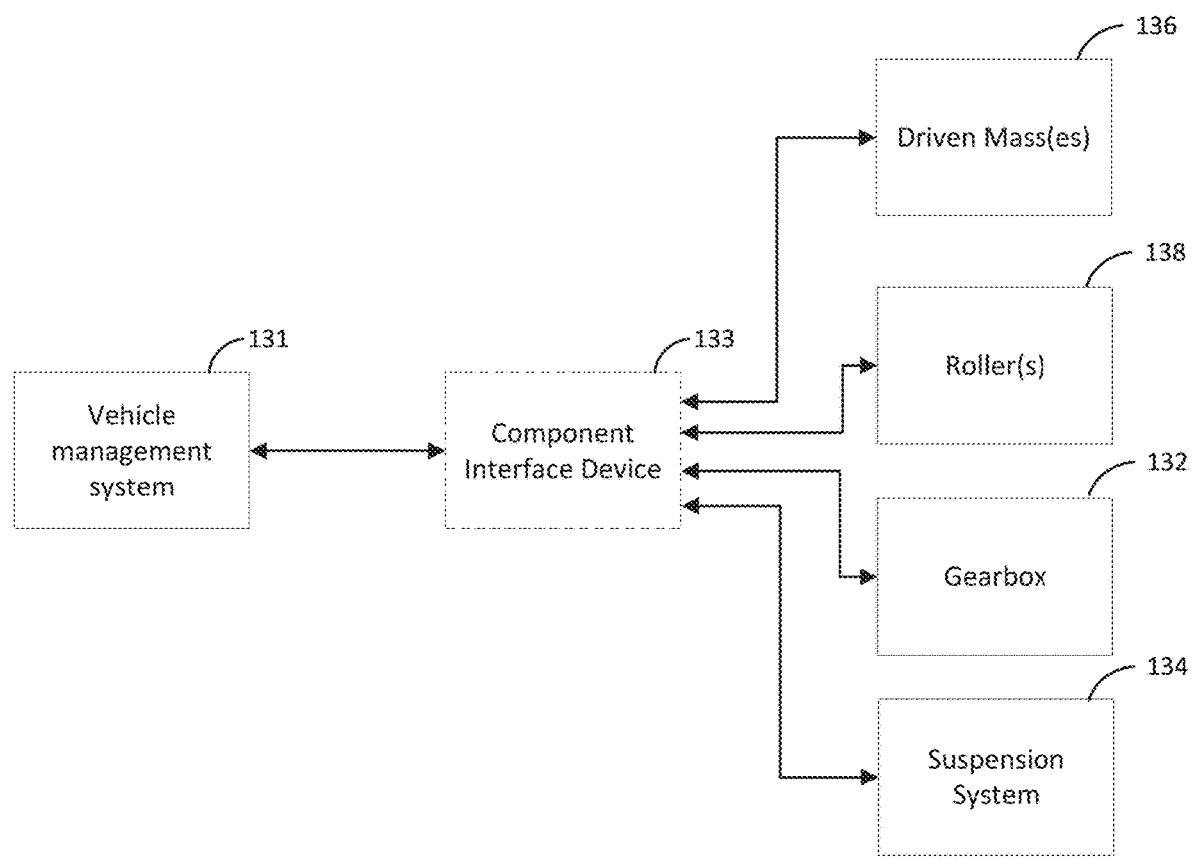

FIG. 1C is a block diagram illustrating an example embodiment of various components of a vehicle including a vehicle management system 131, optionally a component interface device 133 in some embodiments, one or more driven masses 136, one or more rollers 138, a gearbox 132, and a suspension system 134. The vehicle management system 131 and component interface device 133 may include structural and/or operational features similar to those discussed with reference to FIG. 1B, for example.

The driven mass(es) 136 can include one or more rollers, one or more fifth wheels, and/or one or more turbines, such as a water or wind turbine. In some implementations, a roller, a driven mass, a fifth wheel, and/or a turbine may include similar structural and/or operational features. In some implementations, the terms "roller", "driven mass", "fifth wheel", and/or "turbine" may be used interchangeably.

The vehicle management system 131 is in communication with the component interface device 133. The component interface device 133 is in communication with one or more driven masses 136, the roller(s) 138, the gearbox 132, and the suspension system 134. In some implementations, the vehicle management system 131 is in direct communication with the one or more driven masses 136, the roller(s) 138, the gearbox 132, and the suspension system 134. In some embodiments, the vehicle management system 131 and/or component interface device 133 may be provisioned (e.g., over-the-air) with operational settings data to control an operation of the one or more driven masses 136, the one or more rollers 138, the gearbox 132, and/or the suspension system 134.

As an example, the vehicle management system 131 and/or component interface device 133 may control, according to operational settings data, a position of the driven mass(es) 136 relative to a ground surface and/or a position of the roller(s) 138 relative to a wheel of the vehicle. As another example, the vehicle management system 131 and/ or component interface device 133 may control, according to operational settings data, a force with which the driven mass(es) 136 are applied to a ground surface and/or a force with which the roller(s) 138 are applied to a wheel such as via one or more actuators. Adjusting (e.g., increasing) a force with which the driven mass(es) 136 and/or roller(s) are applied to a ground surface and/or a wheel of the vehicle may improve contact of the driven mass(s) 136 and/or rollers with the ground and/or wheel, such as on uneven terrain.

As another example, the vehicle management system 131 and/or component interface device 133 may control, according to operational settings data, the gearbox 132. The gearbox may rotatably couple the driven mass(es) 136 and/or roller(s) 138 to a generator. The gearbox 132 may include one or more gears of various diameters. The vehicle management system 131 and/or component interface device 133 may control a ratio of rotation between a driven mass 136 and/or roller 138 rotatably coupled to the gearbox 132 and a generator rotatably coupled to the gearbox 132. The operational settings according to which the vehicle management system 131 and/or component interface device 133 controls the gearbox 132 may determine the conditions under which the gearbox 132 adjusts a ratio of rotation.

As another example, the vehicle management system 131 and/or component interface device 133 may control, according to operational settings data, the suspension system 134. The suspension system 134 may house the driven mass(es) 136 and/or roller(s) 138. The suspension system 134 may be independent of a suspension system of the vehicle. The suspension system 134 may operate to transition the driven mass(es) 136 and/or roller(s) 138 between engaged/disengaged states and/or extended/retracted states. In some implementations, the engaged state and the extended state may include similar operational features. In some implementations, the disengaged state and the retracted state may include similar operational features. In some implementations, the term "engaged state" and the term "extended state" may be used interchangeably. In some implementations, the term "disengaged state" and the term "retracted state" may be used interchangeably. The vehicle management system 131 and/or component interface device 133 may control whether the suspension system 134 transitions between states. The operational settings according to which the vehicle management system 131 and/or component interface device 133 controls the suspension system 134 may determine the conditions under which the suspension system 134 transitions between states.

Advantageously, operational settings data used to control the driven mass(es) 136, roller(s) 138, gearbox 132, and/or suspension system 134 may be provisioned (e.g., over-the-air to the vehicle management system 131 and/or component interface device 133). Provisioning the operational settings data may allow the operational settings to be updated such as periodically, automatically, in response to a request, and/or on demand. Updating the operational settings (e.g., via over-the-air provisioning) of the various components can improve operational efficiency and/or performance of the system by dynamically adjusting operational settings according to real-time needs and conditions. For example, operational settings data can be provisioned over-the-air to update operational settings to improve performance based on changes in a terrain surface on which the vehicle travels, changes in wheels used on the vehicle, changes in a pressure of the vehicle wheels and/or driven mass(es) 136, or the like.

FIG. 1C is given as an example and is not intended to be limiting. In some embodiments, the component interface device 133 may be in communication with one or more components, devices, or systems associated with the driven mass(es) 136 and/or roller(s) 138. For example, the component interface device 133 may in communication with a suspension system, a flexible arm (e.g., of a roller), a shaft, an actuator, a piston, a gear, a lever, a pulley, a spring, or the like to effectuate control of the driven mass(es) 136 and/or roller(s) 138, such as a position or applied force thereof.

Figure 1D:
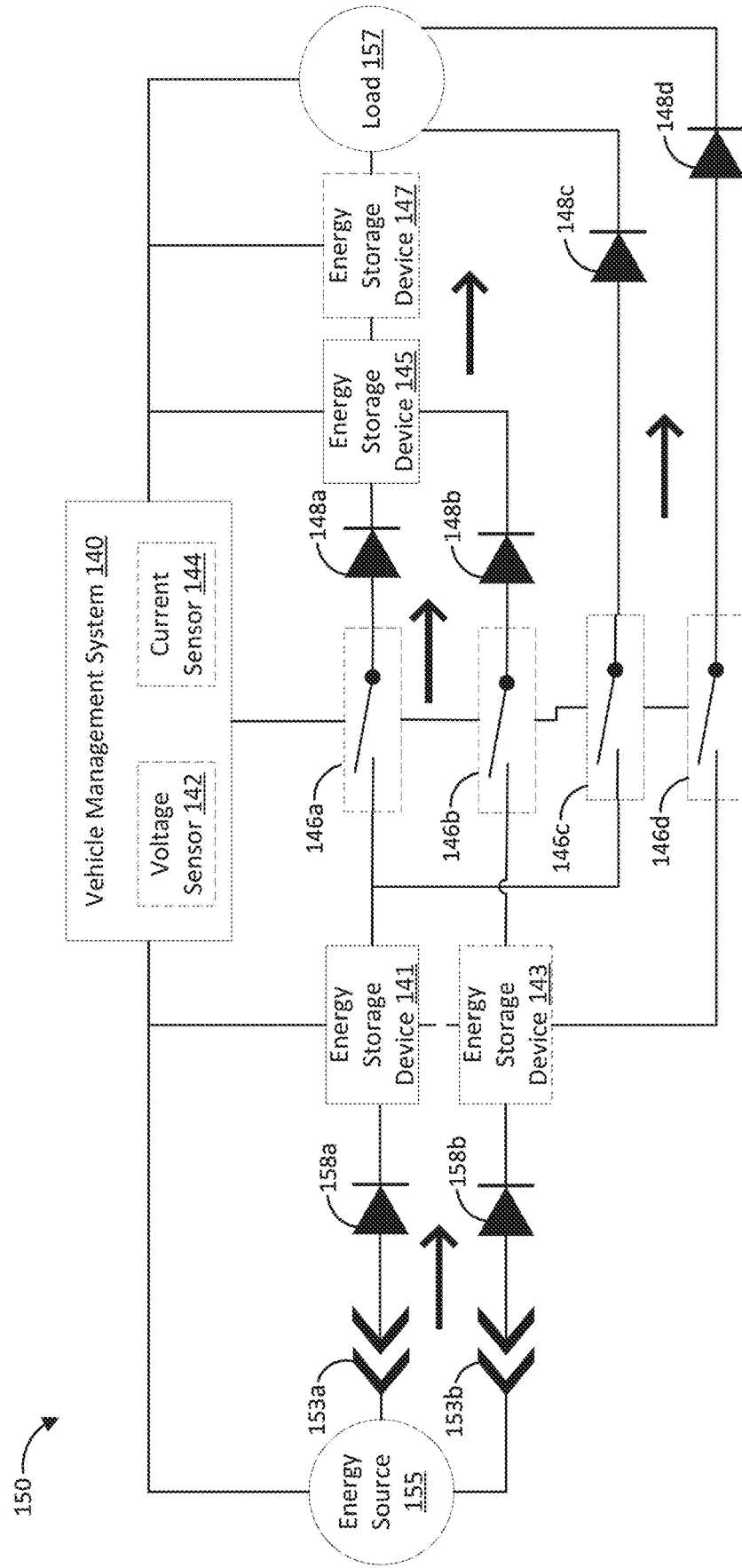
FIG. 1D is a block diagram illustrating an example implementation of a vehicle management system with a capacitor module and battery.

FIG. 1D is a block diagram illustrating an example embodiment of an energy system 150 for providing and storing energy. In this example, the energy system 150 includes a vehicle management system 140, an energy source 155, one or more electrical interfaces 153 (e.g., 153a, 153b), energy storage device 141, energy storage device 145, and a load 157. In some implementations, the energy system 150 can optionally include energy storage device 143. In some implementations, the energy system 150 can include a plurality of energy storage devices 143. In some implementations, the energy system 150 can optionally include one or more diodes, such as diode 158a, diode 158b, diode 148a, diode 148b, diode 148c, and/or diode 148d. In some implementations, the energy system 150 can optionally include one or more switches, such as switch 146a, switch 146b, switch 146c, and/or switch 146d. In some implementations, the energy system 150 can optionally include energy storage device 147.

In some embodiments, the energy source 155 can include a power grid or Mains electricity. In some embodiments the energy source 155 can include an energy generation or regeneration system. For example, the energy source 155 can include one or more of: a generator, a driven mass, a fifth wheel, a roller, a turbine such as a water and/or wind turbine, a regenerative braking system, a solar power generation system such as solar panels or solar cells. In some implementations, the energy source 155 may be included within a vehicle. For example, the energy source 155 may include an on-board power generation system disposed within and/or on a vehicle and that is mobile with the vehicle. In some implementations, the energy source 155 may be separate from a vehicle. For example, the energy source 155 may be stationary or in a fixed location such as a charging station.

The energy storage device 141 can be electrically coupled to the energy source 155 via an electrical interface 153a. For example, the energy storage device 141 can be removably coupled (electrically, physically) with the energy source 155 via the electrical interface 153a. The electrical interface 153a can include a plug and/or a socket such as a standard 110 volt outlet wall socket configured to receive an electrical plug. The energy storage device 141 can be electrically coupled with the energy source 155 via one or more electrical wires, cables, or cords. The energy storage device 143 can be electrically coupled to the energy source 155 via an electrical interface 153b in a same or similar manner as described above with respect to energy storage device 141 and electrical interface 153a.

The energy storage device 141 can be electrically coupled with the energy source 155 via a diode 158a. The diode 158a can be biased toward the capacitor module and configured to allow an energy (e.g., a current or amperage) to flow from the energy source 155 to the energy storage device 141. The diode 158a may prevent an energy from flowing from the energy storage device 141 to the energy source 155. Advantageously, the diode 158a may facilitate retaining an energy at the energy storage device 141 when the energy storage device 141 has a higher energy level (e.g., higher voltage) than the energy source energy source 155, such as during a power outage and/or when a power generation system is not producing energy. In some embodiments, more than one diode may be disposed between the energy source 155 and the energy storage device 141. The energy storage device 143 can be electrically coupled with the energy source 155 via a diode 158b in a same or similar manner as described above with respect to energy storage device 141 and diode 158a.

The energy storage device 141 can include one or more capacitors, ultracapacitors, and/or supercapacitors. A plurality of capacitors in the energy storage device 141 can be electrically connected in series and/or parallel. In some embodiments, the energy storage device 141 can be configured to store up to 400 volts of electrical energy. For example, the energy storage device 141 may store about 100 to 200 volts, about 200 to 300 volts, or about 300 to 400 volts. In some embodiments, the energy storage device 141 can be configured to store less than 100 volts such as about 50 volts or about 25 volts.

The switch 146a can include one or more of an electrical switch, a relay, or the like. The switch 146a can operate according to one or more states including an open state and a closed state. In the closed state, the switch 146a can conduct energy (e.g., current or amperage) such as from the energy storage device 141 to the energy storage device 145. In the open state, the switch 146a may not conduct energy (e.g., from the energy storage device 141 to the energy storage device 145). The switch 146a may transition between the open and closed states. In some embodiments, the switch 146a transitions between the open and closed states automatically, such as in response to a signal from the vehicle management system 140.

The switch 146a is electrically coupled with the energy storage device 145. As shown, the switch 146a is electrically coupled to the energy storage device 145 via diode 148*a*. In some embodiments, the energy system 150 may not include diode 148*a*.

In some embodiments, the energy storage device 145 may be electrically coupled to the switch 146*a* (and/or energy storage device 141) via one or more electrical wires, cables, cords, or the like, which may be configured to withstand high voltages (e.g., 400 volts) and/or high amperage (e.g., 400 amperes). The energy storage device 145 may be electrically coupled to the energy storage device 141 via one or more electrical connectors, such as a plug, a socket, or the like. The energy storage device 145 and the energy storage device 141 may be removably coupled via the electrical connectors.

When the switch is in the closed state, energy may transfer from the energy storage device 141 to the energy storage device 145, such as via the diode 148*a*. The energy storage device 141 can be electrically connected with the energy storage device 145 in series and/or parallel. When a voltage differential between energy storage device 141 and the energy storage device 145 exceeds a certain threshold, energy may be amenable to flow from the energy storage device 141 to the energy storage device 145. For example, in some embodiments, the diode 148*a* may be configured with a certain resistance preventing current from passing through the diode 148*a* until a threshold voltage across the diode 148*a* is achieved. As the voltage differential across the diode 148*a* (e.g., between the energy storage device 141 and energy storage device 145) increases, the diode 148*a* may "open" to allow a current to pass in a single direction through the diode 148*a*.

The switch 146*b* may include similar or the same operational and/or structural features as described above with respect to switch 146*a*. The energy storage device 143 may transfer energy to the energy storage device 145 via the switch 146*b* in a same or similar manner as described above with respect to energy storage device 141 transferring energy to energy storage device 145 via switch 146*a*.

The energy storage device 145 can include one or more batteries such as lithium ion batteries, lithium polymer batteries, and/or batteries that include one or more other materials for storing energy, such as zinc, carbon, magnesium, manganese, mercury, alkaline, silver, nickel, metal hydride, cadmium, lead, and the like. In some embodiments, the energy storage device 145 can include a battery field. In some embodiments, the energy storage device 145 can include. In some embodiments, energy storage device 145 can be configured to store up to 400 volts of electrical energy. For example, the energy storage device 145 may store about 100 to 200 volts, about 200 to 300 volts, or about 300 to 400 volts. In some embodiments, the energy storage device 145 can be configured to store less than 100 volts such as about 50 volts or about 25 volts. In some embodiments, the energy storage device 145 may comprise a plurality of batteries, such as a battery field. The plurality of batteries may be electrically connected to one another in series and/or in parallel.

In some implementations, the energy storage device 145 is electrically coupled with energy storage device 147. In some implementations, the energy storage device 145 is directly electrically coupled to the load 157.

In some implementations, the energy storage device 145 may be structurally and/or functionally similar or the same as energy storage device 147. In some implementations, the energy storage device 145 may be structurally and/or operationally different from energy storage device 147. For example, energy storage device 145 and energy storage device 147 each be configured to store a different amount of energy (e.g., voltage). As another example, energy storage device 145 and energy storage device 147 can each be configured with a different specific power (e.g., power density), specific energy (e.g., energy density), charge time, charging rate, life cycle, and/or internal resistance. As another example, energy storage device 145 may be a different type of device or component than energy storage device 147. In some embodiments, energy storage device 145 is a capacitor and energy storage device 147 is a battery. In some embodiments, energy storage device 145 is a first type of battery and energy storage device 147 is a second type of battery. In some embodiments, energy storage device 145 and energy storage device 147 include various types of lithium ion batteries and/or lithium polymer batteries. In some embodiments, the energy storage devices 145, 147 include various materials for storing energy, such as zinc, carbon, magnesium, manganese, mercury, alkaline, silver, nickel, metal hydride, cadmium, lead, and the like.

In some embodiments, energy storage device 141 and/or 143 has a smaller specific energy than energy storage device 145 or energy storage device 147. In some embodiments, energy storage device 145 has a smaller specific energy than energy storage device 147. In some embodiments, energy storage device 141 and/or 143 has a greater specific power than energy storage device 145 or energy storage device 147. In some embodiments, energy storage device 145 has a greater specific power than energy storage device 147.

In one example implementation, the energy storage device 141 and/or 143 charges quickly (e.g., quicker than energy storage devices 145 and/or 147) and stores the energy as an electric field. The energy storage device 141 and/or 143 then conveys energy to the energy storage device 145 (which may charge quicker than energy storage device 147), and which stores the energy conveyed from the energy storage device 141 and/or 143. The energy storage device 145 can convey energy to the energy storage device 147 where energy is stored before being provided to the load 157.

Advantageously, the energy storage device 145 may facilitate a transfer of energy from the energy storage device 141 and/or 143 to the energy storage device 147 by providing an "intermediate" storage device that is more amenable to receiving energy from the energy storage device 141 and/or 143.

In some implementations, the energy storage device 141 may be electrically coupled to the load 157. For example, the energy storage device 141 may be coupled to the load 157 via one or more of switch 146*c* and/or diode 148*c*. In some implementations, the energy storage device 143 may be electrically coupled to the load 157. For example, the energy storage device 143 may be coupled to the load 157 via one or more of switch 146*d* and/or diode 148*d*. Switch(es) 146*c* and/or 146*d* may include operational and/or structural features similar to those discussed above with respect to switch(es) 146*a* and/or 146*b*. For example, the energy storage device(s) 141, 143 may transfer energy to the load 157 via switch(es) 146*c* and/or 146*d*. Diode(s) 148*c* and/or 148*d* may include operational and/or structural features similar to those discussed above with respect to diode(s) 148*a* and/or 148*b*. For example, the energy storage device(s) 141, 143 may transfer energy to the load 157 via diode(s) 148*c* and/or 148*d*. In some implementations, the energy storage device 141 may transfer energy to the energy storage device 145 at a same time as transferring energy to the load 157. In some implementations, the energy storage device 143 may transfer energy to the energy storage device 145 at a same time as transferring energy to the load 157.

The energy storage device 147 can be electrically coupled to the load 157. The load 157 may include a device or component configured to consume energy. The load 157 may draw energy from the energy storage device 147 as the load 157 operates. For example, the load 157 may demand current or amperage from the energy storage device 147 depending on the energy requirements of the load 157. As the load 157 draws current or amperage from the energy storage device 147, a voltage level of the energy storage device 147 may reduce. As the load 157 requires more energy, more current or amperage may be transferred from the energy storage device 147 to the load 157 resulting in greater voltage loss at the energy storage device 145. In some embodiments, the load 157 may include a vehicle, such as a car, truck, golf cart, tractor, tractor-trailer, or the like. For example, the load 157 may be a motor of a vehicle.

As shown in this example embodiment, the energy system 150 further includes a vehicle management system 140. The vehicle management system 140 may include similar structural and/or operational features to vehicle management system 121 and/or vehicle management system 131 described herein. The vehicle management system 140 may be implemented in a vehicle and may be in communication (e.g., wired and/or wireless) with one or more components of the vehicle. The vehicle management system 140 may control operation or functionality of the vehicle or various components thereof. The vehicle management system 140 can include one or more memory or storage devices configured to store executable instructions (e.g., software instructions) that when executed perform one or more operations. The vehicle management system 140 can include one or more hardware processors configured to execute instructions to cause the vehicle management system 140 and/or other components of the energy system 150 to perform one or more operations.

In some embodiments, the vehicle management system 140 can optionally include a voltage sensor 142 and/or a current sensor 144. In some embodiments, the vehicle management system 140 may optionally be in communication with a voltage sensor and/or a current sensor remote to the vehicle management system 140. The voltage sensor 142 can be configured to determine voltage levels and/or differentials at the energy source 155, energy storage device 141, 143, 145, and/or 147, and/or at the load 157. The current sensor 144 can be configured to determine an electrical current or amperage flowing through the energy system 150 such as from the energy source to energy storage device 141 and/or 143, from energy storage device 141 and/or 143 to energy storage device 145, from energy storage device 141 and/or 143 to the load 157, from energy storage device 145 to energy storage device 147 and/or the load 157, or from energy storage device 147 to the load 157.

The vehicle managements system 140 may be in communication with the energy source 155, energy storage device(s) 141, 143, 145, and/or 147, switch(es) 146a, 146b, 146c, and/or 146d, and/or the load 157. The vehicle management system 140 may communicate with one or more components of the energy system 150 via a wired and/or wireless connection. For example, the vehicle management system 140 may be remote to one or more components of the energy system 150 and may communicate with the other components over a wireless network to control one or more operations of the components. The vehicle management system 140 may control the operation of the components based at least in part on information from the voltage sensor 142, the current sensor 144, and/or according to one or more operational settings.

The vehicle management system 140 may control operation of the energy system 150, or components thereof, such as switch(es) 146a, 146b, 146c, and/or 146d, to control a flow of energy in the energy system such as between energy storage devices. For example, the vehicle management system 140 may communicate a signal to the switch 146a to transition to a closed state in which the energy storage device 141 is in electrical communication with the energy storage device 145 and configured to transmit energy to the energy storage device 145. As another example, the vehicle management system 140 may communicate a signal to the switch 146a to transition to an open state in which the energy storage device 141 is not in electrical communication with the energy storage device 145 and in which energy does not flow from the energy storage device 141 to the energy storage device 145. The vehicle management system 140 may control energy flow from the energy storage device 141 to the energy storage device 145 (e.g., by controlling switch operation) based at least in part on information from the voltage sensor 142, the current sensor 144, and/or according to one or more operational settings. The vehicle management system 140 may similarly control operation of switch(es) 146b, 146c, and/or 146d.

The vehicle management system 140 may be in communication with a server (e.g., OSS) remote to the vehicle management system 140 and/or remote to the vehicle. The vehicle management system 140 may receive from a remote server operational settings data which may include one or more executable software instructions that when executed by a hardware processor are configured to control an operation of the vehicle management system 140 and/or an operation of one or more of the components in communication with the vehicle management system 140.

In one example implementation, the vehicle management system 140 receives operational settings data from a remote server relating to controlling a switch such as any of switches 146a, 146b, 146c, and/or 146d (e.g., transitioning between open and closed states). In some embodiments, the vehicle management system 140 can receive operational settings data that when executed cause the vehicle management system 140 to perform an operation immediately (e.g., at a substantially same time as when the vehicle management system 140 receives the operational settings data). For example, the vehicle management system 140 may generate and transmit a signal to the switch 146a to cause the switch 146a to transition between an open and closed state immediately after receiving and executing operational settings data. In some embodiments, the vehicle management system 140 can receive operational settings data that when executed cause the vehicle management system 140 to perform an operation at a future time (e.g., at a time that is after the vehicle management system 140 receives the operational settings data). For example, the vehicle management system 140 may receive and execute operational settings data that causes the vehicle management system 140 to generate and transmit a signal to the switch 146a to cause the switch 146a to transition between an open and closed state whenever certain conditions are satisfied for an indefinite amount of time moving forward (e.g., until the vehicle management system 140 receives updated operational settings data). For example, the operational settings data, when executed, may cause the vehicle management system to cause the switch 146a to transition between an open and closed state whenever the vehicle has travelled a certain distance, when a voltage of one or more energy storage devices reaches a threshold value, when a load of the vehicle (e.g., a motor) is demanding a certain current draw from an energy storage device, when an energy generation system of the vehicle is operating or producing a threshold amount of energy, or the like.

Example Energy Storage Devices

The energy storage device 141 may include one or more capacitors such as ultracapacitor(s) and/or supercapacitor(s). The energy storage device 141 may include one or more batteries, such as a lithium-ion battery, lithium-polymer battery, alkaline battery, lead-acid battery, or the like. In some implementations, the energy storage device 143 may be a same or similar type of device as the energy storage device 141 and/or may include similar operational ratings. In some implementations, the energy storage device 143 may be a different type of device than energy storage device 141 and/or may include different operational ratings. The energy storage device 143 may optionally be electrically coupled with the energy storage device 141 such as in series and/or parallel. In some implementations, the energy storage device 143 may not be directly electrically coupled with the energy storage device 141.

The energy storage device 143 may be removably mechanically and/or electrically coupled with the energy system 150 and/or components thereof, such as the energy source 155, energy storage device 141, energy storage device 145, energy storage device 147, etc. The energy storage device 143 may be removable electrically coupled with the energy system 150 via a mechanical connection. For example, the energy storage device 143 may establish an electrical connection with the energy system 150 a via friction fit.

The energy storage device 143 may have a high amp-hour rating. For example, the energy storage device 143 may have an amp-hour rating of less than 10 Ah, less than 25 Ah, less than 50 Ah, less than 75 Ah, or less than 100 Ah. The energy storage device 143 may have a higher amp-hour rating than the energy storage device 141. The energy storage device 143 may have low voltage rating. For example, the energy storage device 143 may have a voltage rating of less than IV, less than 5V, less than 10V, less than 20V, or the like. The energy storage device 143 may have a lower voltage rating than the energy storage device 141. In some implementations, the energy storage device 143 may have a same or similar watt-hour rating as the energy storage device energy storage device 141, where watt-hour rating is equal to the amp-hour rating multiplied by the voltage rating. The following table is provided as a non-limiting example of one implementation:

|  | Watt-hours | Amp-hours | Voltage |
| --- | --- | --- | --- |
| energy storage device 141 | 720 Wh | 20 Ah | 36 V |
| energy storage device 143 | 720 Wh | 60 Ah | 12 V |

As shown in the example above, the energy storage device 141 may have a voltage rating of 36V, an amp-hour rating of 20 Ah, and a watt-hour rating of 720 Wh. The energy storage device 143 may also have a watt-hour rating of 720 Wh with a voltage rating of 12V, an amp-hour rating of 60 Ah. In some implementations, the energy storage device 143 may have a different watt-hour rating than the energy storage device 141.

Advantageously, the energy storage device 141 and the energy storage device 143 can provide a large voltage and a large current to the energy storage device 145. For example, the energy storage device 141 may be configured with a large voltage rating (e.g., relative to the energy storage device 143) and the energy storage device 143 may be configured with a large amp-hour rating (e.g., relative to the energy storage device 141). Advantageously, the energy storage device 143 increases the amount of amperage provided to the energy storage device 145 without unnecessarily increasing voltage which may be costly and require large amounts of space. For example, with reference to the example table provided above, energy storage device 141 may be electrically coupled to energy storage device 145 and can provide 20 Ah and 36V thereto. If a user desires to increase the amperage provided to the energy storage device 145 by an additional 60 Ah, rather than purchase and install three additional energy storage devices similar to energy storage device 141 (e.g., 3×20 Ah=60 Ah), the user would only have to purchase and install the single energy storage device 143 to obtain the desired additional 60 Ah. In some implementations, a user may combine a plurality of energy storage devices 143 to achieve a desired amp-hour rating.

The energy storage device 143 may include one or more cells. A cell may be an anode and cathode separated by an electrolyte used to produce a voltage and current. The cells may be arranged in series and/or parallel. In some implementations, the cells of energy storage device 143 may be arranged in parallel which may yield a relatively high amp-hour rating of the energy storage device 143 and a relatively low voltage rating of the energy storage device 143. The energy storage device 141 may include one or more cells. The cells may be arranged in series and/or parallel. In some implementations, the cells of energy storage device 141 may be arranged in series which may yield a relatively high voltage rating of the energy storage device 141 and a relatively low amp-hour rating of the energy storage device 141.

The energy storage device 143 may have a high C rating. For example, the energy storage device 143 may have a C rating of less than 5 C, less than 10 C, less than 20 C, less than 30 C, less than 40 C, less than 50 C, less than 100 C, or less than 150 C. The energy storage device 143 may have a higher C rating than the energy storage device 141. A high C rating may facilitate faster charge and/or discharge times of the energy storage device 143. For example, the energy storage device 143 may be configured to discharge a large amount of current while maintaining a substantially constant voltage. The energy storage device 143 may have a high maximum current output where maximum current output is equal to C rating multiplied by amp-hour rating. The energy storage device 143 may have a high continuous charge/discharge current, and/or a high burst charge/discharge current.

The energy storage device 143 may have a high E rating. The energy storage device 143 may have a higher E rating than the energy storage device 141. The energy storage device 143 may have a high specific power. The energy storage device 143 may have a higher specific power than the energy storage device 141.

The energy storage device 143 may be electrically coupled with the energy storage device 145 via one or more high voltage wires or cables configured to a hold a large voltage. The energy storage device 143 may be electrically coupled with the energy storage device 145 via one or more low voltage wires or cables and/or which may be configured to conduct a large current.

Figure 2:
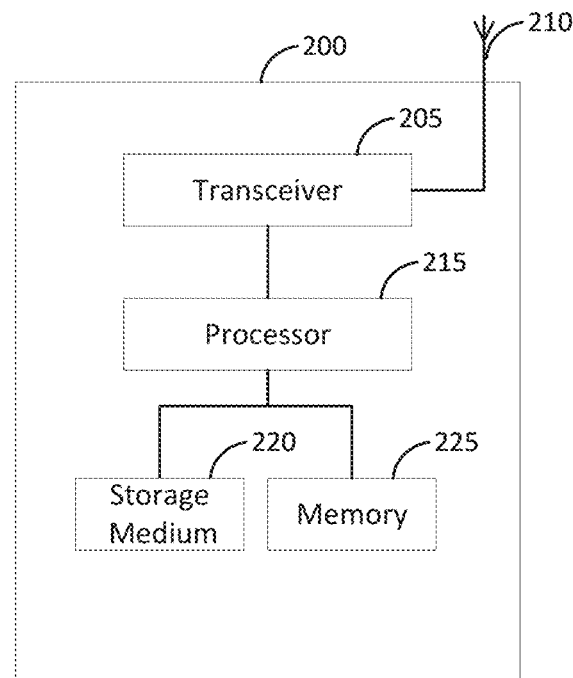
FIG. 2 is a block diagram illustrating an example vehicle component that may be used in a vehicle for over-the-air-provisioning of the vehicle.

FIG. 2 is a block diagram illustrating an example vehicle component 200 of a vehicle that may be provisioned overthe-air. The vehicle component 200 may comprise any of the example components described herein, for example with reference to FIGS. 1A-1D, such as an energy storage device, a generation system, a motor, a vehicle management system, a driven mass or roller system, or a component interface device. In some embodiments, the vehicle component 200 may comprise a vehicle management system. In some embodiments, the vehicle management system may control how other components of the vehicle operate, for example, according to executable software instructions on a processor of the vehicle management system. The vehicle management system can receive operational settings data to update, replace, edit and/or revise the executable software instructions to thereby alter its own operation and/or the operation of any of the other components in the vehicle.

In some embodiments, the vehicle component 200 may comprise a component interface device. In some embodiments, the component interface device may facilitate an operational compatibility between two or more components, for example as described with reference to FIG. 1B. The component interface device can receive operational settings data to update, replace, edit and/or revise executable software instructions included thereon to thereby alter its own operation, for example, to configure the component interface device to facilitate operational compatibility between new, additional or replacement components.

In some embodiments, a vehicle may comprise multiple components that include structural and/or operational features similar to those show in example vehicle component 200. For example, a battery of a vehicle as well as a vehicle management system of a vehicle as well as a component interface device may all include structural and/or operational features for communicating with a server and receiving and storing operational setting data as described herein. In some embodiments, components of a vehicle with structural and/ or operational features for over-the-air provisioning may each communicate with a server independently from all other components of the vehicle or may communicate in a coordinated manner such that their communication is organized or controlled, for example, by the vehicle managements system. In some embodiments, components of a vehicle with structural and/or operational features for over-the-air provisioning may each communicate with a unique server or with the same server.

The vehicle component 200 can include a transceiver 205, a wireless communicator 210, a processor 215, a storage medium 220 and a memory 225. The transceiver 205 may be connected to the wireless communicator 210 which can comprise an antenna or other similar device for facilitating communicating data to and from a remote server (e.g., OSS described herein). As used herein, phrases referring to communicating with the vehicle (such as sending requests from a vehicle to a server or receiving settings data from a server) may comprise communicating with a component of the vehicle such as example component 200.

The transceiver 205 can be connected to a processor 215 that can control the operation of the vehicle component 200, including the operation of the transceiver 205. The storage medium 220, which may be removable, read-only, or read/ write media and may be magnetic-based, optical-based, semiconductor-based media, or a combination of these, may store operating system software for the vehicle component 200 and may also store at least some settings data. The memory 225 may store additional, information, such as applications that may be loaded into the vehicle component 200. In addition, some or all of the settings data for the vehicle component 200 may be stored in the memory 225.

Both the memory 225 and the storage medium 220 can be connected to the processor 215. The processor 215 may operate in accordance with executable software, applications, or other instructions stored in the memory 225 and/or the storage medium 220.

In some implementations, memory 225 and/or storage medium 220 may store pre-configured instructions for executing operational settings in a vehicle. In some implementations, the memory 225 and/or storage medium 220 may store instructions for executing an application or program to allow a user to interact with the component 200, for example to request or select operational settings. In some implementations, the memory 225 and/or storage medium 220 may store instructions for communicating with a remote server, for example to retrieve settings data therefrom or to send requests thereto.

Figure 3:
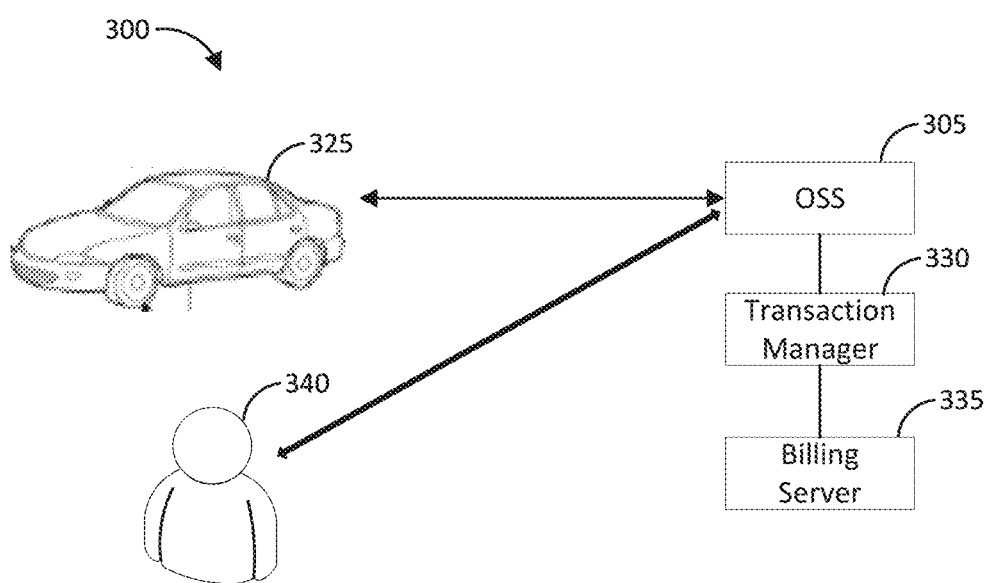
FIG. 3 is a block diagram illustrating an example system for over-the-air provisioning of a vehicle's operational settings.

FIG. 3 is a block diagram illustrating an example system 300 for over-the-air provisioning of a vehicle's operational settings. A vehicle 325 (and/or user 340) and operational settings server (OSS) 305 may be in communication with each other, for example, via a wireless communications path which may allow geographically dispersed devices, systems, databases, servers and the like to connect (e.g., wirelessly) and to communicate (e.g., transfer data) with each other. For example, in some embodiments, the vehicle 325 (and/or user 340) and OSS 305 may communicate with each other via a wireless network which may comprise a local area network (LAN), a personal area network (PAN) a metropolitan area network (MAN), a wide area network (WAN) or the like. In some embodiments, the vehicle 325 (and/or user 340) and OSS 305 may communicate with each other via radio waves transmitted via antennas, satellites, Bluetooth technology or the like. In some embodiments, the vehicle 325 (and/or user 340) and OSS 305 may communicate with each other using any combination of the foregoing examples.

The vehicle 325 (and/or user 340) may communicate data (e.g., via a wireless communication path) to the OSS 305. For example, the vehicle 325 (and/or user 340) may send requests to the OSS 305 for operational settings data. The requests can include general requests for operational settings data and/or requests for specific operational settings data. The user 340 may send requests to the OSS 305 for operational settings options. The vehicle 325 (and/or user 340) may send information relating to operational settings data currently included in the vehicle to inform the OSS 305 of the operational settings data possessed by the vehicle such as which settings data or which versions of settings data are possessed by the vehicle.

In some embodiments, the vehicle 325 (and/or user 340) may communicate data (e.g., via a wireless communication path) to the OSS 305 relating to an operation or status of the vehicle. For example, the vehicle 325 may communicate to the OSS 305 information relating to a charge status of the vehicle, a charges status of one or more energy storage devices of the vehicle, a geographical location of the vehicle, a geographic location of a desired destination, an estimated time and/or distance the vehicle may continue to operate (e.g., with a certain charge status), a distance travelled by the vehicle, or the like.

The OSS 305 may communicate data (e.g., via a wireless communication path) to the vehicle 325 (and/or user 340). For example, the OSS 305 may send operational settings data to the vehicle 325 to control one or more operations of the vehicle (e.g., energy status, energy generation status, or the like). The OSS 305 may send data relating to operational settings options to a user 340 for example to provide information to the user 340 relating to which operational settings are available for download to the vehicle 325 so that the user 340 may select which operational settings to download to the vehicle 325. In some embodiments, the OSS 305 may communicate with a user 340 via one or more of a phone, a computing device, a tablet, a vehicle navigation system or control system, or the like. For example, the OSS 305 may transmit a text message to a phone of a user 340. As another example, the OSS 305 may transmit a message to a control dashboard of a vehicle to be read by a user. As another example, the OSS 305 may communicate an email to a user 340 (e.g., to notify the user that the OSS 305 and/or billing server 335 has charged the user). In some implementations, the vehicle 325 (e.g., a vehicle management system of the vehicle) may communicate to the OSS 305 a charge status of the vehicle, a geographic location of the vehicle, and/or a desired geographic destination.

Operational settings data may be stored on an operational settings server (OSS) 305 and transmitted (e.g., via wireless communication) to the vehicle 325. When operational settings are downloaded from the OSS 305, the OSS 305 can collect download event information and send it to a transaction manager 330. The download event information can include the time of the download, the settings data that was downloaded, the reason for the download, the vehicle and/or user associated with the download etc. The transaction manager 330 can combine the download event information with other information, such as operational settings pricing structure and developer data for the downloaded operational settings, to produce usage records. The transaction manager 330 can send the usage records to a billing server 335, which may perform billing services, such as generating invoices. In some embodiments, the billing server 335 may issue a charge to a user according to the operational settings data transmitted from the OSS 305 to a vehicle associated with the user. For example, the billing server 335 (and/or the OSS 305) may charge a user depending on the number and/or types of operational settings data downloaded from the OSS 305 to a vehicle related to the user (e.g., associated with an account of the user). In addition, the billing server 335 may allow an operational settings developer, and/or a third party associated with the OSS 305 to run a report and find out how many users have downloaded and/or are subscribing to a particular service offering or operational setting.

The OSS 305 may be associated with a particular operator or with a third party. In some implementations, the OSS 305 may be operated by a third party that offers the operational settings for a variety of vehicle and/or vehicle component types, for example according to different manufacturers according to their respective various requirements and specifications. In some implementations, the OSS 305 may be operated by multiple third parties that each provide unique operational settings, for example each according to a different vehicle type and/or vehicle component or component type.

In some embodiments, the OSS 305 may offer pass-through access to third party operational settings data, such that the operational settings are stored and managed on a server associated with the third party. In some embodiments, most or all of the available applications may be stored and managed on the OSS 305. The operator of the OSS 305 may have agreements with the third parties to offer the operational settings and to provide for payment to the third parties.

Example Operational Settings of an Electric Vehicle

A vehicle or its components may operate according to various operational settings. Operational settings data (e.g., executable software instructions) may be downloaded to a vehicle component and may affect the how the component functions or operates. Examples are provided of various operational settings that may pertain to the various components of a vehicle.

Operational settings data may affect how an energy storage device, such as a battery of a vehicle operates. For example, operational settings data can affect the rate at which a battery charges or discharges, the maximum or minimum voltage (e.g., energy charge) that a battery may hold, whether a battery is charged or not charged, the conditions under which a battery is charged, when to start or stop charging a battery and the like. Operational settings data can affect where energy is stored, for example in vehicles including more than one energy storage device such as multiple batteries, multiple capacitors or batteries and capacitors. For example, according to one operational setting a vehicle may store energy in a first battery before storing energy in a second battery and vice versa according to a different operational setting. As another example, according to one operational setting, a vehicle may store energy in a capacitor before storing energy in a battery and vice versa according to a different operational setting. As another example, according to one operational setting, one energy storage device (e.g., capacitor) may receive and store energy until a certain threshold is reached that is defined by the operational setting before discharging energy into another energy storage device.

Operational settings data may affect how an energy generation system of a vehicle operates. For example, operational settings data can affect a rate at which an energy generation system generates energy, when it generates energy, when it starts or stops generating energy, where to store or transfer generated energy and the like. For example, according to one operational setting, an energy generation system may generate energy only when the vehicle is accelerating (positive acceleration or negative acceleration) and according to another operational setting, an energy generation system may generate energy only when the vehicle is experiencing constant velocity and zero acceleration.

Operational settings data may affect how a motor of a vehicle operates. For example, operational settings data can affect a rate at which the motor consumes energy, the sources from which the motor draws energy such as from a battery or a capacitor, and the like. As an example, according to one operational setting, the motor may draw energy at a certain rate from a first energy storage device under certain conditions and may draw energy at a certain rate from a second energy storage device under different conditions.

Operational settings data may affect how a vehicle management system of a vehicle operates. For example, operational settings data can affect how a vehicle management system interacts with and/or controls other components of a vehicle. As an example, according to one operational setting, the vehicle management system may manage a vehicle's energy (e.g., generation, storage, consumption) in one way and in a different way according to a different operational setting. In some embodiments, a vehicle management system may control energy flow between components of a vehicle (e.g., between a capacitor and a battery) via a switch according to operational settings data. In some embodiments, the operational settings data for controlling operation of the switch may include any number of criteria and/or conditions for operating the switch (e.g., transition between open and closed stated). Criteria and/or conditions can include battery voltage, capacitor voltage, battery amperage (e.g., delivered to a load), capacitor amperage (e.g., receive from an energy source), or the like. In some embodiments, the operational settings data for controlling operation of the switch may include logic based on levels, changes, rates of change, changes in rate of change, etc., present values and/or historical values of any of the preceding example criteria or conditions. In some embodiments, criteria and/or conditions of an operational setting can include geographical location of the vehicle, a distance travelled by the vehicle, a distance between the vehicle and a desired destination, or the like. As an example, a vehicle management system may cause a switch to transition to a closed state to allow energy to flow between energy storage devices every time the vehicle travels a certain distance (e.g., 10 miles, 30 miles, 100 miles, or the like).

Example Implementation

In an example implementation, the vehicle 325 may communicate to the OSS 305 that the vehicle 325 is 10 miles from a desired destination (e.g., home) and that a battery of the vehicle has sufficient energy to continue to power the vehicle at a current operational status for 5 more miles before discontinuing operation due to low charge. In response, the OSS 305 can transmit a communication to the user 340 (e.g., via a text message to a phone of the user, via a message to a control dashboard of the vehicle 325, or the like) to notify the user 340 that they are 10 miles away from a destination and that the battery of the vehicle 325 only has sufficient charge to operate the vehicle 325 for another 5 miles. The OSS 305 may provide operational settings options to the user 340 which can include, for example, an option to flow energy into a battery to charge the battery to increase the range of the vehicle (e.g., from 5 to greater than 10 miles) so that the vehicle may reach the desired destination, an option to enter a power saving mode, an option to initiate operation of a power generation system (e.g., rollers in extended position) to generate energy to be slowed into the battery, or the like. In some implementations, the operational settings options may be simplified to be easy to understand by a user 340. For example, the operational settings options may be a question such as "Do you want to extend vehicle range by an additional 10 miles?" In some implementations, the operational settings options may not reflect entirely the operational settings data that would correspond thereto. For example, a user 340, when reviewing operational settings options, may not care about every detail of the operational settings data that would be necessary to effectuate the operational settings options. In some implementations, the OSS 305 may determine the operational settings data that correspond most accurately to the selected operational settings options to most effectively implement the selected options. The user 340 may communicate a selected operational settings option to the OSS 305 (e.g., via text message or the like). In response to receiving the user's 340 selected option, the OSS 305 may generate operational settings data corresponding to the selected option to transmit to the vehicle 325 to cause the vehicle to operate according to the selected operational setting. For example, the OSS 305 may transmit operational settings data to the vehicle 325 to cause a vehicle management system to electrically connect a capacitor module to a battery (e.g., via a switch) to flow energy from the capacitor to the battery and/or to cause an energy generation system (e.g., roller(s). driven mass(es)) to transition to an extended position to generate energy to be flowed into the battery.

Operational settings data may affect operational compatibility between various components of a vehicle. For example, operational settings data may configure one component to interface (e.g., electrically couple and communicate) with another component. For example, operational settings data may allow a vehicle management system to interface with any of the other components. As an example, a new component that is installed or included in the vehicle may operate according to manufacturer's specifications and may as a result not function properly (or at all) with other components of the vehicle. The new component or other components of the vehicle may download operational settings data to allow the new component to interface with the other components of the vehicle.

Operational settings data may affect how one or more driven masses operate. Operational settings data may control operation of a driven mass based on one or more factors, including for example, the amount of energy being generated by rotation of the driven mass, the velocity of the vehicle, the air pressure of the driven mass, a motion of the driven mass (e.g., vertical motion caused by uneven terrain), a geographic location of the vehicle, a distance travelled, by the vehicle, a desired destination, and the like. As an example, operational settings data may control the circumstances under which a driven mass is in an extended position (e.g., in contact with the ground) or in a retracted position (e.g., not in contact with the ground). For example, according to certain operational settings data, a driven mass may be in an extended position when the vehicle is traveling in excess of a threshold velocity. As another example, operational settings data may control the conditions under which a driven mass transitions between an extended or retracted position, such as based on whether a threshold amount of energy is being generated by rotation of the driven mass. As another example, operational settings data may control the force with which a driven mass is exerted onto a ground surface. For example, according to certain operational settings data, a driven mass may be applied to a ground surface with greater force (e.g., when a ground surface is uneven) to ensure continual contact with the ground surface, and may be applied to the ground surface with less force (e.g., when the ground surface is flat). The force with which a driven mass is applied to the ground, and/or position of the driven mass may be adjusted or controlled according to the operational settings data by one or more structural features of (e.g., associated with) the driven mass, including, for example, flexible arms, mechanical springs, gas springs, pistons, suspension systems, shafts, struts, hydraulics, pneumatics, levers, gears, pulleys, actuators, hinges, pivots, joints, or the like.

Operational settings data may affect how one or more rollers operate. Operational settings data may control operation of rollers based on one or more factors, including for example, the amount of energy being generated by rotation of the roller, the velocity of the vehicle, the air pressure of a wheel with which a roller is in contact, a motion of a wheel with which the roller is in contact (e.g., vertical motion caused by uneven terrain), a geographic location of the vehicle, a distance travelled, by the vehicle, a desired destination, and the like. As an example, operational settings may control the circumstances under which a roller is in an extended position (e.g., in contact with a wheel of a vehicle) or in a retracted position (e.g., not in contact with the wheel). For example, according to certain operational settings data, a roller may be in an extended position when the vehicle is traveling in excess of a threshold velocity. As another example, operational settings data may control the conditions under which a roller transitions between an extended or retracted position, such as based on whether a threshold amount of energy is being generated by rotation of the roller. As another example, operational settings data may control the force with which a roller is exerted onto a wheel. For example, according to certain operational settings data, a roller may be applied to a wheel with greater force such as when a ground surface is uneven and the wheel is experiencing significant vertical motion to ensure continual contact with the wheel throughout a range of vertical motion, and may be applied to the wheel with less force such as when the ground surface is flat and the wheel is experiencing minimal vertical motion. As another example, the force with which a roller is applied to a wheel and/or position of the roller may be adjusted based on the wheel air pressure (e.g., increase force to ensure roller contacts wheel when wheel air pressure is low, or transition to retracted position when substantial contact between roller and wheel cannot be achieved due to low wheel air pressure, and the like). The force with which a roller is applied to the wheel, and/or position of the roller may be adjusted or controlled according to the operational settings data by one or more structural features of (e.g., associated with) the roller, including, for example, flexible arms, mechanical springs, gas springs, pistons, suspension systems, shafts, struts, hydraulics, pneumatics, levers, gears, pulleys, actuators, hinges, pivots, joints, or the like.

Operational settings data may affect how an autonomous driving system of a vehicle operates. For example, a remote server may periodically update an autonomous driving system (e.g., with the most recent algorithms, data, or the like) by provisioning the vehicle with the latest operational settings data relating to the autonomous driving system. Advantageously, complex operational systems of the vehicle (e.g., autonomous driving systems) may remain up-to-date by fast and simple provisioning of operational settings data without the need for costly and lengthy hardware updates. Operational settings data may similarly affect other systems of the vehicle such as navigational systems.

In certain embodiments, one or all of the components of a vehicle may not be configured for over-the-air provisioning. In such embodiments, a component interface device may advantageously be used to facilitate operational compatibility between components, for example rather than directly provisioning the components themselves. For example, a component interface device may be installed in a vehicle and may be provisioned (e.g., over-the-air) with various operational settings data as required or desired to configure the component interface device to integrate and operate with other components of the vehicle and to facilitate operational compatibility between any of the other components in the vehicle such as between a vehicle management system and an energy storage device.

In some embodiments, a component interface device may be used when the other components of the vehicle are configured for over-the-air provisioning.

Advantageously, provisioning vehicle components may reduce the need for costly, technical or otherwise challenging servicing of the vehicle (e.g., mechanical or electrical fixes) to allow for a new component to integrate in a vehicle such as when a new battery is installed. Provisioning may also allow for components to be installed in a vehicle that would otherwise not be able to integrate and function in said vehicle. For example, by provisioning vehicle components with operational settings data, components from various manufacturers that would otherwise not be capable of functioning together, may be integrated into a vehicle and operate according to a desired manner.

Operational settings data may affect functionality of other computer-based components of a vehicle, such as navigation, stereo, driver assistance systems and the like. Operational settings data may comprise software patches or fixes such as for disabled vehicle components or vehicle components that are not functioning correctly.

Example Methods for Over-the-Air Provisioning

FIGS. 4-7 are flowcharts illustrating example processes for over-the-air provisioning of a vehicle's operational settings. Various methods may exist for the over-the-air provisioning of a vehicle's operational settings. For example, the operational settings may be provisioned automatically on a periodic basis, the operational settings may be provisioned in response to a request (such as from a user or vehicle), or in response to a detected new vehicle component or in response to detected altered operation of the vehicle or in response to some other input. As further examples, a vehicle's operational settings may be provisioned during an initial configuration of the vehicle and/or the vehicle's operational settings or may be provisioned when new operational settings are available. The example processes shown in FIGS. 4-7 are provided as example and are not intended to be limiting. In some embodiments, the flowcharts may include more or less blocks than what are shown in the FIGS.

Figure 4:
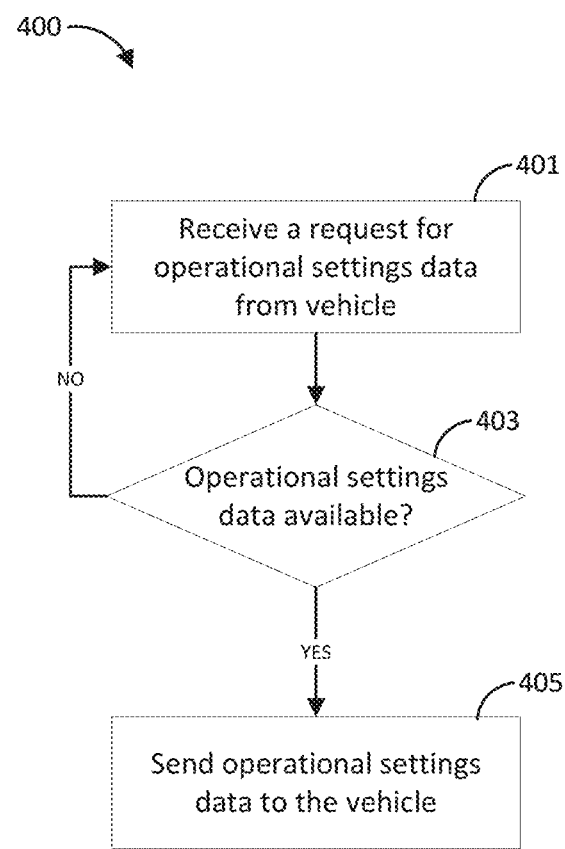
FIGS. 4-7 are flowcharts illustrating example processes for over-the-air provisioning of a vehicle's operational settings.

FIG. 4 is a flowchart illustrating an example 400 process for over-the-air provisioning of a vehicle's operational settings. Example process 400, or any portion thereof, may be implemented on a server that may be remote to the vehicle, such as OSS described with reference to FIG. 3. At block 401, the server may receive a request for operational settings data from the vehicle. In some embodiments, the request may be a general request, for example a request for all available operational settings data or the request may be a specific request for specific operational settings data. In some embodiments, the vehicle may transmit the request upon an initial configuration of the vehicle or its various components. In some embodiments, the vehicle may transmit the request automatically on a periodic basis, for example, to continually check if the vehicle has received the most up-to-date operational settings. In some embodiments, at block 401, the server may receive a request from a user. In some embodiments, the request may be received via wireless communication. In some embodiments, the request may be communicated to the server from a component of the vehicle such as a vehicle management system of the vehicle or a component interface device of the vehicle.

At block 403, the server may check if operational settings data is available. For example, the vehicle may have requested any available updated settings data and the server, at block 403, may check if any updated settings data is available or if the vehicle has the most updated settings data already. If settings data is available, the server may proceed to block 405 and if not, may proceed to block 401.

At block 405, the server may send operational settings data to the vehicle or component thereof, such as a vehicle management system or a component interface device. The settings data may be sent to the vehicle over a wireless communications path. In some embodiments, the operational settings data sent at block 405 may include all settings data available on the server or a subset thereof, such as specific operational settings data in response to a request for specific operational settings data.

Figure 5:
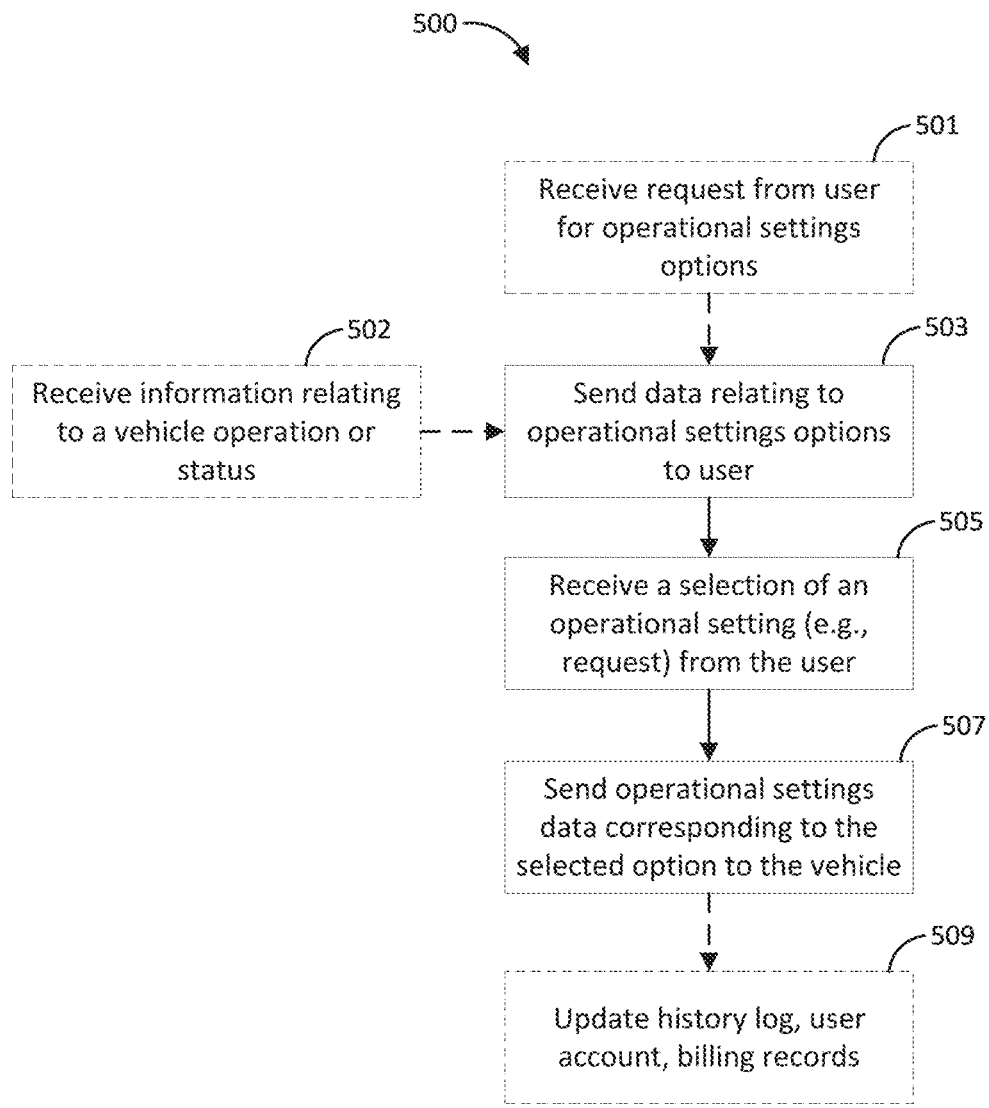

FIG. 5 is a flowchart illustrating an example process 500 for over-the-air provisioning of a vehicle's operational settings. Example process 500, or any portion thereof, may be implemented on a server that may be remote to the vehicle, such as OSS 305 described with reference to FIG. 3. The communications between the user, server, and vehicle as described in example process 500 may be done via a wireless communications path.

At block 501, the server may optionally receive a request from a user for operational settings options. For example, a user may desire to view one or more operational settings available for a vehicle or components of a vehicle.

At block 502, the server may optionally receive information relating to a vehicle operation and/or status. In some embodiments, the server may receive said information from vehicle management system. For example, a vehicle management system may transmit to the server, a status of current operational settings data of the vehicle, a charge status of the vehicle, an energy generation status of the vehicle, operating conditions of the vehicle, estimated remaining battery life or operating time of the vehicle, or the like.

At block 503, the server may send data relating to operational settings options to the user. This may allow a user to view one or more operational settings that are available for download to the vehicle from the server. The server may communicate the operational settings options to the user via one or more of a text message, email message, internet message, or the like.

At block 505, the server may receive a selection of an operational setting from the user. For example, the user, after having reviewed available operational settings, may select one or more of the available settings and send a request to the server to download to the vehicle said operational setting(s).

At block 507, the server may send, to a vehicle, operational settings data corresponding to the option selected by the user.

At block 509, the server may optionally update one or more of a history log, a user account, and/or billing records. For example, in response to sending the operational settings data to the vehicle, the server may record to a history log the details of the transaction (e.g., time, which settings were downloaded, etc.) and may generate a charge to the user for the transaction.

Figure 6:
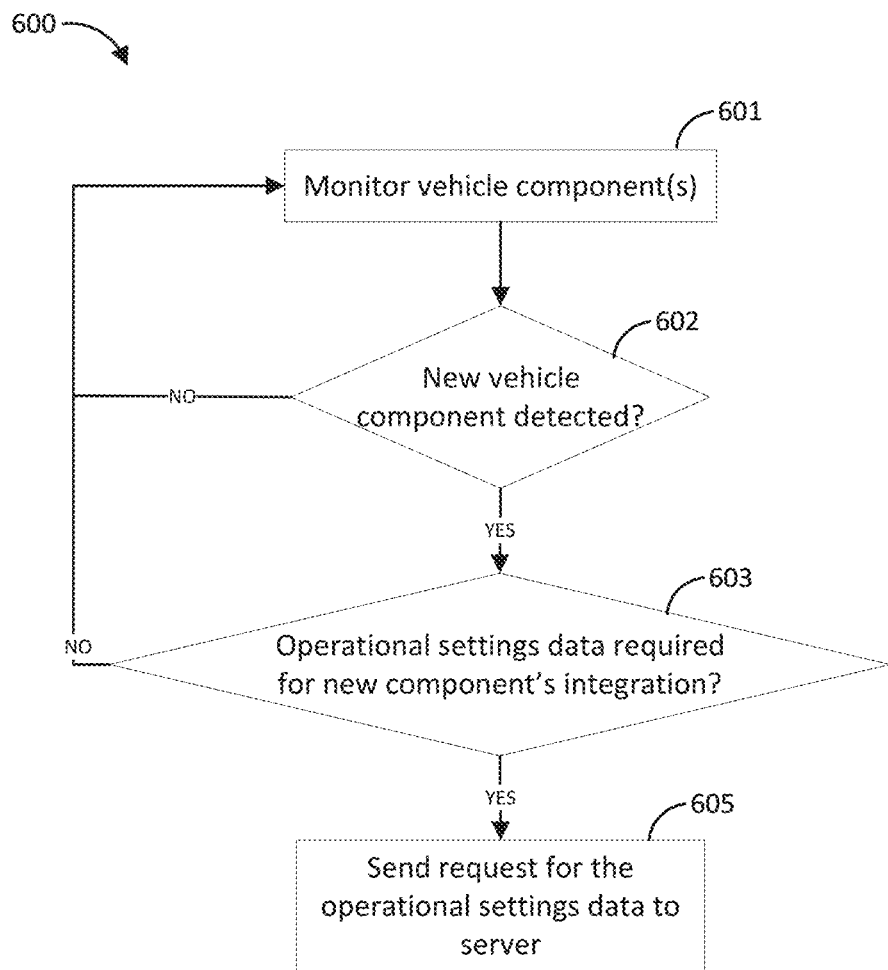

FIG. 6 is a flowchart illustrating an example process 600 for requesting operational settings data from a server. Example process 600, or any portion thereof, may be implemented on a component a vehicle such as example component 200 described with reference to FIG. 2 herein, for example on a processor of the component. In some embodiments, example process 600 can be implemented on a processor of a vehicle management system or a component interface device.

At block 601, a processor of vehicle component (e.g., vehicle management system or a component interface device) may monitor the components of a vehicle. For example, the processor of a particular vehicle component (e.g., vehicle management system or a component interface device) may be in communication with other components of the vehicle. The processor may monitor the components of the vehicle to detect whether vehicle components have been added to the vehicle (e.g., established a new communication with the processor) and/or removed from the vehicle (e.g., terminated an existing communication with the processor).

At block 602, the processor may determine if a new vehicle component has been detected. For example, the processor may detect when a vehicle battery has been replaced with a different vehicle battery (e.g., a new battery of the same type as the old battery or a new battery of a different type than the old battery). As another example, the processor may detect a component that has never before been included in the vehicle, such as a second additional battery, where the vehicle has only ever had one battery, or some other additional energy storage device such as an ultracapacitor. If the processor detects a new component, the processor may proceed to block 603.

At block 603, the processor may determine whether operational settings data is required or desired for the component detected at block 602 to operate properly within the vehicle. For example, the new component or other components of the vehicle may require a more up-to-date version of operational settings and/or new operational settings data for the new component to function properly or optimally with the vehicle and the vehicle's other components. If settings data is not required or desired, the processor may return to block 601 and if settings data is required or desired for the new component or other components, the processor may continue to block 605.

At block 605, the processor may send a request (e.g., to a remote server) for the operational settings data that is required and/or desired. The processor may communicate with the server via a wireless communications path. In response to the request, the remote server may send the operational settings data to the vehicle as described elsewhere herein, for example according to the examples provided. In some embodiments, the operational settings data may be sent to the component of the requesting processor (e.g., vehicle management system, component interface device) and/or to another component such as the new component, for example, if the new component is configured for over-the-air provisioning.

Figure 7:
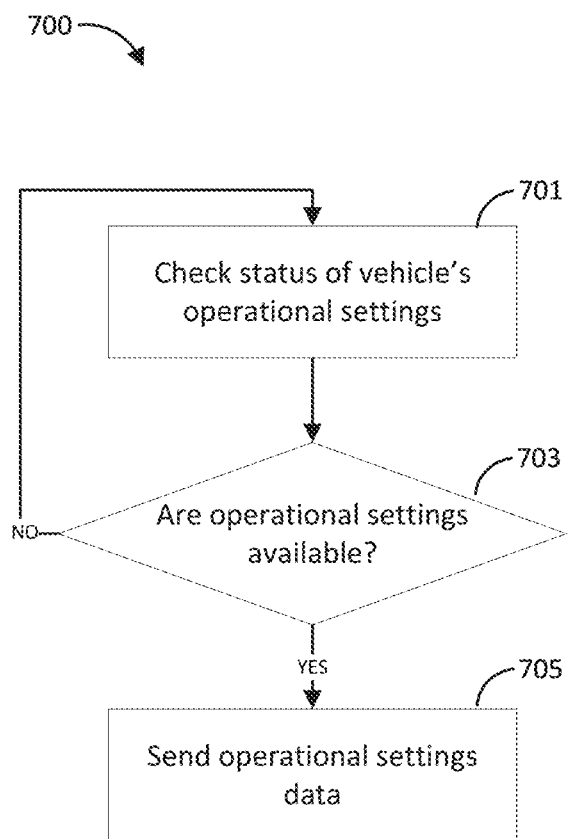

FIG. 7 is a flowchart illustrating an example process 700 for sending operational settings data to a vehicle. Example process 700, or any portion thereof, may be implemented on a server that may be remote to the vehicle, such as OSS described with reference to FIG. 3. At block 701, the server may check the status of a vehicle's operational settings. For example, the server may check which settings data and/or which version of settings data is currently possessed by the vehicle. The server may check the status by querying the vehicle for data relating to its current operational settings (e.g., sending a request to the vehicle for information relating to the operational settings of the vehicle). The server may query the vehicle via a wireless communications path as described elsewhere herein. In some embodiments, the server may keep a history log of download event information and/or have access to such a log such as on a third-party server. The download event information such as recorded in a history log can include one or more of a time of transmitting operational settings data from the server to the vehicle, the operational settings data that have been transmitted from the server to the vehicle, a reason for transmitting operational settings data from the server to the vehicle, the identity of a vehicle sending the request to the server, the identity of a vehicle receiving the operational settings data from the server or the identity of a user sending the request to the server. The history log of download event information may allow the server to know which operational settings the vehicle currently has without having to query the vehicle.

At block 703, the server may determine whether operation settings are available for the vehicle. For example, the server may determine whether a more up-to-date version of the vehicles current operational settings data are available for the vehicle and/or may determine whether new operational settings data are available for the vehicle. The server may compare the vehicle's current operational settings with all operational settings included in the server or accessible by the server or a subset thereof. If the server includes or has access to more or different operational settings than what are currently included in the vehicle, this may indicate that new and/or more up-to-date operational settings are available for the vehicle that may be desirable and/or required for the vehicle or its components to operate (e.g., optimally). If, at block 703, the server determines that operational settings are not available, the server may return to block 701, and otherwise may proceed to block 705.

At block 705, the server may send operational settings data to the vehicle. The operational settings data may include a more up-to-date version of the vehicle's current settings data and/or may include settings data that are new to the vehicle. The server may send the settings data to the vehicle via a wireless communications path as described elsewhere herein.

Figure 8:
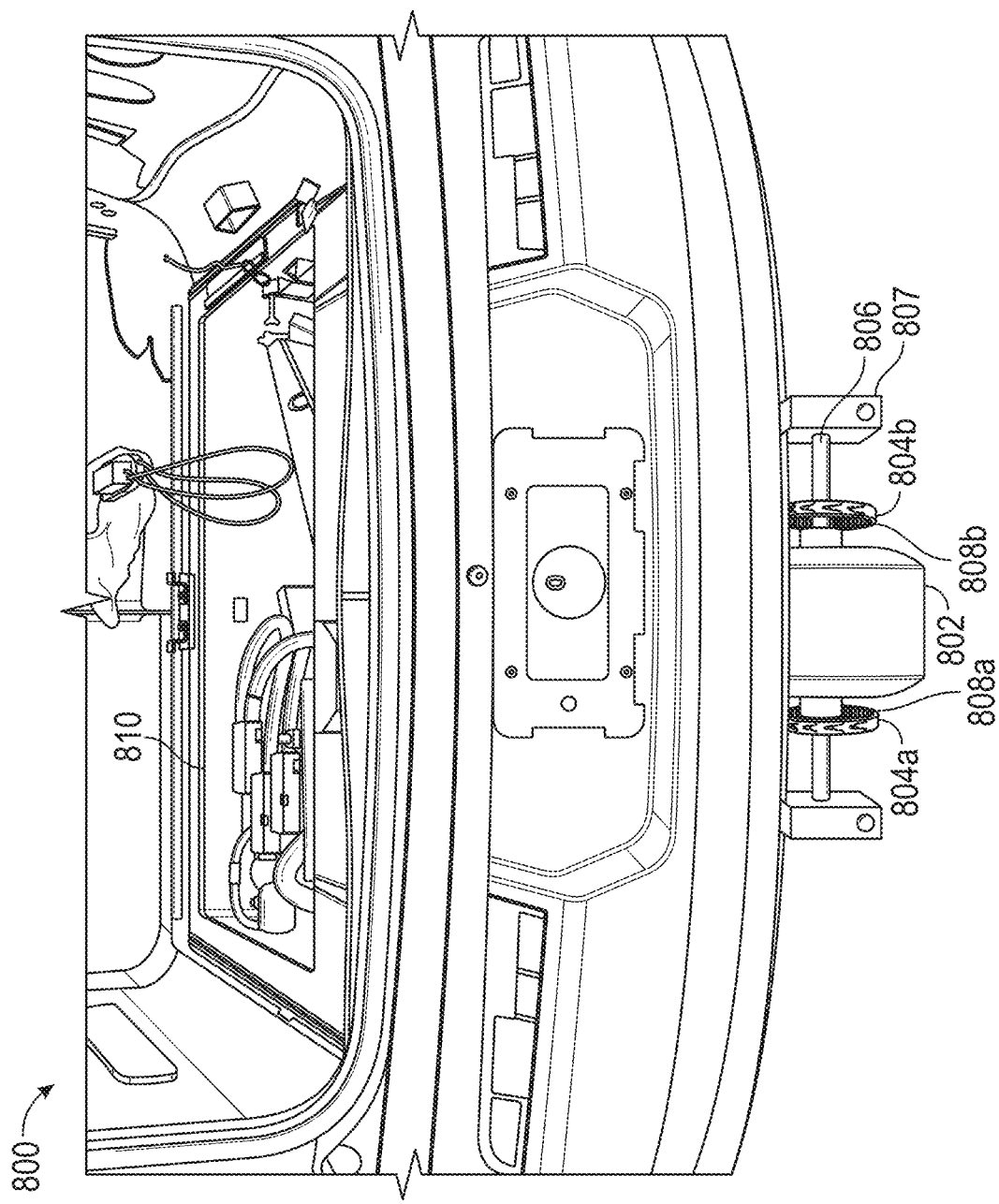
FIG. 8 is a diagram of an exemplary "fifth" wheel configured to drive or power an on-board charging system (OBCS) of a vehicle.

FIG. 8 is a diagram of an exemplary "fifth" wheel 802 configured to drive or power an on-board charging system (OBCS) 810 of a vehicle 800. The fifth wheel 802 may also be referred to herein as a driven mass, roller, or the like. The term "fifth wheel" as used herein is not intended to be limiting and is used for illustrative and/or exemplary purposes only. For example, the fifth wheel 802 may be implemented in a vehicle with more than four or more than five wheels, such as a semi-truck or tractor-trailer. As another example, the fifth wheel 802 may be implemented in a vehicle with less than five wheels or less than four wheels, such as a motorcycle. The term "fifth wheel" is not intended to be limiting of the number of wheels of the vehicle in which the fifth wheel may be implemented. The OBCS can include one or more of a capacitor, battery, or other energy storage device. The fifth wheel 802 as shown is in an extended state such that the fifth wheel 802 is in contact with the ground or road surface and, thus, rotates while the vehicle 800 is in motion. The controller may extend or retract the fifth wheel 802 such that the fifth wheel 802 is not always in contact with the ground or road surface. In some embodiments, the fifth wheel 802 is replaced with or integrated as a small motor or geared component driven by a drive shaft, motor, wheel, or other driven component of the vehicle 800. In some embodiments, the small motor or geared component may include a small fixed gear electric motor that rotates the shaft at a desirable rotations per minute (RPM). For discussion herein, the fifth wheel 802 will be described as being driven when in contact with the ground, though any other means of being driven (for example, the small motor or geared component driven by a drive shaft) is envisioned. As such, the fifth wheel 802, whether in contact with the ground or integrated with another drive component within the vehicle 800, rotates in response to the vehicle 800 being driven to move or otherwise moving. In some embodiments, although the fifth wheel 802 is in contact with the ground, the fifth wheel 802 may not carry a significant portion of weight of the vehicle 800. As such, in some embodiments, a minimal or small amount of drag will be created or caused by the fifth wheel 802. A controller may be configured to control the amount of drag that the fifth wheel 802 creates (for example, how much pressure the fifth wheel 802 exerts downward on the road surface).

The fifth wheel 802 is coupled to a drive shaft (herein referred to as the "shaft") 806. As the fifth wheel 802 rotates, the shaft 806 also rotates at a same, similar, or corresponding rate as the fifth wheel 802. In some embodiments, the fifth wheel 802 and the shaft 806 may be coupled such that the shaft 806 rotates at a greater or reduced rate as compared to the fifth wheel 802. In some embodiments, the shaft 806 is coupled to a support structure 807. The support structure 807 may be attached to the frame or body of the vehicle 800 and allow for the fifth wheel 802 to be extended or retracted as needed while supported by the vehicle 800. Two sprockets or gears 808a and 808b are disposed on the shaft 806 such that when the shaft 806 rotates, the sprockets 808a and 808b also rotate. In some embodiments, the sprockets 808a and 808b and the shaft 806 may be coupled such that the sprockets 808a and 808b rotate at a greater or reduced rate as compared to the shaft 806.

The sprockets 808a and 808b engage with a chain, belt, gearing, pulley, or similar device 804a and 804b, respectively. The chains 804a and 804b cause one or more devices (not shown in this figure) coupled via the chains 804a and 804b to rotate at a rate that corresponds to the rate of rotation of the sprockets 808a and 808b. In some embodiments, the one or more devices coupled to the sprockets 808a and 808b via the chains, gearing, pulley, or similar device 804a and 804b are components of or otherwise coupled to the OBCS 810. For example, the devices to which the sprockets 808a and 808b are coupled via the chains (and so forth) 804a and 804b provide power (for example, by way of kinetic energy) to the OBCS 810 to enable the OBCS 810 to charge the vehicle 800 while the vehicle 800 is in motion. Thus, in some embodiments, the devices to which the sprockets 808a and 808b are coupled via the chains 804a and 804b may include generators, alternators, or similar mechanical to electrical energy conversion devices, as described in further detail below. In some embodiments, the small motor described above may act as a fail over motor to drive the shaft driving the generators 902a and 902b should one of the chains 804a and 804b fail.

In some embodiments, the vehicle 800 includes multiple fifth wheels 802, sprockets 808, and/or chains 804 coupling the sprockets 808 to one or more devices. The one or more fifth wheels 802 and the corresponding one or more sprockets 808 may rotate with one or more corresponding shafts 806. In some embodiments, each fifth wheel 802 is mounted via its respective shaft 806 to its own support structure 807. In some embodiments, each fifth wheel 802, when additional fifth wheels 802 exist, is coupled to its own energy conversion device(s) through one or more sprockets 808 and chains 804 that rotate with the corresponding shaft 806 of the additional fifth wheels 802. By including additional fifth wheels 802, more mechanical energy may be converted to electrical energy for supply by the OBCS 810 as compared to with a single fifth wheel 802.

Figure 9:
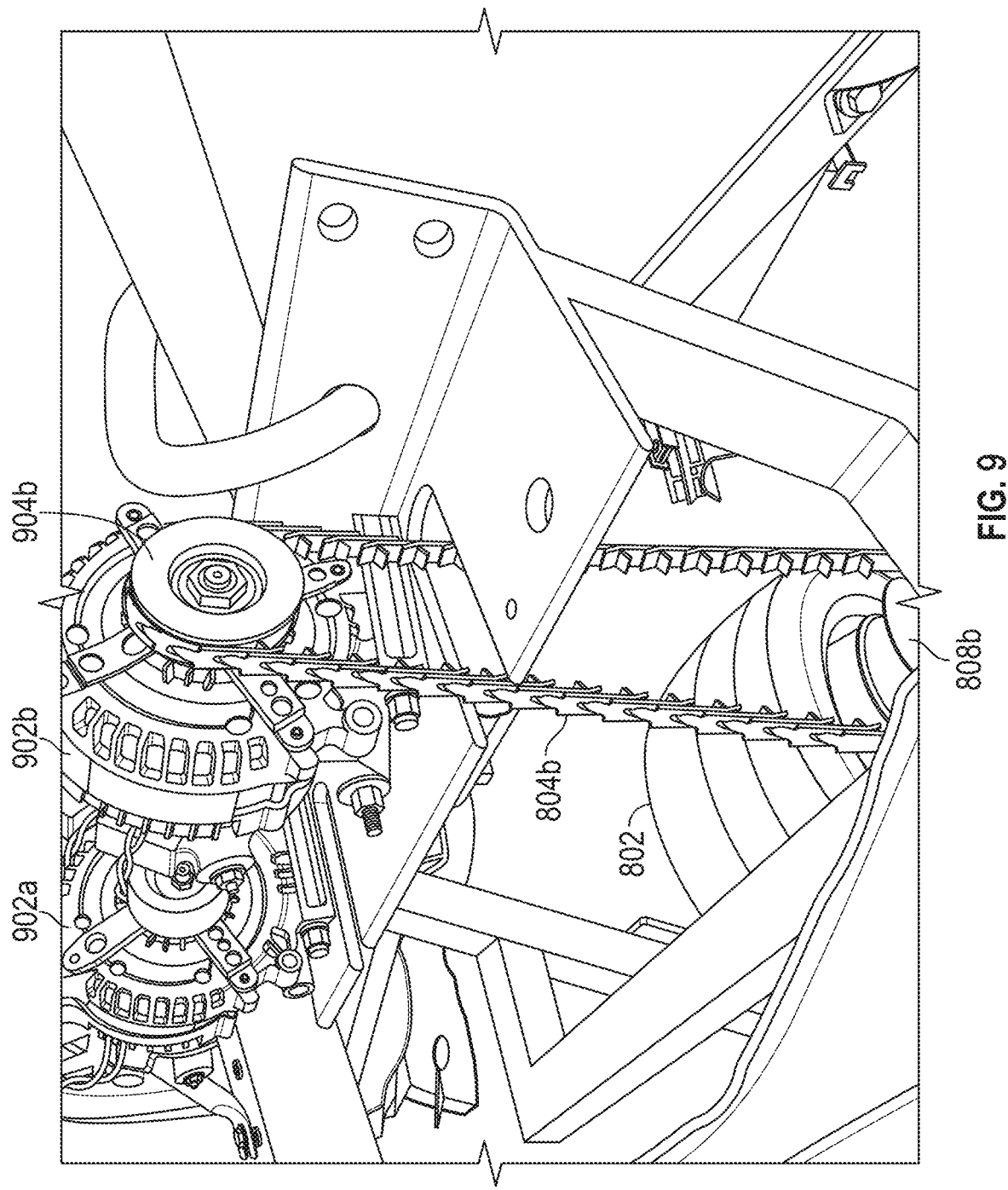
FIG. 9 is a diagram of a fifth wheel mechanically coupled to two generators.

FIG. 9 is a diagram of the fifth wheel 802 of FIG. 8 mechanically coupled to two generators 902a and 902b that convert mechanical rotation of the fifth wheel 802 into electrical energy outputs, in accordance with an exemplary embodiment. In some embodiments, the generators 902a and 902b may be replaced with alternators or similar electricity generating devices. Each of the generators 902a and 902b has a rotor coupled to a drive pulley 904a and 904b, respectively. The drive pulley 904 of each generator 902 may rotate, causing the corresponding rotor to rotate and causing the generators 902 to generate an electrical energy output via a cable (not shown in this figure). The drive pulleys 904a and 904b are coupled to the fifth wheel 802 via one of the sprockets 808a and 808b and one of the chains 804a and 804b, respectively. The cable may supply any generated electrical energy output to the OBCS 810 as an input energy to the OBCS 810. In some embodiments, the two generators 902a and 902b may be replaced by any number of generators 902, from a single generator to many generators. In some embodiments, the generators 902 may generate AC electricity or DC electricity, depending on the application. When the generators 902 generate AC power, an AC-to-DC converter may be used to condition and convert the generated electricity for storage. When the generators 902 generate DC power, an DC-to-DC converter may be used to condition the generated electricity for storage.

As described above, the fifth wheel 802 is designed to rotate when the vehicle 800 is in motion and the fifth wheel 802 is extended and/or otherwise in contact with the ground or road surface (or otherwise being driven while the vehicle is in motion). When the fifth wheel 802 rotates, that rotation causes the shaft 806 to rotate, causing the sprockets 808a and 808b to also rotate. Accordingly, the chains 804a and 804b coupled to the sprockets 808a and 808b move or rotate around the sprockets 808a and 808b, respectively. The movement of the chains 804a and 804b while the vehicle 800 is in motion and the fifth wheel 802 is in contact with the ground causes the pulleys 904a and 904b of the rotors of the generators 902a and 902b, respectively, to rotate. As described above, the rotation of the pulleys 904 of the generators 902 causes the rotors of the generators 902 to rotate to cause the generators 902 to generate the electrical energy output via the cable, where the electrical energy output corresponds to the mechanical rotation of the pulleys 904. Thus, rotation of the fifth wheel 802 causes the generators 902a and 902b to generate electrical energy outputs. In some embodiments, the generators 902a and 902b (in combination and/or individually) may generate electrical energy outputs at greater than 400 VAC (for example in a range between 120 VAC and 480 VAC) delivering up to or more than 120 kW of power to the OBCS 810. In some embodiments, the power output of the generators 902a and 902b, in combination and/or individually, may range between 1.2 kilowatts (KW) and 120 kW, for example 1.2 kW, 3.3 kW, 6.6 kW, 22 kW, 26 kW, 62.5 kW, and 120 kW, and so forth. In some embodiments, the generators 902a and 902b provide up to or more than 150 kW of power. The power provided by the generators may be adjusted by adjusting the particular generators used or by otherwise limiting an amount of power being delivered from the OBCS 810 to the battery (or similar charge storage devices), as needed.

In some embodiments, the fifth wheel 802 may be designed to be smaller in diameter than the other wheels of the vehicle 800. By making the fifth wheel 802 smaller in diameter than the other wheels of the vehicle 800, the fifth wheel 802 may rotate more revolutions per distance traveled than the other wheels of the vehicle. Accordingly, the fifth wheel 802 rotates at a faster RPM than the other wheels of the vehicle. The shaft 806, coupled to the fifth wheel 802, has a smaller diameter than the fifth wheel 802. The sprockets 808a and 808b coupled to the shaft 806 have a larger diameter than the shaft 806 but a smaller diameter than the fifth wheel 802. In some embodiments, the diameters of the various components (for example, the fifth wheel 802, the shaft 806 and/or the sprockets 808a and 808) may be varied to further increase the rate of rotation (or rotational speed) of the corresponding components. In some embodiments, the diameter of the fifth wheel 802 may be reduced further as compared to the other wheels of the vehicle. In some embodiments, gearing between the fifth wheel 802 and the shaft 806 and/or between the shaft 806 and the sprockets 808a and 808b may further increase the difference in the rotational rates or speeds of the various components as compared to a wheel of the vehicle 800.

As shown in FIG. 9, the pulleys 904 (and the rotors) of the generators 902 have a smaller diameter than the sprockets 808. Accordingly, the pulleys 904 may rotate at a faster or greater RPM than the sprockets 808 and the fifth wheel 802. Accordingly, the rotors of the generators 902 coupled to the pulleys 904 may rotate at a faster RPM (as compared to the fifth wheel 802) and generate electrical energy that is output to the OBCS 810 via the cable described above. In some embodiments, adjusting the diameters of the various components described herein to cause the pulleys 904a and 904b to rotate at different RPMs and can cause the generators 902a and 902b to generate different amounts of power for transmission to the OBCS 810 (for example, faster rotation may result in more power generated by the generators 902a and 902b than slower rotation). By varying the sizing of the various components, the rotors of the generators 902a and 902b may rotate at greater or smaller rotation rates. The greater the rotational rate, the more power that is generated by the generators 902a and 902b. Thus, to maximize power generation by the generators 902a and 902b, the various components (for example, the fifth wheel 802, the shaft 806, the sprockets 808, the pulleys 904, and so forth), may be sized to maximize the rotation rate of and power generated by the generators 902.

In some embodiments, the sprockets 808a and 808b may have a diameter that is approximately half the diameter of the fifth wheel 802. For example, a ratio of the diameter of the fifth wheel 802 to the sprockets 808a and 808b may be approximately 2:1 such that the sprockets 808a and 808b rotate at approximately twice the rotational speed or RPMs as the fifth wheel 802. More specifically, the diameter of the sprockets 808a and 808b may be between 3" and 5", where the diameter is one of 3", 4", and 5". Similarly, the sprockets 808a and 808b may have a larger diameter than the pulleys 904a and 904b; for example, the pulleys 904a and 904b may have diameters of less than 5" (more specifically, one or more of 1", 2", 3", 4", and 5", inclusive). The resulting rotation of the pulleys 904a and 904b occurs at sufficiently high, sustained speeds or RPMs that the corresponding generators 902a and 902b generate electrical power at levels sufficient to energy the OBCS 810 to charge the battery of the vehicle 800 while the vehicle 800 is in motion.

As the rotors for the generators 902a and 902b rotate, they induce a magnetic field within windings in stator coils of the generators 902a and 902b. The magnetic field generated within the coils may be controlled (for example, increased or decreased) by changing a number of coils in each of the generators 902a and 902b, thus changing the sizing of the generators 902a and 902b. The energy generated by the generators 902a and 902 may be varied (for example, increased or decreased) by introducing and/or changing a number of capacitors or other components utilized in conjunction with the generators 902a and 902b (for example, within the generators 902a and 902b or in series downstream of the generators 902a and 902b), and/or by using a permanent magnet coil in the generators 902. The magnetic field generated within the coils may be directly related to the energy (for example, a current) generated by the generators 902a and 902b. In some embodiments, the magnetic field is related to the torque on the generator such that as the torque on the generator increases, the magnetic field rises. As such, to reduce wear and tear on components in the vehicle 800 and to optimize voltage generation, the magnetic field is managed as described herein. In some embodiments, when the fifth wheel 802 comprises the small motor as described above, the small motor is an AC or DC motor and acts as a fail over device that is coupled directly to the rotors of the generators 902 such that the small motor is able to drive the generator should the pulley 804, the fifth wheel 802, or other device coupling the fifth wheel 802 to the generators 902 fail.

In some embodiments, the extending and retracting of the fifth wheel 802 may occur based on communications with a controller that monitors the state of charge of a battery and/or demand from a motor. For example, when the controller determines that the battery requires a charge or the motor demands electricity (for example, the vehicle 800 is accelerating), the controller issues a signal to a fifth wheel 802 control system that causes the fifth wheel 802 to be extended to be in contact with the ground or road surface while the vehicle 800 is in motion. Once the fifth wheel 802 reaches an RPM of at least 1000 RPM, the rate of rotation (for example, the RPMs) of the fifth wheel 802 may be controlled and/or monitored such that the battery is charged such that the charge of the battery is maintained or increased or such that the motor is provided with sufficient energy to drive the vehicle 800. For example, if the controller determines that the battery needs to be charged while the vehicle 800 is in motion, the controller may issue the signal to charge the battery to the fifth wheel 802 system. This signal may cause the fifth wheel 802 system to extend the fifth wheel 802 to contact the ground or road surface. When the fifth wheel 802 reaches 1000 RPM while the vehicle 800 is moving, the generators 902a and 902b generate sufficient electrical energy to charge the battery at a rate greater than it is being discharged by the motor to move the vehicle 800 or to feed the motor at a level sufficient to fully drive the vehicle 800. As the controller monitors the charge of the battery or the demand from the motor, when the charge level or the charge state of the battery or the motor demand reaches a second threshold, the controller may issue a second signal to stop charging the battery or stop feeding the motor. This second signal may cause the fifth wheel 802 to be retracted or otherwise disconnect the feed of electricity from the battery or the motor.

In some embodiments, retracting the fifth wheel 802 occurs in a controlled matter. In some embodiments, the fifth wheel 802 continues to rotate when it is initially retracted and no longer in contact with the ground or road surface. As such, the generators 902a and 902b coupled to the fifth wheel 802 continue to generate electrical energy while the fifth wheel 802 continues to rotate based on its inertia. The controller may issue the second signal before the battery is fully charged so as to not waste any energy generated by the generators 902a and 902b. In some embodiments, energy generated by the generators 902a and 902b may be offloaded from the vehicle 800, for example to a land-based grid or energy storage device (for example, a home battery, and so forth).

In some embodiments, the controlled deceleration of the rotation of the fifth wheel 802 when the fifth wheel 802 is retracted occurs due to a brake or similar component that causes the fifth wheel 802 to stop rotating in a controlled manner. In some embodiments, the brake may include a physical brake or other slowing techniques. In some embodiments, the braking of the fifth wheel 802 is regenerative to provide energy to the battery or the motor while the fifth wheel 802 is braking.

In some embodiments, as described above, the fifth wheel 802 extends in response to the first signal from the controller requesting that the battery of the vehicle 800 be charged. As noted above, the fifth wheel 802 may have a mass that allows the fifth wheel 802 to continue to rotate under inertia, etc., when the fifth wheel 802 is retracted and no longer in contact with the ground or road surface while the vehicle 800 is in motion. In some embodiments, the fifth wheel 802 is coupled to the flywheel or similar component that spins under the inertia, etc., after the fifth wheel 802 is retracted from the ground or road surface. Based on the inertia of the fifth wheel 802 or the flywheel or similar component, mechanical energy may be generated from the movement of the vehicle 800 and stored for conversion to electricity (for example, by the generators 902a and 902b, etc.).

Once the fifth wheel 802 is extended to contact the ground or road surface, the fifth wheel 802 begins rotating when the vehicle 800 is moving. Due to the smaller size of the fifth wheel 802, as described above, the fifth wheel 802 rotates with more RPMs than the other wheels of the vehicle 800. While the fifth wheel 802 rotates, the sprockets 808a and 808b described above also rotate, causing the generators 902a and 902b to generate electrical energy. The continued reduction in diameters of components between the other wheels of the vehicle 800 and the pulleys 904 of the generators 902 ensures that the generators 902 rotate at a sufficiently fast rate (RPMs) that they generate power to supply to the OBCS 810, as described herein. The electrical energy is fed to the OBCS 810, which charges the vehicle 800 via the charging port of the vehicle 800, or directly to the motor. The fifth wheel 802 is retracted in response to the second signal from the controller, and may or may not continue to rotate and generate electricity under its inertia.

As described above, due to the mass and other properties of the fifth wheel 802 or the flywheel or similar components, the fifth wheel 802 or the fly wheel or similar components may continue to rotate or otherwise maintain some mechanical energy though the fifth wheel 802 is no longer in contact with the ground or road surface while the vehicle 800 is moving. In some embodiments, the fifth wheel 802, once it reaches the 1000 RPMs described above, is able to maintain its rotation even though the fifth wheel 802 is no longer being "driven" by the ground or road surface when the vehicle 800 is moving. As such, the generators 902a and 902b are able to continue to generate electrical energy for charging the battery or feeding the motor of the vehicle 800 via the OBCS 810. In some embodiments, the fifth wheel 802 or the flywheel or similar components may continue to generate mechanical energy that is converted to electrical energy by the generators 902a and 902b until the fifth wheel 802 or flywheel or similar components are stopped using the brake or similar components, as described above, or until the fifth wheel 802 or flywheel or similar components stop rotating due to friction. In some embodiments, the fifth wheel 802 or flywheel may be replaced with a geared motor or similar component that is smaller in diameter than the other wheels of the vehicle.

In some embodiments, the fifth wheel 802 may be configured to not be in contact with the ground (for example in a position stored upward from the ground) as the vehicle accelerates (for example from rest) to reduce the drag on the vehicle as the vehicle accelerates and so to minimize the energy reduction in an energy storage device (e.g., ultracapacitor, battery) required for acceleration of the vehicle. The fifth wheel 802 may be configured to drop, for example automatically, to contact the ground to begin generating energy as discussed herein when the vehicle is not accelerating (for example from rest), for example when the vehicle has reached a substantially constant, non-zero velocity for example 25 miles per hour. The fifth wheel may be configured to automatically raise (to avoid contact with the ground to reduce drag on the vehicle) when the vehicle is accelerating and/or when the vehicle's acceleration is above a certain threshold, when the vehicle is accelerating within certain velocities and/or when the vehicle is moving within threshold velocities. The fifth wheel may be configured to automatically drop (to contact the ground to generate energy) when the vehicle is not accelerating, and/or when the vehicle's acceleration is below a certain threshold and/or when the vehicle is moving within threshold velocities.

Figure 10:
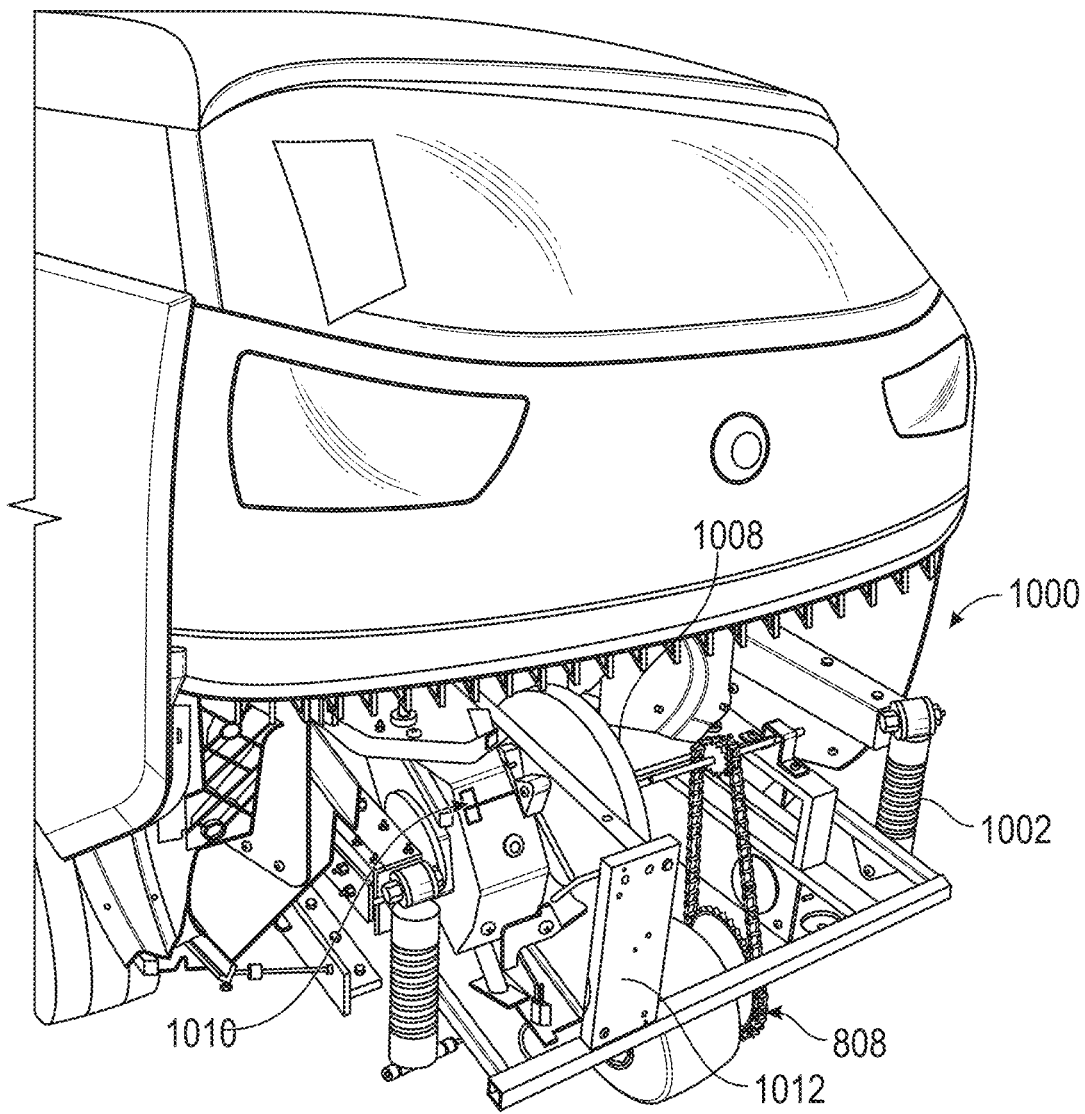
FIG. 10 illustrates an example implementation of a fifth wheel in a vehicle.

FIG. 10 is an alternate fifth wheel system 1000 illustrating the fifth wheel of FIG. 8 mechanically coupled to a generation unit 1010 that converts a mechanical rotation of the fifth wheel into an electrical energy output to the vehicle 800, for example the battery or the capacitor module. In some embodiments, the OBCS 810 described herein comprises the generation unit 1010 (for example, instead of or in addition to the generators 902a and 902b described above). The generation unit 1010 and the generators 902a and 902b may be used interchangeably herein. In some embodiments, the generation unit 1010 may be directly coupled to the battery, the capacitor module, and/or the motor. The system 1000 includes the fifth wheel 802 as supported by the support structure 807 as shown in FIG. 8. In some embodiments, the support structure 807 includes an independent suspension system 1002 that enables the fifth wheel 802 and the corresponding components coupled to the fifth wheel 802 to move vertically and/or horizontally relative to the ground or the road surface or the vehicle 800 to react or respond to variations in the road or road surface. The independent suspension 1002 may operate independently of the suspension of the vehicle 800, thus allowing the fifth wheel 802 and corresponding components to move differently from the vehicle 800, allowing the fifth wheel system 1000 to "float freely" relative to the vehicle 800. The independent suspension 1002 may help protect the components coupled to the fifth wheel 802 (for example, the components shown in FIG. 10) by reducing the effects of the variations in the road or road surface to the components. In some embodiments, the independent suspension 1002 includes one or more shocks, struts, linkages, springs, shock absorbers, or similar components that help enable, compensate for, and/or reduce the vertical and/or horizontal movement of the fifth wheel 802 and coupled components. In some embodiments, the independent suspension 1002 also includes various components that improve stability of the components of the OBCS 810 described herein. For example, the independent suspension 1002 may include a stabilization bracket 1012 disposed between a flywheel 1008 and a generation unit 1010, described in more detail below. The stabilization bracket 1012 disposed between the flywheel 1008 and the generation unit 1010 may provide stabilizing supports between two components that move or have moving parts. The generation unit 1010 may include the generator 902 described above or an alternator or any corresponding component(s) that generate electricity from mechanical energy. The generation unit 1010 may harvest the mechanical/kinetic energy from the movement of the vehicle 800 (or from the inertia caused by the movement of the vehicle 800) prior to a build-up of friction or heat or other conditions that may otherwise cause energy to be lost by the vehicle 800 (for example, to the heat or other conditions), thereby saving and storing energy that would otherwise be lost or wasted.

The alternate system 1000 further may include the fifth wheel 802 configured to rotate or spin on the shaft 806. As described above, the rotation of the fifth wheel 802 causes the shaft 806 to rotate and further causes the sprocket 808 and chain 804 to rotate. The chain 804 is coupled to a second shaft 704, for example via a second pulley or sprocket 709 rotated by the chain 804. In some embodiments, the shaft 806 is coupled to the second shaft 704 via another means, for example a direct coupling, a geared coupling, and so forth. In some embodiments, the sprockets 808 and 709 (or similar components) and so forth may be sized to allow for balancing of rotational speeds between the various components. For example, the sprockets 808 on the shaft 806 and corresponding sprockets or gearing on the second shaft 704 are sized to balance rotations between the fifth wheel 802 and the generation unit 1010. In some embodiments, the sizing for the sprockets 808 and 709 (and similar components) is selected to control the electricity generated by the generation unit 1010.

The generation unit 1010 may be electrically coupled to a capacitor (for example, one of the capacitor modules), the battery, the motor, and/or a cut-off switch. The cut-off switch may disconnect the output of the generation unit 1010 from the capacitor, the battery, and/or the motor such that electrical energy generated by the generation unit 1010 may be transferred to the battery, the capacitor module, or to the motors as needed. In some embodiments, the cut-off switch can be controlled by an operator or the controller of the vehicle 800 or the second controller of the OBCS 810. For example, the controller of the vehicle 800 or the OBCS 810 may receive, identify, and/or determine an interrupt signal to initiate the dump. In response to the interrupt signal, the controller may disconnect the output of the generation unit 1010 from the battery, the capacitor module, and/or the motor. Disconnecting the output of the generation unit 1010 from the capacitor, the battery, and/or the motor may ensure that any residual electrical energy in one or more components of the OBCS 810 (for example, the generation unit 1010) is transferred or "dumped" to the battery and/or the capacitor module and therefore control a supply of back-up high voltage. In some embodiments, during the dump, the output of the generation unit 1010 may be connected to a dump load or similar destination when disconnected from the capacitor module, the battery, and/or the motor to prevent damage to any coupled electrical components. In some embodiments, the dump load may comprise a back-up battery, capacitor, or similar energy storage device. In some embodiments, the voltage dump may occur for a period of time and/or at periodic intervals defined by one or more of a time for example since a previous dump, a distance traveled by the vehicle for example since the previous dump, a speed of the vehicle for example since the previous dump, and a power generated and/or output by the generation unit 1010, for example since the previous dump. After the dump is complete (for example, the period of time expires), then the controller may disconnect the dump load from the generation unit output (for example, at a generation unit terminal) and reconnect the battery, the capacitor module, and the motor.

In some embodiments, the voltage dump may comprise opening a contactor that is positioned downstream of the generation unit 1010 or the generators 902. Opening the contactor may disconnect the generation unit 1010 or the generators 902 from the downstream components (for example, the load components for the generation unit 1010 or the generators 902). In some embodiments, the controls for initiating and/or deactivating the dump are conveniently located for the vehicle operator to access or coupled to the controller for the vehicle 800.

In some embodiments, the generation unit 1010 outputs the generated electrical energy in pulses or with a constant signal. For example, the operator or the controller of the vehicle 800 or the second controller of the OBCS 810 In some embodiments, the generation unit 1010 is switchable between outputting the electrical energy in pulses or in the constant signal. The operator may control whether the output is pulsed or constant or the OBCS 810 may automatically control whether the output is pulsed or constant without operator intervention based on current demands of the vehicle 800 and so forth. In some embodiments, when the output is pulsed, the operator and/or the OBCS 810 can control aspects of the pulsed signal, including a frequency of the pulse, an amplitude of the pulse, a duration of each pulse, and so forth. Similarly, when the output is constant, the operator and/or the OBCS 810 may control aspects of the constant signal, including a duration of the signal and an amplitude of the signal.

In some embodiments, the operator of the vehicle 800 can control the height of the fifth wheel 802. For example, the operator determines when to lower the fifth wheel 802 so that it is in contact with the road or a road surface, thereby causing the fifth wheel 802 to rotate. The operator may have controls for whether the fifth wheel 802 is in a raised position, where it is not in contact with the road, or in a lowered position, where it is in contact with the road. Additionally, or alternatively, the operator may have options to control specifics of the raised or lowered position, for example how low to position the fifth wheel 802. Such controls may allow the operator to control the amount of force that the fifth wheel 802 provides on the road or road surface, which may impact the electrical energy generated by the OBCS 810. For example, when the fifth wheel 802 is pressing down on the road surface with a large amount of force, then this force may create more resistance against the fifth wheel 802 rotating when the vehicle 800 is moving, thereby reducing the electrical energy generated by the OBCS 810. On the other hand, when the force on the fifth wheel 802 is small amount of force, then the fifth wheel 802 may lose contact with the road or road surface depending on variations in the road surface, thereby also reducing the electrical energy generated by the OBCS 810. Thus, the controls may provide the operator with the ability to tailor the downward force exerted by the fifth wheel 802 on the road based on road conditions and based on the need for power. In some embodiments, the OBCS 810 may automatically control the force of the fifth wheel 802 on the road to maximize electrical energy generation based on monitoring of the road surface and electrical energy being generated.

Additionally, the operator of the vehicle 800 may choose to extend the fifth wheel 802 so that it contacts the road or retract the fifth wheel 802 so that it does not contact the road based on draft or drag conditions. For example, if the drag increases or is expected to increase based on various conditions, the operator may choose to retract the fifth wheel 802 or keep the fifth wheel 802 retracted. If the drag decreases or is expected to decrease based on conditions, then the operator may choose to extend the fifth wheel 802 or keep it extended. In some embodiments, the OBCS 810 may automatically extend and/or retract the fifth wheel 802 based on drag or potential drag conditions without the operator's involvement.

In some embodiments, the controller may enable retraction and/or extension of one or more of the multiple fifth wheels 802. Such control of the fifth wheels 802 may be based on an analysis of charge remaining in the energy storage components of the electric powered devices and/or a speed or other conditions of power generation using the fifth wheels 802. In some instances, the controller may determine that one or more of the fifth wheels should be extended to generate power based on the movement and/or other conditions of the electric powered device.

In some instances, the fifth wheel 802 is coupled to a gearbox allowing one or more ratios of rotating components to be adapted to the movement of the electric powered device or vehicle. The gearbox may allow the ratios of rotating components to be adjusted to change the amount of power generated by the fifth wheels 802, where the gearbox can allow for increased power generation as needed depending on various conditions.

In some instances, the fifth wheel 802 may be coupled to a gearbox allowing one or more ratios of rotating components to be adapted to the movement of the vehicle, enabling the OBCS 810 and/or an operator to mechanically control and/or adjust rates at which electricity is generated by generators coupled to the fifth wheel(s) 802. For example, the gearbox can enable changing of ratios between the rotation of the fifth wheel(s) 802 of the vehicle based on a speed at which the vehicle is traveling or a grade on which the vehicle is traveling, thereby impacting rotations of the generator and electricity produced by the generator. For example, if the vehicle is traveling slowly or up-hill, or traveling against a current, or into a headwind, the gearbox can be adjusted such that the ratio of the generator and the fifth wheels 802 are closer to each other. If the vehicle is traveling quickly or down-hill, or with a current, or with a tail-wind, the gearbox can be adjusted such that the ratio of the generator and the fifth wheels 802 are such that a single rotation of the fifth wheel 802 results in multiple rotations of the generator via the gearbox, and so forth.

Figure 11:
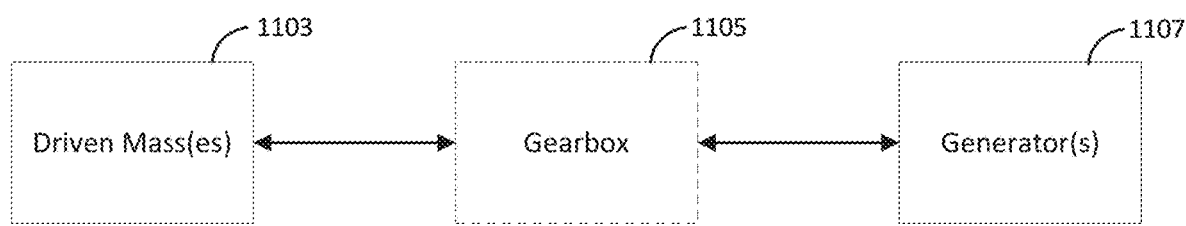
FIG. 11 is block diagram illustrating an example implementation of a gearbox.

FIG. 11 is block diagram illustrating an example implementation of a gearbox 1105. The gearbox 1105 may include one or more gears which may be one or more sizes. The gearbox 1105 can be coupled to one or more driven mass(es) 1103 and a generator 1107. The driven mass(es) 1103 can include one or more rollers, as described herein, and/or one or more "fifth" wheels, as described herein. In some implementations, the driven mass(es) 1103 can include one or more turbines such as a water and/or wind turbine. The gearbox 1105 can adjust a rotational velocity of a rotatable component of the generator 1107 with a rotational velocity of a rotatable component of the driven mass(es) 1103. For example, the driven mass(es) 1103 may be rotatably coupled to a first gear of the gearbox 1103 and the generator 1107 may be rotatably coupled to a second gear of the gearbox 1105. The first and second gears of the gearbox 1105 may be rotatably coupled. The first and second gears may be different sizes, including having different diameters, such that rotation of the first gear at a first angular velocity causes rotation of the second gear at a second angular velocity. The gearbox 1105 can change a ratio of angular velocity between the driven mass(es) 1103 and the generator 1107 by changing a gear to which the driven mass(es) 1103 and/or generator 1107 is rotatably coupled. The gearbox 1105 can adjust the ratio of rotation, such as by changing the gear to which the driven mass(es) 1103 and the generator 1107 is rotatably coupled, according to user input and/or according to operational settings, according to any of the examples discussed herein.

Figure 12A:
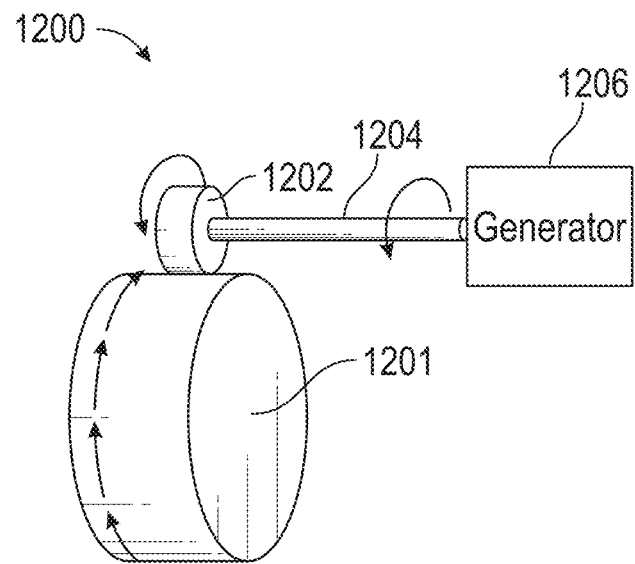
FIGS. 12A-12B illustrate example implementations of a roller configured to contact a wheel.

FIG. 12A is a diagram illustrating an example embodiment of an apparatus 1200 comprising a roller rotatably couplable to a wheel of a vehicle. As shown in FIG. 12A, the apparatus 1200 may comprise a roller 1202, a shaft 1204 and a generator 1206. The roller 1202 may comprise a substantially cylindrical shape comprising a length, a diameter, a curved surface and a center axis. A curved surface of the roller 1202 may be in substantial physical contact with a curved surface of the wheel 1201. The center axis of the roller 1202 may be substantially parallel to a center axis of the wheel 1201. The roller 1202 may be configured to rotate about its center axis. The roller 1202 may be rotatably couplable to a wheel 1201 of the vehicle such that rotation of the wheel 1201 causes rotation of the roller 1202. The roller 1202 may rotate in an opposite direction than the wheel 1201, for example as shown in FIG. 12A. The roller 1202 may rotate at a greater rotational velocity than the wheel 1201.

With continued reference to FIG. 12A, the roller 1202 may be rotatably coupled to a shaft 1204 such that rotation of the roller 1202 can cause rotation of the shaft 1204. The shaft 1204 may rotate about an axis that is substantially parallel to the axis of the roller 1202 and may rotate in a same direction as the roller 1202, for example as shown in FIG. 12A. In some embodiments, the shaft 1204 may be fixedly rotatably coupled to the roller 1202 such that the shaft 1204 can only rotate when the roller 1202 rotates. In some embodiments, the shaft 1204 may be configured to rotate when the roller 1202 is not rotating. For example, after a roller 1202 discontinues rotating, the shaft 1204 may continue to rotate, for example due to rotational inertia. For example, the roller 1202 and/or shaft 1204 may comprise a one-way ratchet device that causes the shaft 1204 to rotate when the roller 1202 rotates and allows the shaft 1204 to continue to rotate for a period of time even after the roller 1202 stops rotating. In some embodiments, the shaft 1204 may be configured to not rotate when the roller 1202 is rotating. For example, in a disengaged state, as discussed in greater detail herein, the roller 1202 may rotate in response to rotation of a vehicle wheel but may not cause rotation of the shaft 1204 to generate energy at the generator 1206.

The shaft 1204 may be operably coupled to a generator 1206. The generator 1206 may be configured to generate energy (e.g., an electrical output) in response to mechanical movement such as the rotation of the shaft 1204. The generator 1206 may be electrically coupled to the vehicle and may provide generated energy to the vehicle, for example to a motor of the vehicle and/or to an energy storage device of the vehicle that includes one or more batteries and/or capacitors (e.g., ultracapacitors) or one or more hypercapacitors.

Figure 12B:
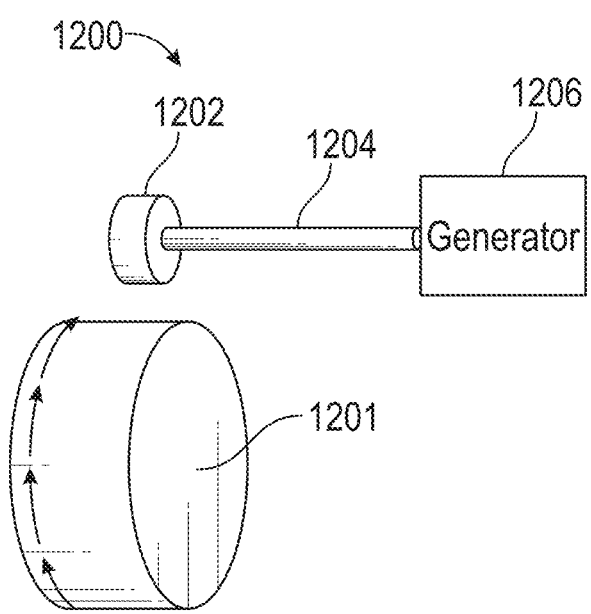

FIG. 12B is a diagram illustrating an example embodiment of an apparatus 1200 comprising a roller that is removably coupled to a wheel of a vehicle. The apparatus 1200 may exist in one of (1) an engaged state or (2) a disengaged state. In the engaged state, the roller 1202 may be in physical contact with the wheel 1201 (e.g., rotatably coupled to the wheel 1201) in which the rotation of the wheel 1201 causes the roller 1202 to rotate. In some embodiments, in the disengaged state, the roller 1202 may not be in physical contact with the wheel 1201 such that rotation of the wheel 1201 does not cause the roller 1202 to rotate. In some embodiments, in the disengaged state, the roller 1202 may be in physical contact with the wheel 1201 such that rotation of the wheel 1201 causes the roller 1202 to rotate but the roller 1202 may not be rotatably coupled to the shaft 1204 such that rotation of the roller 1202 does not cause the shaft 1204 (or other similar component) to rotate to cause generation of energy at the generator 1206.

FIG. 12B shows a roller 1202 in an example disengaged state such that the roller 1202 is not in physical contact with the wheel 1201 and will not rotate in response to a rotation of the wheel 1201. The roller 1202 may transition between the engaged and the disengaged states. In some embodiments, the roller 1202 may transition between the engaged and the disengaged states automatically, for example, based at least in part on an energy demand of the vehicle (e.g., an energy demand of a motor of the vehicle) and/or a rotational velocity of the wheel 1201. In some embodiments, the roller 1202 may transition between the engaged and the disengaged states in response to a user input, such as a driver of the vehicle activating a user input device, such as a button, lever, or switch.

Figure 13A:
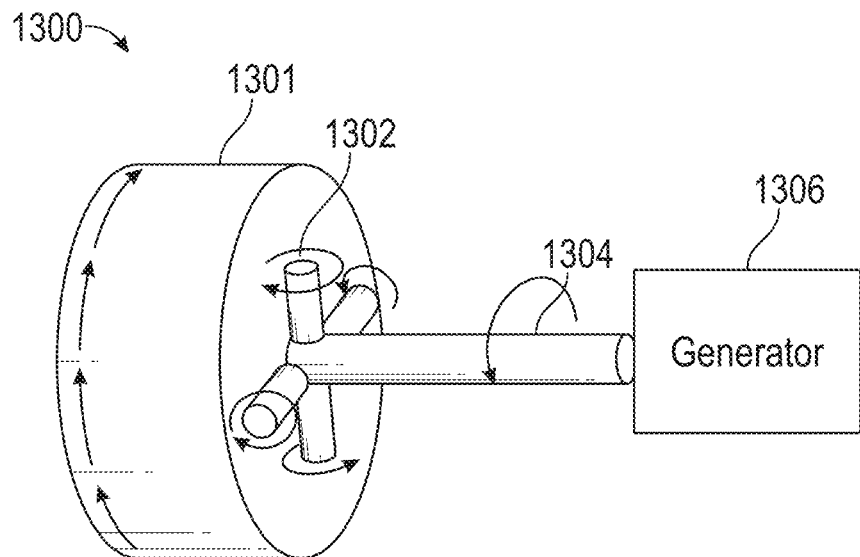
FIGS. 13A-13B illustrate example implementations of one or more rollers configured to contact a sidewall surface of a wheel.

FIG. 13A is a diagram illustrating an example embodiment of the apparatus 1300 comprising one or more rollers rotatably couplable to a sidewall of a wheel of a vehicle. As shown in FIG. 13A, the apparatus 1300 may comprise one or more rollers 1302, a shaft 1304 and a generator 1306. Each of the one or more rollers 1302 may comprise a substantially cylindrical shape and may further comprise a length, a diameter, a curved surface and a center axis. A curved surface of each of the one more rollers 1302 may be in substantial physical contact with a sidewall surface of the wheel 1301. The center axis of each of the one or more rollers 1302 may be substantially orthogonal to a center axis of the wheel 1301. Each of the one or more rollers 1302 may be configured to rotate about its center axis. Each of the one or more rollers 1302 may be rotatably couplable to the wheel 1301 of the vehicle such that rotation of the wheel 1301 causes rotation of each of the one or more rollers 1302. Each of the one or more rollers 1302 may rotate at a greater rotational velocity than the wheel 1301.

The roller(s) 1302 may be configured to be in physical contact with a sidewall of the wheel 1301 at any distance away from a center axis of the wheel. For example, the roller(s) 1302 may be in physical contact with a sidewall of the wheel 1301 close to the center axis of the wheel or far from a center axis of the wheel. The roller(s) 1302 may rotate at a greater rotational velocity when in physical contact with the sidewall of the wheel 1301 far from a center axis of the wheel 1301 than when in physical contact with the sidewall of the wheel 1301 near a center axis of the wheel 1301.

With continued reference to FIG. 13A, the roller(s) 1302 may be rotatably coupled to a shaft 1304 such that rotation of the roller(s) 1302 causes rotation of the shaft 1304. The roller 1302 may be coupled (e.g., rotatably coupled) to the shaft 1304 for example via one or more coupling devices as required or desired such as gears, sprockets, chains, belts, pulleys and the like. The shaft 1304 may rotate about an axis that is substantially orthogonal to the axes of the roller(s) 1302. In some embodiments, the shaft 1304 may be fixedly rotatably coupled to the roller(s) 1302 such that the shaft 1304 can only rotate when the roller(s) 1302 rotate. In some embodiments, the shaft 1304 may be configured to rotate when one or more of the roller(s) 1302 is not rotating, for example, after a roller 1302 discontinues rotating, the shaft 1304 may continue to rotate, for example due to rotational inertia. For example, the roller(s) 1302 and/or shaft 1304 may comprise a one-way ratchet device that causes the shaft 1304 to rotate when the roller(s) 1302 rotate and allows the shaft 1304 to continue to rotate even when one of the roller(s) 1302 is not rotating (e.g., has stopped rotating). In some embodiments, the shaft 1304 may be configured to not rotate when one or more of the roller(s) 1302 are rotating. For example, in a disengaged state, as discussed in greater detail herein, the roller(s) 1302 may rotate in response to rotation of a vehicle wheel but may not cause rotation of the shaft 1304 to generate energy at the generator 1306.

The shaft 1304 may be operably coupled to a generator 1306. The generator 1306 may be configured to generate energy (e.g., an electrical output) in response to mechanical movement such as the rotation of the shaft 1304. The generator 1306 may be electrically coupled to the vehicle and may provide generated energy to the vehicle, for example to a motor of the vehicle and/or to an energy storage device of the vehicle that includes one or more batteries and/or capacitors (e.g., ultracapacitors) or one or more hypercapacitors.

Figure 13B:
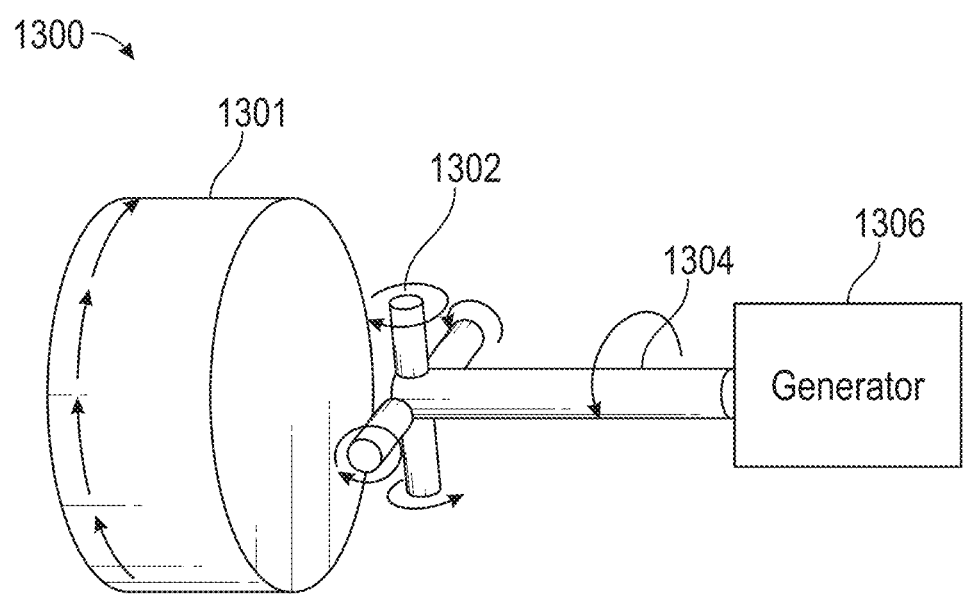

FIG. 13B is a diagram illustrating an example embodiment of the apparatus 1300 comprising one or more rollers that are removably coupled to a sidewall of a wheel of a vehicle. The apparatus 1300 may exist in one of (1) an engaged state or (2) a disengaged state. In the engaged state, the roller(s) 1302 may be in physical contact with the wheel 1301 (e.g., rotatably coupled to a sidewall of the wheel 1301) in which the rotation of the wheel 1301 causes the roller(s) 1302 to rotate. In some embodiments, in the disengaged state, the roller(s) 1302 may not be in physical contact with the wheel 1301 such that rotation of the wheel 1301 does not cause the roller(s) 1302 to rotate. In some embodiments, in the disengaged state, the roller(s) 1302 may be in physical contact with the wheel 1301 such that rotation of the wheel 1301 causes the roller(s) 1302 to rotate but the roller(s) 1302 may not be rotatably coupled to the shaft 1304 such that rotation of the roller(s) 1302 does not cause the shaft 1304 (or other similar component) to rotate to cause generation of energy at the generator 1306.

FIG. 13B shows roller(s) 1302 in an example disengaged state such that the roller(s) 1302 are not in physical contact with the wheel 1301 and will not rotate in response to a rotation of the wheel 1301. The roller(s) 1302 may transition between the engaged and the disengaged states. In some embodiments, the roller(s) 1302 may transition between the engaged and the disengaged states automatically, for example, based at least in part on an energy demand of the vehicle (e.g., an energy demand of a motor of the vehicle) and/or a rotational velocity of the wheel 1301. In some embodiments, the roller(s) 1302 may transition between the engaged and the disengaged states in response to a user input, such as a driver of the vehicle toggling a user input device such as a button, switch or lever.

The rotational inertia of the rollers 1302 in the example embodiment of FIGS. 13A-13B and other examples herein can be changed, for example increased or decreased. Increasing the rotational inertia of the rollers can cause more or less friction to be applied to the wheel 1301 and also cause more or less energy to be generated at the generator 1306. For example, more energy would be required to rotate a roller 1302 with a high rotational inertia than would be required to rotate a roller 1302 with less rotational inertia. Thus, a roller 1302 with high rotational inertia could more quickly decelerate the rotation of the wheel 1301 while simultaneously causing more energy to be generated at the generator 1306 than a roller with lower rotational inertia. For example, when acceleration or a constant speed of the vehicle is desired, the rotational inertia of the roller(s) 1302 may be low to apply less friction to the wheel 1301 (which may thereby cause less energy to be generated at the generator 1306) and when deceleration of the vehicle is desired (e.g., stopping), the rotational inertia of the roller(s) 1302 may be high to apply more friction to the wheel 1301 (which may thereby cause more energy to be generated at the generator 1306). Thus, for any given desired mode of operation of the vehicle (e.g., acceleration, deceleration) a maximum energy may be generated at the generator 1306 by changing a rotational inertia of the rollers 1302.

In some implementations, the rotational inertia of the rollers 1302 can change automatically for example in response to an energy demand of the motor of the vehicle, a rotational velocity of the wheel, and/or desired braking etc. In some implementations, the rotational inertia of the rollers can change in response to a manual user input. The rotational inertia of the roller 1302 can be changed by changing a state of the roller 1302, the shaft 1304 (or other coupling device), and/or changing a state of the generator 1306. In some implementations, a gearbox may change the rotational inertia of the roller 1302 by changing a gear ratio between the roller 1302 and the generator 1306.

Figure 14A:
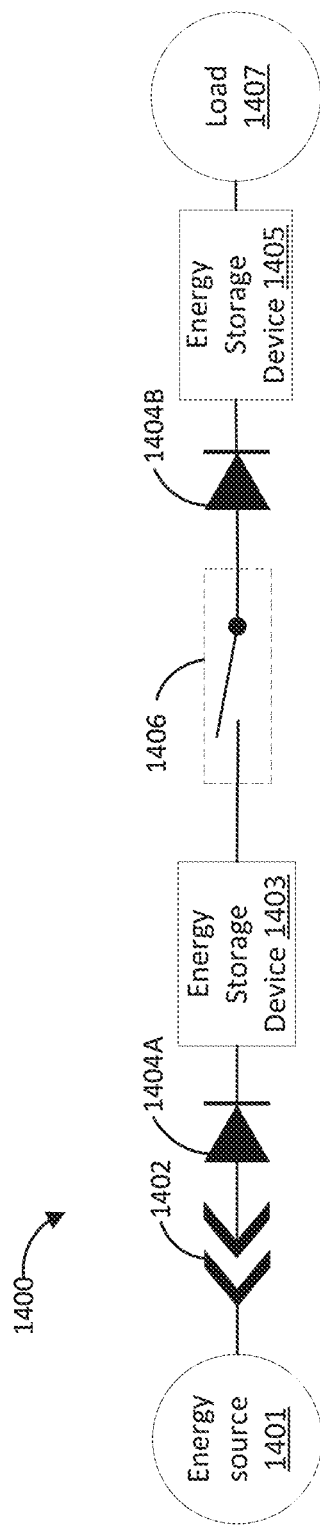
FIG. 14A is a block diagram illustrating an example energy system.

FIG. 14A is a block diagram illustrating an example energy system 1400. The energy system 1400 may include similar structural and/or operation features as example energy system 150 shown and/or described herein. The energy system 1400 can include an energy source 1401, energy storage device 1403, energy storage devices 1405, and a load 1407. In some implementations, the energy system 1400 can optionally include an electrical interface 1402, a diode 1404A, a switch 1406A, and/or a diode 1404B.

The energy source 1401 can include an energy generation or regeneration system. In some implementations, the energy source 1401 can include a solar power generation system. The energy source 1401 can include one or more solar panels and/or solar cells configured to generate an electrical voltage and/or current in response to exposure to light. In some implementations, the energy source 1401 may be included within a vehicle. For example, the energy source 1401 may include an on-board power generation system disposed within and/or on a vehicle and that is mobile with the vehicle. In some implementations, the energy source 1401 may be separate from a vehicle. For example, the energy source 1401 may be stationary or in a fixed location such as a charging station.

The electrical interface 1402 can include a plug configured to mechanically and/or electrically couple the energy source 1401 to the energy storage device 1403. The energy storage device 1403 may be removably coupled to the energy source 1401 via the electrical interface 1402.

The diode 1404A can include one or more diodes configured to conduct an electrical current in one direction. The diode 1404A can be biased toward the energy source 1403. The diode 1404A may be configured to conduct an electrical current from the energy source 1401 to the energy storage device 1403. The diode 1404A may be configured to prevent an electrical current from passing from the energy storage device 1403 to the energy source 1401. The diode 1404A may act as an insulator and prevent an electrical current from passing until a voltage across the diode 1404A exceeds a threshold. The diode 1404A may open to allow a current to pass in response to a voltage across the diode 1404A exceeding a threshold.

The energy storage device 1403 can include one or more devices configured to store energy such as a voltage. The energy storage device 1403 can include one or more capacitors, such as ultracapacitors and/or supercapacitors. The energy storage device 1403 may be configured to receive energy from the energy source 1401 via the electrical interface 1402 and/or the diode 1404A.

The switch 1406 can include one or more electrical switches, relays, circuits, or the like. The switch 1406 may be configured to transition between open and closed states. In a closed state, the switch 1406 may be configured to conduct an electrical current. In a closed state, the switch 1406 may be configured to prevent an electrical current from passing.

The diode 1404B may include similar structural and/or operational features as any of the other diodes shown and/or described herein, such as diode 1404A.

The energy storage device 1405 may receive energy from the energy storage device 1403 via the switch 1406 and/or diode 1404B. The energy storage device 1405 can include one or more devices configured to store energy such as a voltage. The energy storage device 1405 can include one or more batteries. The energy storage device 1405 can include a battery field or battery array. The energy storage device 1405 can include one or more lithium batteries, such as lithium ion batteries, lithium polymer batteries, or the like.

The load 1407 may receive energy from the energy storage device 1405. The load 1407 can include a device configured to consume energy or power. The load 1407 can include a motor of a vehicle.

Figure 14B:
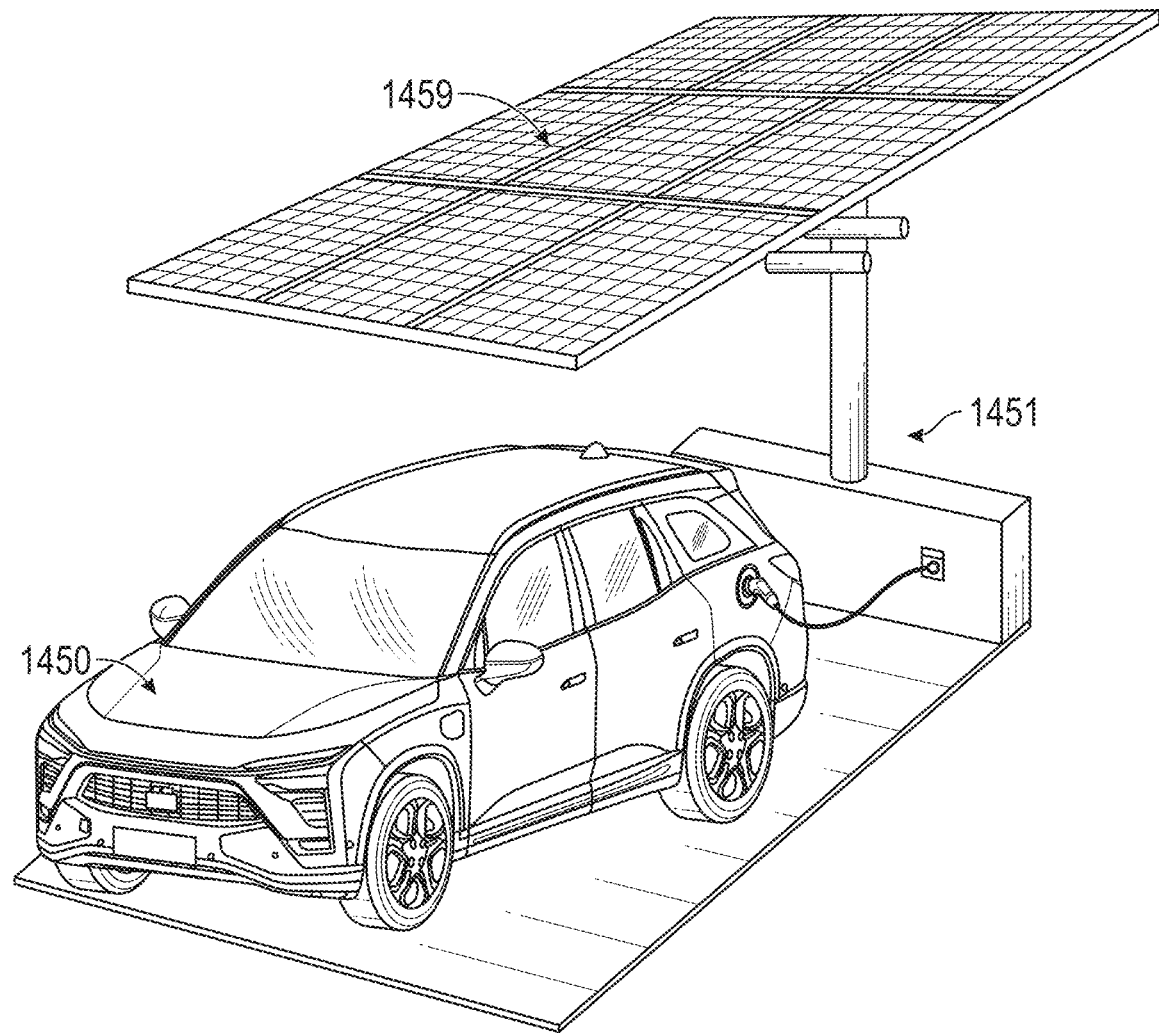
FIG. 14B illustrates an example implementation of an energy system including a solar charging station used to charge a vehicle.

FIG. 14B illustrates an example implementation of an energy system including a solar charging station 1451 used to charge a vehicle 1450. The solar charging station 1451 can include one or more solar panels and/or solar cells 1459. The solar charging station 1451 can include one or more energy storage devices such as capacitors and/or batteries. The solar panels 1459 may be configured to generate a voltage and/or current in response to light. The solar charging station 1451 may be configured to store energy generated by the solar panels 1459 in one or more storage devices of the solar charging station 1451.

The vehicle 1450 may include one or more energy storage devices such as capacitors and/or batteries. The vehicle 1450 may be configured to receive energy from the solar charging station 1451. For example, the vehicle 1450 may receive energy from the solar panels 1459 and/or from an energy storage device of the solar charging station 1451. The vehicle 1450 may be configured to store energy from the solar charging station 1451 in a capacitor storage device of the vehicle 1450 such as an ultracapacitor or supercapacitor. The vehicle 1450 may transfer energy from a capacitor storage device to a battery storage device of the vehicle 1450 and/or to a load of the vehicle 1450. Advantageously, the vehicle 1450 may be configured to receive a large amount of energy from the solar charging station 1451 in a short amount of time to store in an electric field of a capacitor storage device which may reduce charge times of the vehicle 1450.

Figure 14C:
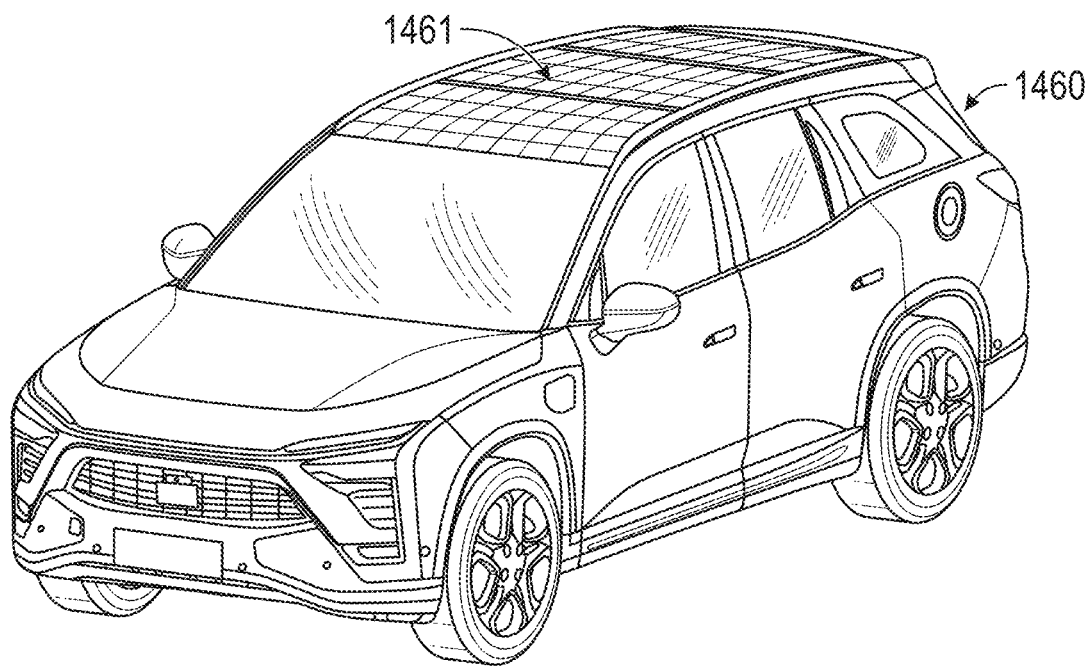
FIG. 14C illustrates an example implementation of an energy system including one or more solar panels and/or solar cells and a vehicle.

FIG. 14C illustrates an example implementation of an energy system including one or more solar panels and/or solar cells 1461 and a vehicle 1460. The solar panels 1461 may be configured to generate a voltage and/or current in response to light. The solar panels 1461 may be disposed on a surface of the vehicle 1460. For example, the solar panels 1461 may be disposed on a roof surface of the vehicle 1460, on a hood surface of the vehicle 1460, on a trunk surface of the vehicle 1460, or the like. In some implementations, the solar panels 1461 may be disposed on a side surface of the vehicle 1460 such as on a door of the vehicle 1460. Advantageously, the solar panels 1461 may be mobile with the vehicle 1460 and may generate energy as the vehicle 1460 travels.

The vehicle 1460 may include one or more energy storage devices such as capacitors and/or batteries. The vehicle 1460 may be configured to receive energy from the solar panels 1461. The vehicle 1460 may be configured to store energy from the solar panels 1461 in a capacitor storage device of the vehicle 1460 such as an ultracapacitor or supercapacitor. The vehicle 1460 may transfer energy from a capacitor storage device to a battery storage device of the vehicle 1460 and/or to a load of the vehicle 1460. Advantageously, the vehicle 1460 may be configured to receive a large amount of energy from the solar panels 1461 in a short amount of time to store in an electric field of a capacitor storage device which may reduce charge times of the vehicle 1460.

Figure 15A:
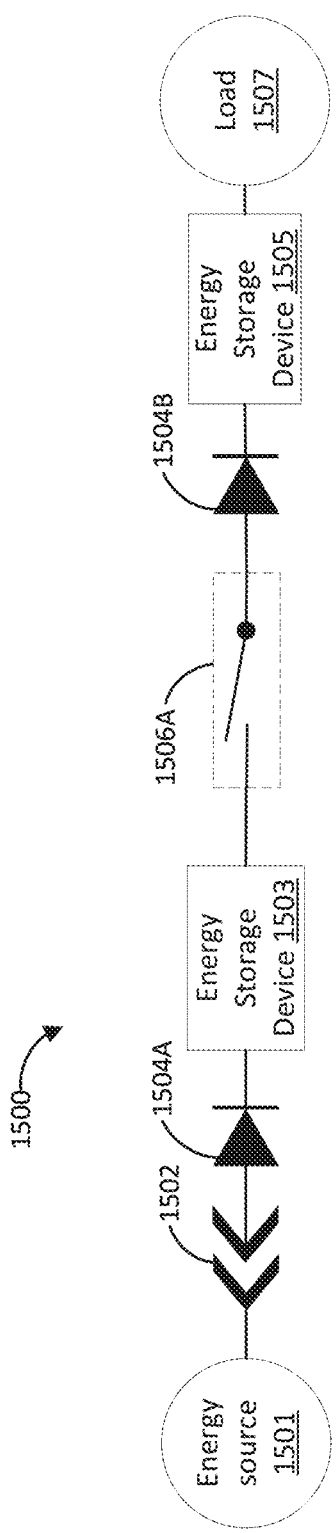
FIG. 15A is a block diagram illustrating an example energy system.

FIG. 15A is a block diagram illustrating an example energy system 1500. The energy system 1500 may include similar structural and/or operation features as any of the other example energy systems shown and/or described herein, such as energy system 150 and/or energy system 1400. The energy system 1500 can include an energy source 1501, energy storage device 1503, energy storage devices 1505, and a load 1507. In some implementations, the energy system 1500 can optionally include an electrical interface 1502, a diode 1504A, a switch 1506A, and/or a diode 1504B.

In some embodiments the energy source 1501 can include an energy generation or regeneration system. For example, the energy source 1501 can include one or more turbines. A turbine can include one or more blades, fans, vanes, and/or rotors. A turbine can include one or more generators. A turbine can be configured to generate energy, such as an electrical current and/or voltage in response to a rotation of the turbine. A turbine can be configured to rotate in response to a fluid flow across the turbine such as a water flow and/or air flow. In some implementations, the energy source 1501 may be included within a vehicle. For example, the energy source 1501 may include an on-board power generation system disposed within and/or on a vehicle and that is mobile with the vehicle. In some implementations, the energy source 1501 may be separate from a vehicle. For example, the energy source 1501 may be stationary or in a fixed location such as a charging station.

The energy storage device 1503 can include one or more devices configured to store energy such as a voltage. The energy storage device 1503 can include one or more capacitors, such as ultracapacitors and/or supercapacitors. The energy storage device 1503 may be configured to receive energy from the energy source 1501 via the electrical interface 1502 and/or the diode 1504A.

The energy storage device 1505 may receive energy from the energy storage device 1503 via the switch 1506 and/or diode 1504B. The energy storage device 1505 can include one or more devices configured to store energy such as a voltage. The energy storage device 1505 can include one or more batteries. The energy storage device 1505 can include a battery field or battery array. The energy storage device 1505 can include one or more lithium batteries, such as lithium ion batteries, lithium polymer batteries, or the like.

The load 1507 may receive energy from the energy storage device 1505. The load 1507 can include a device configured to consume energy or power. The load 1507 can include a motor of a vehicle.

Figure 15B:
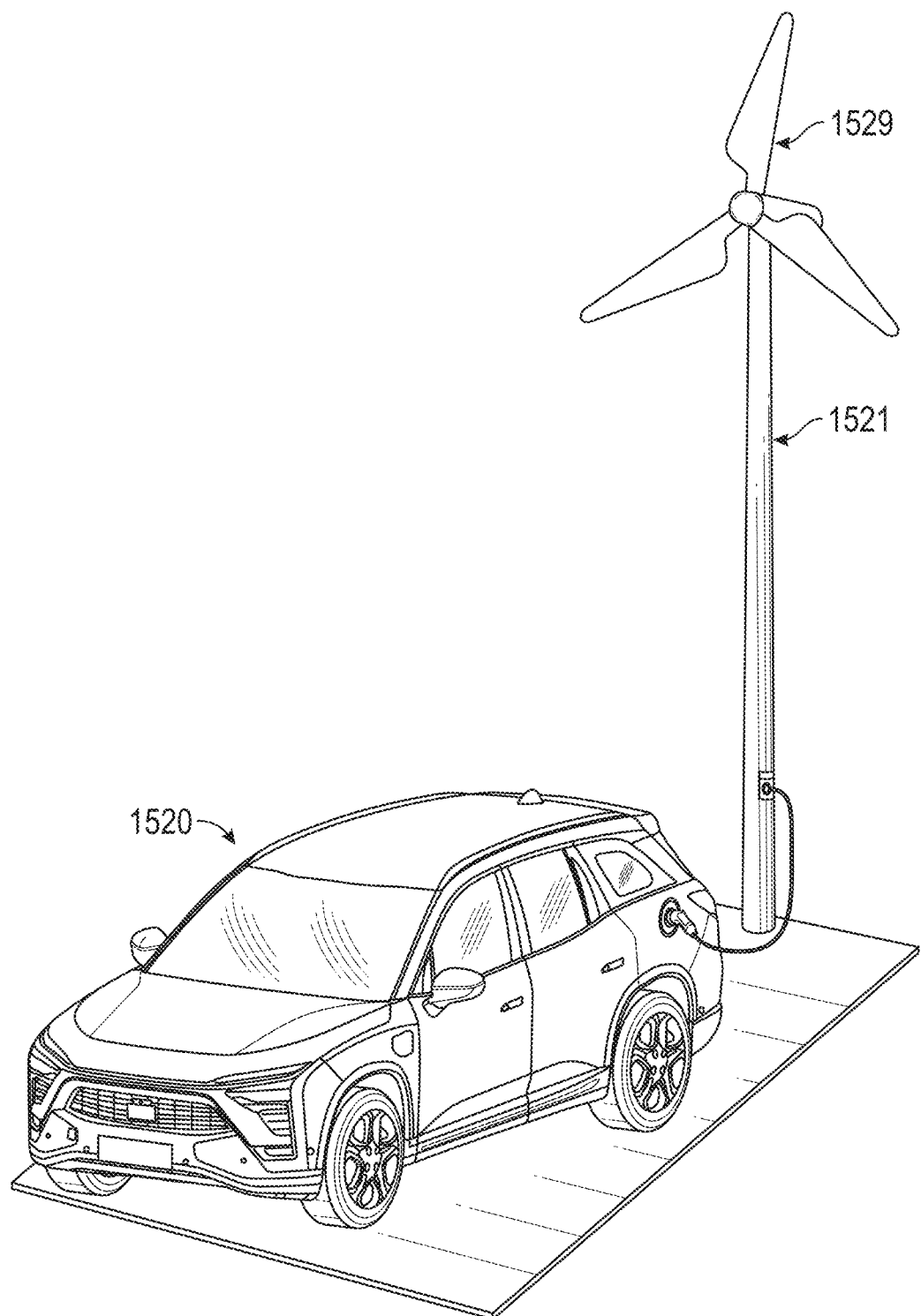
FIG. 15B illustrates an example implementation of an energy system including a turbine charging station used to charge a vehicle.

FIG. 15B illustrates an example implementation of an energy system including a turbine charging station 1521 used to charge a vehicle 1520. The turbine charging station 1521 can include one or more turbines 1529 which may include blades, fans, rotors, or the like, and which may be configured to rotate in response to movement of a fluid, such as air or water, across the turbine 1529. The turbine charging station 1521 can include one or more generators configured to generator energy in response to a rotation of the turbine 1529. The turbine charging station 1521 can include one or more energy storage devices such as capacitors and/or batteries. The turbine charging station 1521 may be configured to store energy generated by the turbines 1529 and/or generators in one or more storage devices of the turbine charging station 1521.

The vehicle 1520 may include one or more energy storage devices such as capacitors and/or batteries. The vehicle 1520 may be configured to receive energy from the turbine charging station 1521. For example, the vehicle 1520 may receive energy from the turbine 1529, generator, and/or from an energy storage device of the turbine charging station 1521. The vehicle 1520 may be configured to store energy from the turbine charging station 1521 in a capacitor storage device of the vehicle 1450 such as an ultracapacitor or supercapacitor. The vehicle 1520 may transfer energy from a capacitor storage device to a battery storage device of the vehicle 1520 and/or to a load of the vehicle 1520. Advantageously, the vehicle 1520 may be configured to receive a large amount of energy from the turbine charging station 1521 in a short amount of time to store in an electric field of a capacitor storage device which may reduce charge times of the vehicle 1520.

Figure 15C:
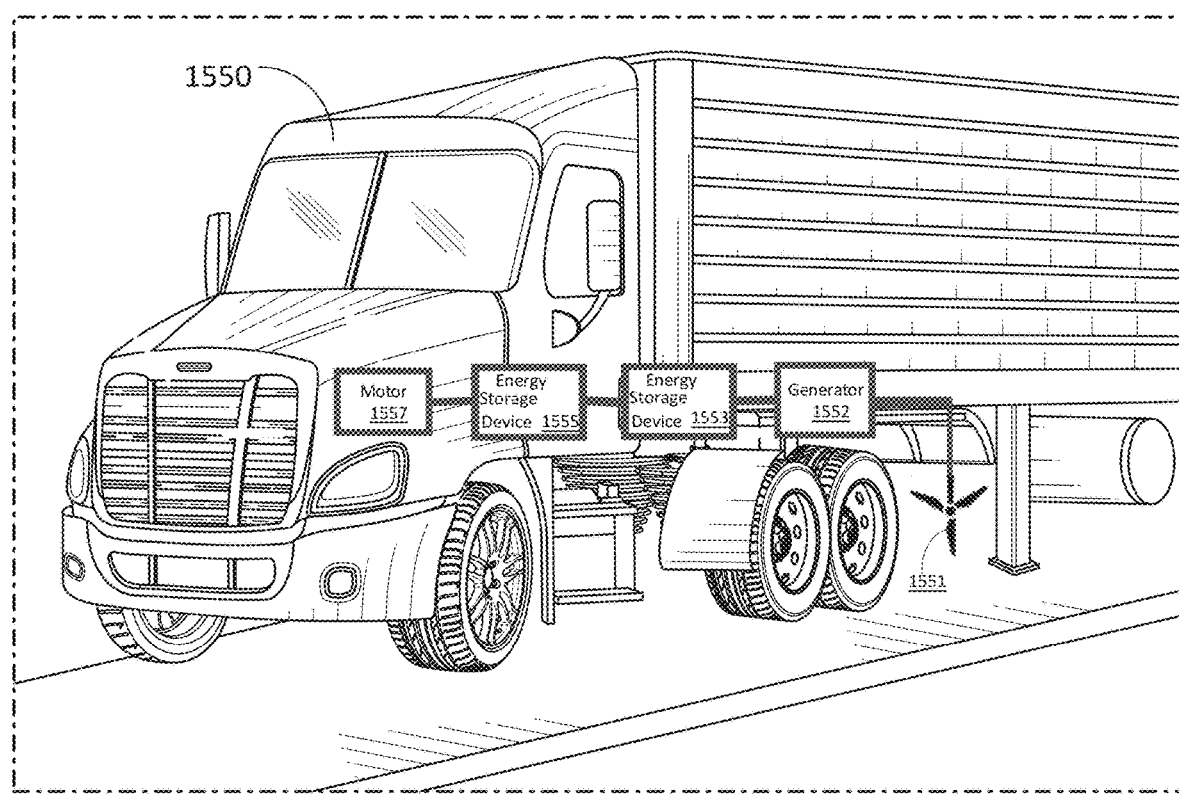
FIG. 15C illustrates an example implementation of an energy system including one or more turbines and a vehicle.

FIG. 15C illustrates an example implementation of an energy system including one or more turbines 1551 and a vehicle 1550. The vehicle 1550 can include a commercial vehicle such as a semi-truck. FIG. 15C is not intended to be limiting. In some implementations, the vehicle 1550 can include any vehicle configured to travel on a ground surface such as a car, a truck, a bus, a golf cart, a bike, a scooter, a motorcycle, construction equipment, farm equipment such as a tractor, or the like. The turbines 1551 may be configured to rotate in response to movement of a fluid, such as air, across the turbines 1551. The turbines 1551 may be disposed on a surface of the vehicle 1550. For example, the turbines 1551 may be disposed on a roof surface of the vehicle 1550, on a side surface of the vehicle 1550, on a bottom surface of the vehicle or the like. Advantageously, the turbines 1551 may be mobile with the vehicle 1550 and may generate energy as the vehicle 1550 travels.

The vehicle 1550 may include a generator 1552. The generator 1552 may generate energy in response to a rotation of the turbine 1551. The vehicle 1550 may include one or more energy storage devices such as energy storage device 1553 and energy storage device 1555. Energy storage device 1553 can include one or more capacitors such as ultracapacitors and/or supercapacitors. Energy storage device 1555 can include one or more batteries. The energy storage device 1553 may be configured to receive and store energy from the generator 1552. The energy storage device 1553 may transfer energy to the energy storage device 1555 and/or to the motor 1557. Advantageously, the energy storage device 1553 may be configured to receive a large amount of energy from the generator 1552 in a short amount of time to store in an electric field of the energy storage device 1553 which may reduce charge times of the vehicle 1550.

Figure 15D:
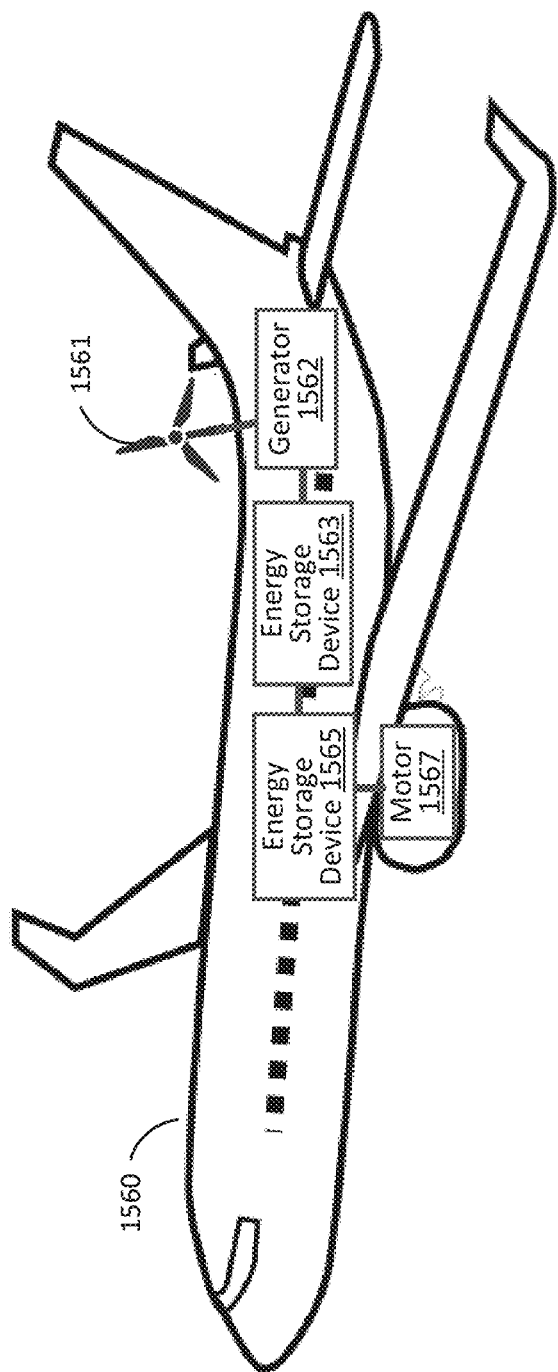
FIG. 15D illustrates an example implementation of an energy system including one or more turbines and an aircraft.

FIG. 15D illustrates an example implementation of an energy system including one or more turbines 1561 and a vehicle 1560. The vehicle 1560 can include an aircraft such as an airplane. The turbines 1561 may be configured to rotate in response to movement of a fluid, such as air, across the turbines 1561. The turbines 1561 may be disposed on a surface of the vehicle 1560. Advantageously, the turbines 1561 may be mobile with the vehicle 1560 and may generate energy as the vehicle 1560 travels.

The vehicle 1560 may include a generator 1562. The generator 1562 may generate energy in response to a rotation of the turbine 1561. The vehicle 1560 may include one or more energy storage devices such as energy storage device 1563 and energy storage device 1565. Energy storage device 1563 can include one or more capacitors such as ultracapacitors and/or supercapacitors. Energy storage device 1565 can include one or more batteries. The energy storage device 1563 may be configured to receive and store energy from the generator 1562. The energy storage device 1563 may transfer energy to the energy storage device 1565 and/or to the motor 1567. Advantageously, the energy storage device 1563 may be configured to receive a large amount of energy from the generator 1562 in a short amount of time to store in an electric field of the energy storage device 1563 which may reduce charge times of the vehicle 1560.

Figure 15E:
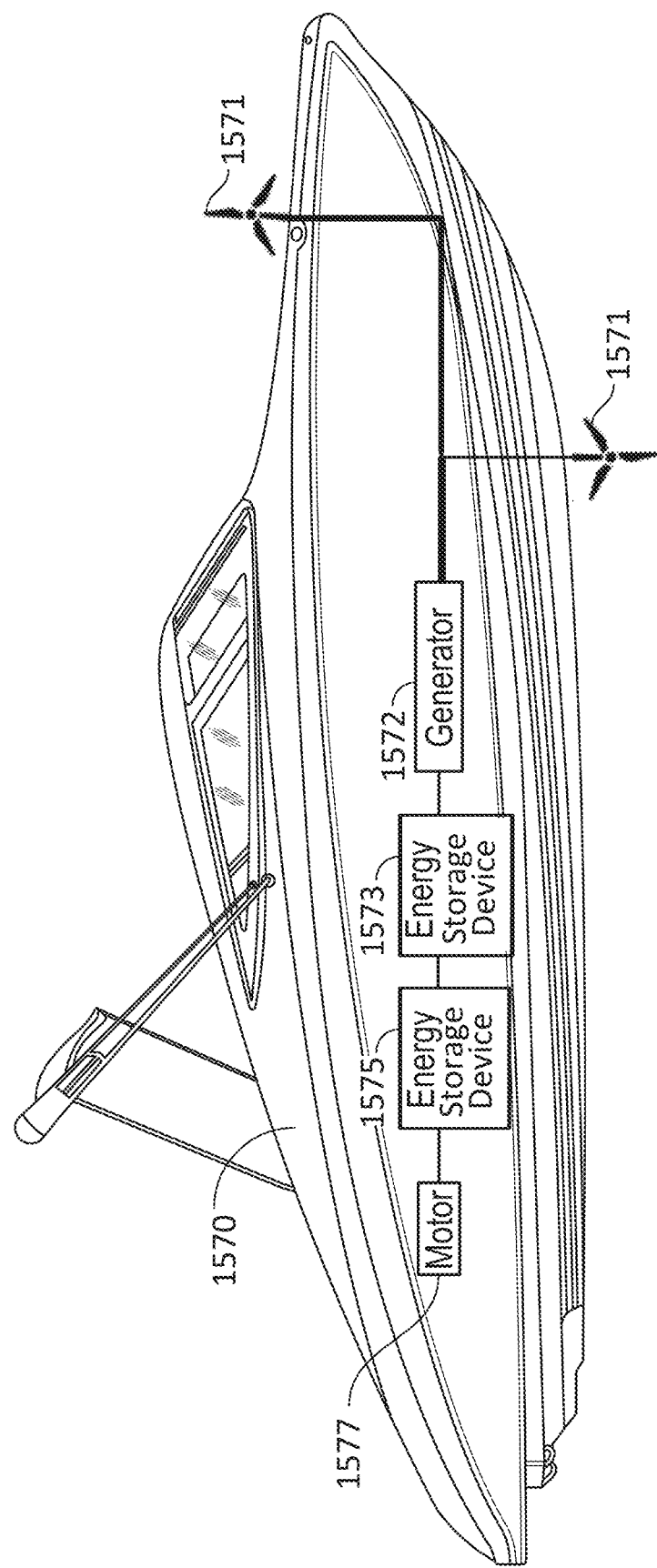
FIG. 15E illustrates an example implementation of an energy system including one or more turbines and a watercraft.

FIG. 15E illustrates an example implementation of an energy system including one or more turbines 1571 and a vehicle 1570. The vehicle 1570 can include a watercraft such as a boat. The turbines 1571 may be configured to rotate in response to movement of a fluid, such as air and/or water, across the turbines 1571. The turbines 1571 may be disposed on a surface of the vehicle 1570. For example, the turbines 1571 may be disposed on a bottom surface of the vehicle 1570 that is submerged beneath water. As another example, the turbines 1571 may be disposed on an upper surface of the vehicle 1570 that is exposed to air. Advantageously, the turbines 1571 may be mobile with the vehicle 1570 and may generate energy as the vehicle 1570 travels.

The vehicle 1570 may include a generator 1572. The generator 1572 may generate energy in response to a rotation of the turbine 1571. The vehicle 1570 may include one or more energy storage devices such as energy storage device 1573 and energy storage device 1575. Energy storage device 1573 can include one or more capacitors such as ultracapacitors and/or supercapacitors. Energy storage device 1575 can include one or more batteries. The energy storage device 1573 may be configured to receive and store energy from the generator 1572. The energy storage device 1573 may transfer energy to the energy storage device 1575 and/or to the motor 1577. Advantageously, the energy storage device 1573 may be configured to receive a large amount of energy from the generator 1572 in a short amount of time to store in an electric field of the energy storage device 1573 which may reduce charge times of the vehicle 1570.

Additional Embodiments

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. A computer system for managing vehicle operational settings, the computer system comprising:
   one or more hardware processors configured to execute program instructions to cause the computer system to:
      cause operational settings data to be downloaded to a vehicle to control one or more operations of the vehicle; and
      pursuant to causing the operational settings data to be downloaded to the vehicle:
         generate download event information indicating the operational settings data downloaded to the vehicle and a user associated with the vehicle;
         access a pricing structure associated with operational settings, wherein the pricing structure is based on a number of operational settings downloaded to the vehicle or a type of operational setting downloaded to the vehicle; and
         charge the user based on the pricing structure and the download event information.

2. The computer system of claim 1, wherein the download event information includes a reason associated with downloading the operational settings data to the vehicle.

3. The computer system of claim 1, wherein the download event information includes a time the operational settings data were downloaded to the vehicle.

4. The computer system of claim 1, wherein the one or more hardware processors are configured to execute the program instructions to cause the computer system to:
   determine, from at least the download event information, a number of users that have downloaded an operational setting.

5. The computer system of claim 1, wherein the one or more hardware processors are configured to execute the program instructions to cause the computer system to:
   allow a third-party to access the download event information to determine a number of users that are subscribed to a service offering.

6. The computer system of claim 1, wherein the pricing structure is based on an agreement with a third-party operational settings provider.

7. The computer system of claim 1, wherein the one or more hardware processors are configured to execute the program instructions to cause the computer system to:
   communicate a notification to a user device to notify the user they have been charged.

8. The computer system of claim 7, wherein the notification includes an email.

9. The computer system of claim 7, wherein the notification includes a text message.

10. The computer system of claim 7, wherein the user device is a control dashboard of a vehicle.

11. The computer system of claim 1, wherein the one or more hardware processors are configured to execute the program instructions to cause the computer system to:
    pursuant to causing the operational settings data to be downloaded to the vehicle, update a history log associated to reflect the download event information; and
    update a user account associated with the user.

12. The computer system of claim 1, wherein the one or more hardware processors are configured to execute the program instructions to cause the computer system to:
    cause the operational settings data to be downloaded to the vehicle based on at least a geographic location of the vehicle.

13. The computer system of claim 1, wherein the one or more hardware processors are configured to execute the program instructions to cause the computer system to:
    cause the operational settings data to be downloaded to the vehicle to control one or more operations of an energy storage system of the vehicle.

14. The computer system of claim 1, wherein the one or more hardware processors are configured to execute the program instructions to cause the computer system to:
    cause the operational settings data to be downloaded to the vehicle to control one or more operations of an energy generation system of the vehicle.

15. A computer-implemented method, comprising:
    causing operational settings data to be downloaded to a vehicle to control one or more operations of the vehicle; and
    pursuant to causing the operational settings data to be downloaded to the vehicle:
        generating download event information indicating the operational settings data downloaded to the vehicle and a user associated with the vehicle;
        accessing a pricing structure associated with operational settings, wherein the pricing structure is based on a number of operational settings downloaded to the vehicle or a type of operational setting downloaded to the vehicle; and
        charging the user based on the pricing structure and the download event information.

16. The computer-implemented method of claim 15, wherein the download event information includes a reason associated with downloading the operational settings data to the vehicle.

17. The computer-implemented method of claim 15, wherein the pricing structure is based on an agreement with a third-party operational settings provider.

18. The computer-implemented method of claim 15 further comprising communicating a notification to a user device to notify the user they have been charged.

19. The computer-implemented method of claim 15 further comprising:
    determining, from at least the download event information, a number of users that have downloaded an operational setting.

20. Non-transitory computer-readable media including computer-executable instructions that, when executed by a computing system, cause the computing system to perform operations, comprising:
    causing operational settings data to be downloaded to a vehicle to control one or more operations of the vehicle; and
    pursuant to causing the operational settings data to be downloaded to the vehicle:
        generating download event information indicating the operational settings data downloaded to the vehicle and a user associated with the vehicle;
        accessing a pricing structure associated with operational settings, wherein the pricing structure is based on a number of operational settings downloaded to the vehicle or a type of operational setting downloaded to the vehicle; and
        charging the user based on the pricing structure and the download event information.

21. The non-transitory computer-readable media of claim 20, wherein the download event information includes a reason associated with downloading the operational settings data to the vehicle.

22. The non-transitory computer-readable media of claim 20, wherein the pricing structure is based on an agreement with a third-party operational settings provider.

23. The non-transitory computer-readable media of claim 20, wherein the computer-executable instructions, when executed by the computing system, cause the computing system to perform operations comprising communicating a notification to a user device to notify the user they have been charged.

24. The non-transitory computer-readable media of claim 20, wherein the computer-executable instructions, when executed by the computing system, cause the computing system to perform operations comprising:
    determining, from at least the download event information, a number of users that have downloaded an operational setting.

* * * * *